United States Patent
Higashi et al.

(10) Patent No.: US 8,828,132 B2
(45) Date of Patent: *Sep. 9, 2014

(54) PIGMENT COMPOSITION, INK FOR INKJET RECORDING, COLORING COMPOSITION FOR COLOR FILTER, AND COLOR FILTER

(75) Inventors: Masahiro Higashi, Shizuoka (JP); Nobuo Seto, Shizuoka (JP); Yoshihiro Jimbo, Shizuoka (JP); Keiichi Tateishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 93 days.

This patent is subject to a terminal disclaimer.

(21) Appl. No.: 13/522,365

(22) PCT Filed: Jan. 14, 2011

(86) PCT No.: PCT/JP2011/051027
§ 371 (c)(1),
(2), (4) Date: Sep. 20, 2012

(87) PCT Pub. No.: WO2011/087148
PCT Pub. Date: Jul. 21, 2011

(65) Prior Publication Data
US 2013/0000511 A1    Jan. 3, 2013

(30) Foreign Application Priority Data
Jan. 15, 2010  (JP) ................. 2010-007531

(51) Int. Cl.
| | | |
|---|---|---|
| *C09D 11/02* | (2014.01) | |
| *C08K 5/23* | (2006.01) | |
| *C09B 29/033* | (2006.01) | |
| *C09B 29/036* | (2006.01) | |
| *C09B 33/147* | (2006.01) | |
| *C09B 29/20* | (2006.01) | |
| *C09B 67/46* | (2006.01) | |
| *C09D 17/00* | (2006.01) | |
| *C09D 11/326* | (2014.01) | |
| *C09B 67/22* | (2006.01) | |
| *C09B 33/048* | (2006.01) | |
| *C09B 33/24* | (2006.01) | |
| *G02B 5/20* | (2006.01) | |

(52) U.S. Cl.
CPC ......... *C09B 29/0037* (2013.01); *C09B 29/0081* (2013.01); *C09B 29/0029* (2013.01); *C09B 29/0066* (2013.01); *C09B 33/147* (2013.01); *G02B 5/201* (2013.01); *C09B 29/0059* (2013.01); *C09B 29/0051* (2013.01); *C09B 29/20* (2013.01); *C09B 29/0055* (2013.01); *C09B 29/0085* (2013.01); *C09B 29/0088* (2013.01); *C09B 67/009* (2013.01); *C09B 29/0074* (2013.01); *C09D 17/003* (2013.01); *C09B 29/0048* (2013.01); *C09D 11/326* (2013.01); *C09B 67/0051* (2013.01); *C09B 33/048* (2013.01); *C09B 33/24* (2013.01); *C09B 29/0033* (2013.01); *C09B 67/0086* (2013.01); *C09B 29/004* (2013.01)
USPC ............ 106/31.77; 106/31.78; 106/496

(58) Field of Classification Search
CPC .............. C09D 11/326; C09D 17/003; C09B 67/0033; C09B 67/0034; C09B 67/0046; C09B 67/0051; C09B 67/0055; C09B 67/0085; G02B 5/20
USPC .......................... 106/31.77, 31.78, 494, 496
See application file for complete search history.

(56) References Cited

U.S. PATENT DOCUMENTS

| | | | | |
|---|---|---|---|---|
| 5,965,715 | A * | 10/1999 | Ueno et al. | 106/496 |
| 5,973,126 | A * | 10/1999 | Ueno et al. | 106/31.77 |
| 6,005,085 | A * | 12/1999 | Ueno et al. | 106/31.78 |
| 6,409,812 | B1 * | 6/2002 | Ueno et al. | 106/31.77 |
| 8,152,863 | B2 * | 4/2012 | Taguchi et al. | 8/637.1 |
| 8,202,327 | B2 * | 6/2012 | Higashi et al. | 8/637.1 |
| 8,226,734 | B2 * | 7/2012 | Seto et al. | 8/637.1 |
| 8,293,148 | B2 * | 10/2012 | Seto et al. | 106/31.77 |
| 8,298,299 | B2 * | 10/2012 | Higashi et al. | 8/637.1 |
| 8,454,710 | B2 * | 6/2013 | Higashi et al. | 8/637.1 |
| 8,465,553 | B2 * | 6/2013 | Kuge et al. | 8/637.1 |
| 8,470,054 | B2 * | 6/2013 | Higashi et al. | 8/637.1 |

| | | | |
|---|---|---|---|
| 2004/0163569 | A1* | 8/2004 | Shakhnovich ............ 106/31.77 |
| 2008/0107977 | A1 | 5/2008 | Hoshino et al. |
| 2010/0065794 | A1 | 3/2010 | Hoshino et al. |

FOREIGN PATENT DOCUMENTS

| | | |
|---|---|---|
| GB | 1336898 | 11/1973 |
| JP | 63-148267 A | 6/1988 |
| JP | 63-158561 A | 7/1988 |
| JP | 63-218960 A | 9/1988 |
| JP | 4-27959 A | 1/1992 |
| JP | 4-88349 A | 3/1992 |
| JP | 10-36692 A | 2/1998 |
| JP | 2001-19880 A | 1/2001 |
| JP | 2008-202021 A | 9/2008 |
| JP | 2008-208366 A | 9/2008 |
| WO | WO 2010/008081 A1 * | 1/2010 |
| WO | WO 2010/026969 A1 * | 3/2010 |
| WO | WO 2011/087114 A1 * | 7/2011 |

OTHER PUBLICATIONS

International Search Report for PCT/JP2011/051027 dated Apr. 19, 2011 [PCT/ISA/210].
Written Opinion for PCT/JP2011/051027 dated Apr. 19, 2011 [PCT/ISA/237].

* cited by examiner

*Primary Examiner* — Helene Klemanski
(74) *Attorney, Agent, or Firm* — Sughrue Mion, PLLC

(57) ABSTRACT

A pigment composition containing an azo pigment represented by the following general formula (1) and a pigment derivative having a hydrophilic group: wherein G represents a hydrogen atom, an aliphatic group, an aryl group, a heterocyclic group, an acyl group, an aliphatic oxycarbonyl group, a carbamoyl group, an aliphatic sulfonyl group, or an arylsulfonyl group, $R_1$ represents an amino group, an aliphatic oxy group, an aliphatic group, an aryl group, or a heterocyclic group, $R_2$ represents a substituent, A represents an aromatic 5- or 6-membered heterocyclic group, m represents an integer of from 0 to 5, and n represents an integer of from 1 to 4, with the general formula (1) not containing any ionic hydrophilic group.

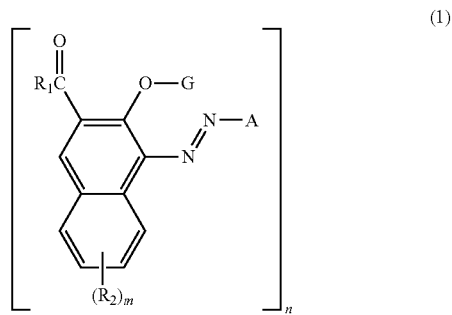

(1)

18 Claims, 4 Drawing Sheets

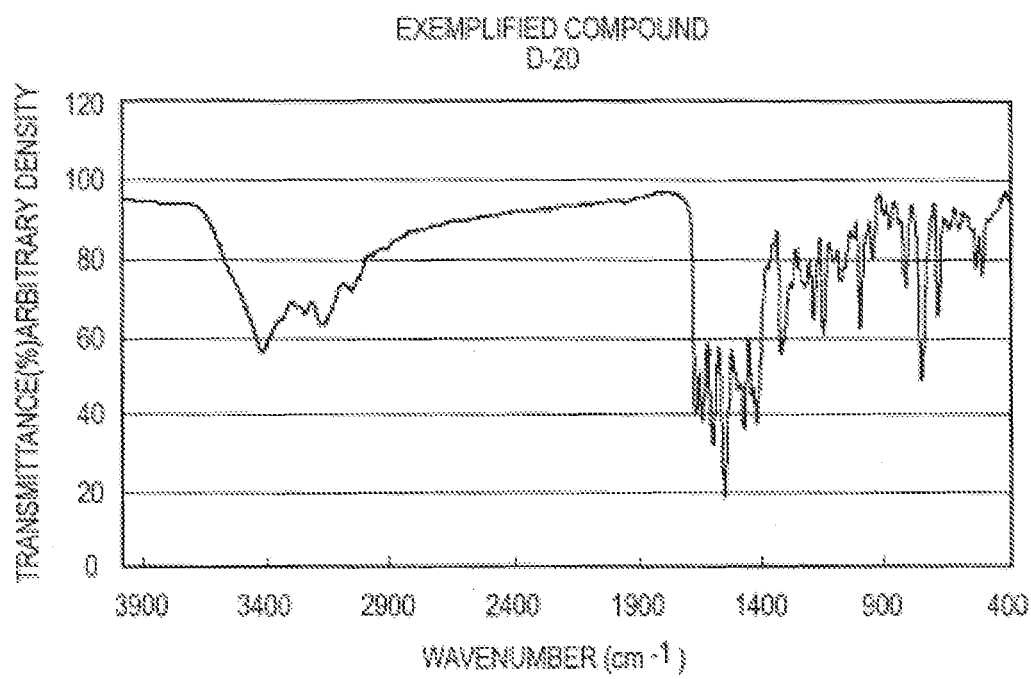
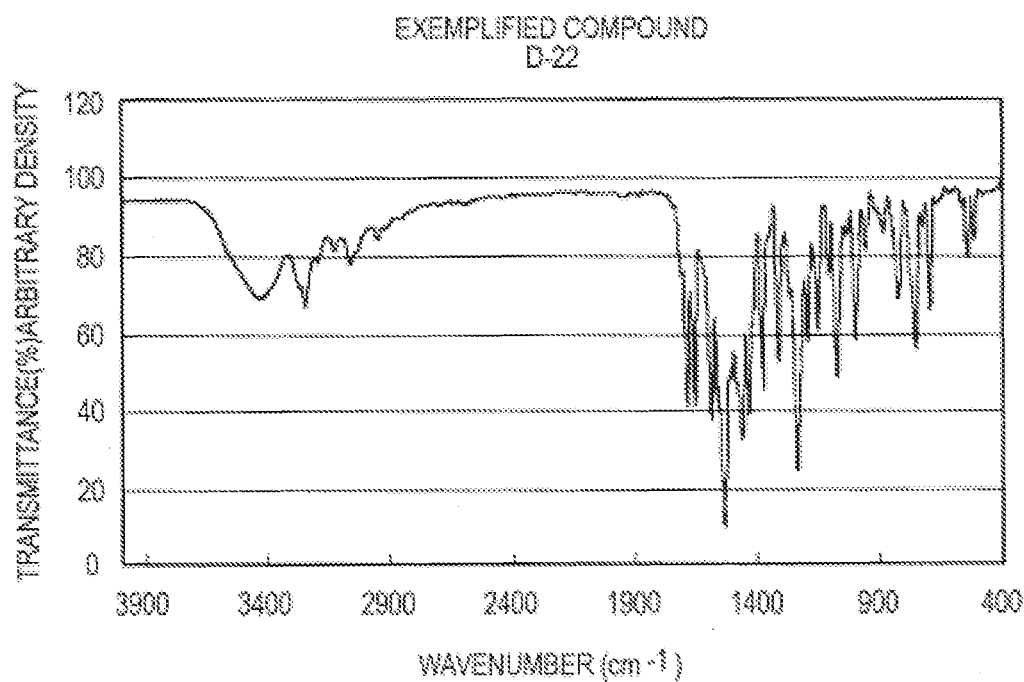

PIGMENT COMPOSITION, INK FOR INKJET RECORDING, COLORING COMPOSITION FOR COLOR FILTER, AND COLOR FILTER

TECHNICAL FIELD

The present invention relates to a pigment composition, an ink for inkjet recording, a coloring composition for color filter and a color filter.

In recent years, as image-recording materials, materials for forming color images have been predominant and, specifically, recording materials for an inkjet system, recording materials for a thermal transfer system, recording materials for an electro-photographic system, transfer type silver halide light-sensitive materials, printing inks, and recording pens have found widespread use. Also, in photographing devices such as CCDs for photographing equipment, and in LCDs and PDPs for display, color filters are used for recording or reproducing a color image. In these color image recording materials and color filters, colorants (dyes or pigments) of three primary colors of a so-called additive color mixing process or subtractive color mixing process have been used in order to display or record full-color images. In actuality, however, there is no fast colorant having the absorption characteristics capable of realizing a preferred color reproduction region and resisting various use conditions and environmental conditions. Thus, the improvement thereof has strongly been desired.

Dyes or pigments to be used for the above-mentioned uses are required to have in common the following properties. That is, they are required to have absorption characteristics favorable in view of color reproduction and have good fastness under the conditions of the environment wherein they are used, for example, fastness against light, heat, and an oxidative gas such as ozone. In addition, in the case where the colorant is a pigment, the pigment is further required to be substantially insoluble in water or in an organic solvent, to have a good fastness to chemicals, and not to lose the preferred absorption characteristics shown in a molecularly dispersed state even when used as particles. Although the required properties described above can be controlled by adjusting the intensity of intermolecular mutual action, both of them are in a trade-off relation with each other, thus being difficult to allow them to be compatible with each other.

Further, in the case of using a pigment as the colorant, the pigment is additionally required to have a particle size and a particle shape necessary for realizing desired transparency, to have good fastness under the conditions of the environment wherein they are used, for example, fastness against light, heat, and an oxidative gas such as ozone, to have good fastness to an organic solvent and chemicals such as a sulfurous acid gas, and to be capable of being dispersed in a used medium to a level of fine particles, with the dispersed state being stable.

For example, JP-A-2008-202021 discloses a pigment composition containing an organic pigment and an azo pigment derivative having a β-naphthol group. According to this technique, there can supposedly be obtained excellent dispersibility, dispersion stability, transparency, and distinctness.

Also, JP-A-2008-208366 discloses a pigment composition containing an organic pigment and a condensed azo pigment derivative. According to this technique, there can supposedly be obtained a pigment composition having excellent fluidity and non-aggregating properties.

SUMMARY OF THE INVENTION

However, with pigment compositions for image-recording materials and for color filters, good tinctorial strength (coloring power), hue, and fastness such as weatherability and age-storage stability of the pigment compositions themselves are required in addition to excellent dispersibility, dispersion stability, transparency, distinctness, fluidity, and non-aggregating properties.

An object of the present invention is to provide a pigment composition which has excellent coloring characteristics such as tinctorial strength and hue, excellent fastness such as light fastness and ozone fastness, excellent dispersibility, excellent dispersion stability, and excellent age-storage stability; and an ink for inkjet recording.

Another object of the invention is to provide a coloring composition for color filter which composition has good hue, exhibits good light fastness, heat fastness, and ozone fastness, shows good dispersibility, and can provide a color filter having high transparency, excellent spectral properties, excellent contrast, and excellent age-storage stability of dispersion.

A further object of the invention is to provide a color filter having high transparency, excellent spectral properties, excellent contrast, and excellent age-storage stability of dispersion, which is obtained by using the above-described coloring composition for color filter.

As a result of intensive investigations, the inventors have found that the above-described objects can be attained by a pigment composition containing a specific nitrogen-containing heterocyclic azo pigment and a pigment dispersant having excellent dispersing ability for the azo pigment, thus having completed the invention.

That is, the above-described objects can be attained by the following means.

Specific means will be described below.

<1> A pigment composition containing; (A) an azo pigment represented by the following general formula (1); and (B) a pigment derivative having a hydrophilic group and represented by the following general formula (B1).

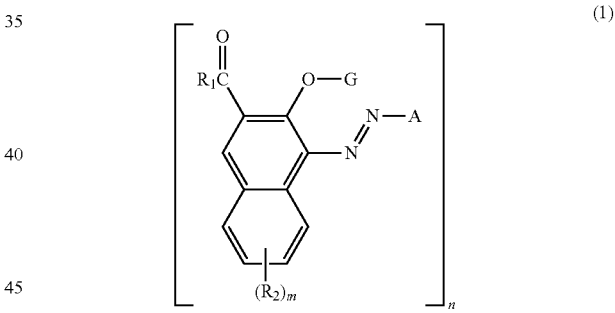

In general formula (1), G represents a hydrogen atom, an aliphatic group, an aryl group, a heterocyclic group, an acyl group, an aliphatic oxycarbonyl group, a carbamoyl group, an aliphatic sulfonyl group, or an arylsulfonyl group; $R_1$ represents an amino group, an aliphatic oxy group, an aliphatic group, an aryl group, or a heterocyclic group; $R_2$ represents a substituent; A represents an aromatic 5- or 6-membered heterocyclic group; m represents an integer of from 0 to 5; n represents an integer of from 1 to 4; when n=2, the general formula (1) represents a dimer formed through $R_1$, $R_2$, A, or G; when n=3, the general formula (1) represents a trimer formed through $R_1$, $R_2$, A, or G; when n=4, the general formula (1) represents a tetramer formed through $R_1$, $R_2$, A, or G; and the general formula (1) does not have any ionic hydrophilic group.

In formula (B1), P represents an anthanthrone series colorant residue, an anthraquinone series colorant residue, an anthrapyrimidine series colorant residue, an azo series colorant residue, a quinacridone series colorant residue, a quinophthalone series colorant residue, a diketopyrrolopyrrole series colorant residue, a dioxazine series colorant residue, a flavanthrone series colorant residue, an indanthrone series colorant residue, an isoindoline series colorant residue, an isoindolinone series colorant residue, an isoviolanthrone series colorant residue, a metal complex series colorant residue, a perinone series colorant residue, a perylene series colorant residue, a pthalocyanine series colorant residue, a pyranthrone series colorant residue, a pyrazoloquinazolone series colorant residue, a thioindigo series colorant residue, or a triarylcarbonium series colorant residue; X represents an amino group, —$SO_3.M/m$ or —$COO.M/m$, wherein M represents a counter cation selected from the group consisting of a hydrogen ion, a 1- to 3-valent metal ion, and an ammonium ion, and m represents a valence number of M, which is an integer of 1 to 3 or an amino group, and n1 represents an integer of from 1 to 4.

<2> The pigment composition according to <1>, wherein the pigment derivative is at least one member selected from the group consisting of a diketopyrrolopyrrole series pigment derivative, a quinacridone series pigment derivative, an anthraquinone series pigment derivative, and an azo series pigment derivative.

<3> The pigment composition according to <1> or <2>, wherein the pigment derivative is an azo series pigment derivative.

<4> The pigment composition according to <3>, wherein the pigment derivative is an azo series pigment derivative represented by the following general formula (B2), a tautomer, salt, or hydrate thereof.

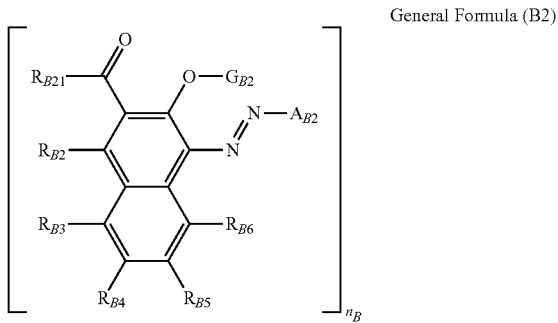

General Formula (B2)

In general formula (B2), $G_{B2}$ represents a hydrogen atom, an aliphatic group, an aryl group, a heterocyclic group, or a hydrophilic group; $R_{B21}$ represents an amino group, an aliphatic oxy group, a heterocyclic group connected at the nitrogen atom, or a hydrophilic group; $R_{B2}$ to $R_{B6}$ each independently represents a hydrogen atom or a substituent, $A_{B2}$ represents an aryl group or a heterocyclic group; at least one of $R_{B21}$, $R_{B2}$ to $R_{B6}$, and $A_{B2}$ has a hydrophilic group; $n_B$ represents an integer of from 1 to 4; when $n_B=2$, the general formula (B2) represents a dimer formed through $R_{B21}$, $R_{B2}$ to $R_{B6}$, $A_{B2}$, or $G_{B2}$; when $n_B=3$, the general formula (B2) represents a trimer formed through $R_{B21}$, $R_{B2}$ to $R_{B6}$, $A_{B2}$, or $G_{B2}$; and when $n_B=4$, the general formula (B2) represents a tetramer formed through $R_{B21}$, $R_{B2}$ to $R_{B6}$, $A_{B2}$, or $G_{B2}$.

<5> The pigment composition according to any one of <1> to <4>, wherein the content of (B) the pigment derivative having a hydrophilic group and represented by the general formula (B1) is from 0.1 to 30% by weight based on the azo pigment (A) represented by the general formula (1).

<6> An ink for inkjet recording, containing the pigment composition according to any one of <1> to <5>.

<7> A coloring composition for color filter, containing the pigment composition according to any one of <1> to <5>.

<8> A color filter, which is produced by using the coloring composition for color filter according to <7>.

According to the present invention, there can be provided a pigment dispersion having excellent coloring characteristics such as high tinctorial strength and hue, having excellent fastness such as light fastness and ozone fastness, and having excellent dispersibility, dispersion stability, and age-storage stability; a coloring composition; and an ink for inkjet recording.

Also, there can be provided a coloring composition for color filter which composition has good hue, exhibits good light fastness, heat fastness, and ozone fastness, shows good dispersibility, and can provide a color filter having high transparency, excellent spectral properties, excellent contrast, and excellent age-storage stability of dispersion.

Further, there can be provided a color filter obtained by using the above-described coloring composition for color filter, which has high transparency, excellent spectral properties, excellent contrast, and excellent age-storage stability.

BRIEF DESCRIPTION THE DRAWINGS

FIG. 3 is an infrared absorption spectrum of a specific illustrative compound D-20 synthesized according to Synthesis Example 3.

FIG. 4 is an infrared absorption spectrum of a specific illustrative compound D-22 synthesized according to Synthesis Example 4.

DESCRIPTION OF EMBODIMENTS

Figure 1:
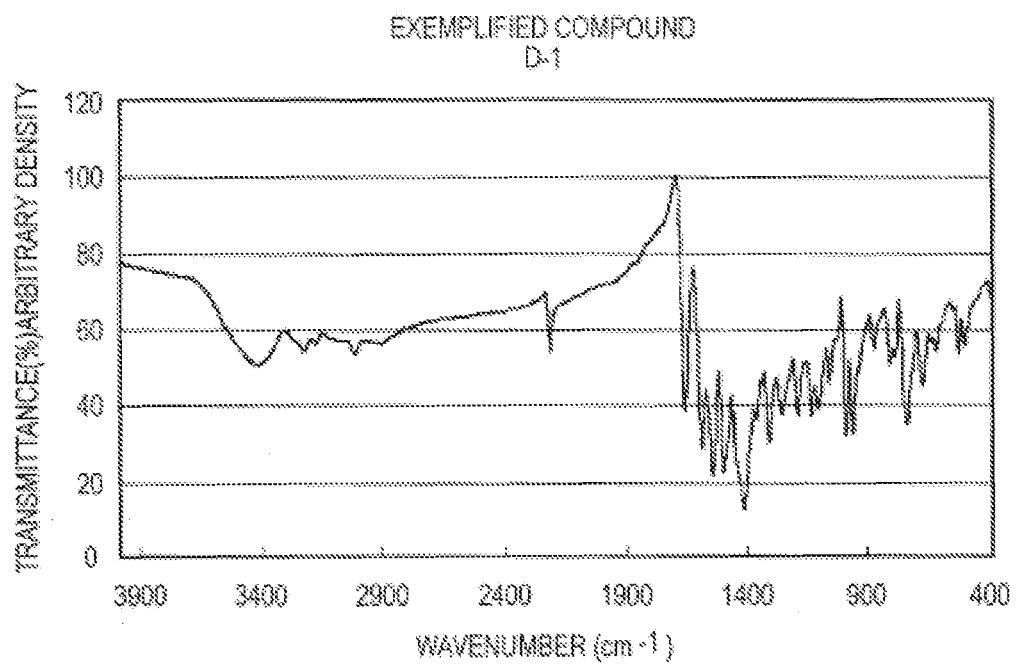
FIG. 1 is an infrared absorption spectrum of a specific illustrative compound D-1 synthesized according to Synthesis Example 1.

First, the terms "aliphatic group", "aryl group", "heterocyclic group", and "substituent" as used in the present invention will be described below.

In the aliphatic group in the invention, the aliphatic moiety thereof may be straight, branched, or cyclic, and may be saturated or unsaturated. Specifically, there can be illustrated an alkyl group, an alkenyl group, a cycloalkyl group, and a cycloalkenyl group. Further, the aliphatic group may be unsubstituted or may have a substituent.

Also, the aryl group may be a monocyclic group or a condensed ring group, and may be unsubstituted or may have a substituent. Also, with the heterocyclic group, the heterocyclic moiety may be any ring that contains a hetero atom (e.g., a nitrogen atom, a sulfur atom, or an oxygen atom) in the ring, and may be a saturated ring or an unsaturated ring. Also, the ring may be a monocyclic ring or a condensed ring, and may be unsubstituted or may have a substituent.

Also, the substituent in the invention means any substitutable group, and examples thereof include an aliphatic group, an aryl group, a heterocyclic group, an acyl group, an acyloxy group, an acylamino group, an aliphatic oxy group, an aryloxy group, a heterocyclic oxy group, an aliphatic oxycarbonyl group, an aryloxycarbonyl group, a heterocyclic oxycarbonyl group, a carbamoyl group, an aliphatic sulfonyl group, an arylsulfonyl group, a heterocyclic sulfonyl group, an aliphatic sulfonyloxy group, an arylsulfonyloxy group, a heterocyclic sulfonyloxy group, a sulfamoyl group, an aliphatic sulfonamido group, an arylsulfonamido group, a heterocyclic sulfonamido group, an amino group, an aliphatic amino group, an arylamino group, a heterocyclic amino group, an aliphatic oxycarbonylamino group, an aryloxycarbonylamino group, a heterocyclic oxycarbonylamino group, an aliphatic sulfinyl group, an arylsulfinyl group, an aliphatic thio group, an arylthio group, a hydroxyl group, a cyano group, a sulfo group, a carboxyl group, an aliphatic oxyamino group, an aryloxyamino group, a carbamoylamino group, a sulfamoylamino group, a halogen atom, a sulfamoylcarbamoyl group, a carbamoylsulfamoyl group, a dialiphatic oxyphosphinyl group, and a diaryloxyphosphinyl group.

A Hammett substituent constant σp to be used in this specification is briefly explained below.

The Hammett's rule is an empirical rule advocated by L. P. Hammett in 1935 in an attempt to quantitatively discuss the influences of a substituent of a benzene derivative on the reaction or equilibrium, and the validity thereof has been widely accepted nowadays. Substituent constants obtained by the Hammett's rule include σp and σm values. These values are found in a number of general books. The details are given in, for example, J. A. Dean (ed.), *Lange's Handbook of Chemistry*, the 12th Ed., MacGraw-Hill, 1979 and *Kagakuno Ryoiki*, Extra No. 122, Nankodo, 1979, 96-103. While substituents are described in the invention by reference to their Hammett substituent constants σp, it is needless to say that such description applies to not only the substituents whose Hammett substituent constants σp are known from the literature but those whose Hammett substituent constants σp are unknown from the literature but are to fall within a range when determined in accordance with the Hammett's rule. Although azo compounds of the invention represented by the general formulae (1), (2-1), (2-2), (2-3), (3), (3-1) to (3-4) are not benzene derivatives, σp values are referred to as a measure of the electron effect of their substituents irrespective of the position of substitution. In the invention, the σp value will be used in this sence.

As is described above, the pigment composition of the invention contains an azo pigment (A) represented by the general formula (1) and a pigment derivative (B) having a hydrophilic group and represented by the general formula (B1).

[(A) Azo Pigments]

First, an azo pigment (A) represented by the general formula (1) in the invention (hereinafter also referred to as "azo pigment (A)" or "azo compound (A)" in some cases) will be described.

Generally, pigments are in a state wherein molecules constituting them are strongly connected to each other through aggregation energy produced by strong mutual action between pigment molecules. In order to realize this state, van der Waals force and intermolecular hydrogen bond are necessary as described in, for example, *The Imaging Society of Japan*, vol. 43, p. 10 (2004).

In order to increase the intermolecular van der Waals force, introduction of an aromatic group, a polar group and/or a hetero atom to a molecule may be considered. Also, in order to form intermolecular hydrogen bond, introduction of a substituent which contains a hydrogen atom connected to a hetero atom and/or introduction of an electron donative substituent into the molecule may be considered. Further, polarity of the entire molecule may preferably be considered to be higher. For these purposes, with a chain group such as an alkyl group, a shorter group may be considered to be preferred and, with respect to the value of molecular weight/azo group, a smaller value may be considered to be preferred.

From these standpoints, pigment particles preferably contain an amido bond, a sulfonamido bond, an ether bond, a sulfo group, an oxycarbonyl group, an imido group, a carbamoylamino group, a heterocyclic ring, a benzene ring, or the like.

The azo pigments in accordance with the invention show excellent properties with respect to coloring characteristics such as tinctorial strength and hue and can show excellent fastness such as light fastness and ozone fastness due to the unique structure thereof represented by the following general formula (1).

Next, pigments represented by the general formula (1) will be described below.

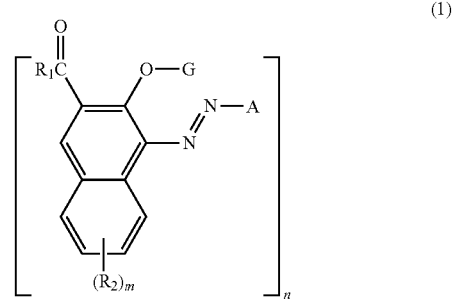

In the general formula (1), G represents a hydrogen atom, an aliphatic group, an aryl group, a heterocyclic group, an acyl group, an aliphatic oxycarbonyl group, a carbamoyl group, an aliphatic sulfonyl group, or an arylsulfonyl group, $R_1$ represents an amino group, an aliphatic oxy group, an aliphatic group, an aryl group, or a heterocyclic group, $R_2$ represents a substituent, and A represents an aromatic 5- or 6-membered heterocyclic group. m represents an integer of from 0 to 5, and n represents an integer of from 1 to 4. When n=2, the general formula (1) represents a dimer formed through $R_1$, $R_2$, A, or G. When n=3, the general formula (1) represents a trimer formed through $R_1$, $R_2$, A, or G. When n=4, the general formula (1) represents a tetramer formed through $R_1$, $R_2$, A, or G. The general formula (1) does not have any ionic hydrophilic group.

The aliphatic group represented by G may have a substituent, and may be saturated or unsaturated. As a group which may be the substituent, any group that has been described hereinbefore in the aforesaid paragraph on substituents and that is substitutable may be employed, and preferred substituents are a hydroxyl group, an aliphatic oxy group, a carbamoyl group, an aliphatic oxycarbonyl group, an aliphatic thio group, an amino group, an aliphatic amino group, an acylamino group, and a carbamoylamino group. As the aliphatic group represented by G, an aliphatic group containing a total of from 1 to 8 carbon atoms is preferred, and an alkyl group containing a total of from 1 to 4 carbon atoms is more preferred. Examples thereof include methyl, ethyl, vinyl, cyclohexyl, and carbamoylmethyl.

The aryl group represented by G may be a condensed ring, and may have a substituent. As a group which may be the substituent, any group that has been described hereinbefore in the aforesaid paragraph on substituents and that is substitutable may be employed, and preferred substituents are a nitro group, a halogen atom, an aliphatic oxy group, a carbamoyl group, an aliphatic oxycarbonyl group, an aliphatic thio group, an amino group, an aliphatic amino group, an acylamino group, and a carbamoylamino group. As the aryl group represented by $G_2$, an aryl group containing a total of from 6 to 12 carbon atoms is preferred, and an aryl group containing a total of from 6 to 10 carbon atoms is more preferred. Examples thereof include phenyl, 4-nitrophenyl, 4-acetylaminophenyl, and 4-methanesulfonylphenyl.

The heterocyclic group represented by G may have a substituent, may be saturated or unsaturated, and may be a condensed ring. As a group which may be the substituent, any group that has been described hereinbefore in the aforesaid paragraph on substituents and that is substitutable may be employed, and preferred substituents are a halogen atom, a hydroxyl group, an aliphatic oxy group, a carbamoyl group, an aliphatic oxycarbonyl group, an aliphatic thio group, an amino group, an aliphatic amino group, an acylamino group, and a carbamoylamino group. The heterocyclic group represented by $G_2$ is preferably a heterocyclic group containing a total of from 2 to 12 carbon atoms and being connected at a carbon atom, more preferably a 5- or 6-membered heterocyclic group containing a total of from 2 to 10 carbon atoms and being connected at a carbon atom. Examples thereof include 2-tetrahydrofuryl and 2-pyrimidyl.

The acyl group represented by G may be an aliphatic carbonyl group, an aryl carbonyl group, or a heterocyclic carbonyl group, and may have a substituent. As a group which may be the substituent, any group that has been described hereinbefore in the aforesaid paragraph on substituents and that is substitutable may be employed, and preferred substituents are a hydroxyl group, a halogen atom, an aryl group, an aliphatic oxy group, a carbamoyl group, an aliphatic oxycarbonyl group, an aliphatic thio group, an amino group, an aliphatic amino group, an acylamino group, and a carbamoylamino group. The acyl group represented by G is preferably an acyl group containing a total of from 2 to 8 carbon atoms, more preferably an acyl group containing a total of from 2 to 4 carbon atoms. Examples thereof include acetyl, propanoyl, benzoyl, and 3-pyridinecarbonyl.

The aliphatic oxycarbonyl group represented by G may be saturated or unsaturated, and may have a substituent. As a group which may be the substituent, any group that has been described hereinbefore in the aforesaid paragraph on substituents and that is substitutable may be employed, and preferred substituents are a hydroxyl group, an aliphatic oxy group, a carbamoyl group, an aliphatic oxycarbonyl group, an aliphatic thio group, an amino group, an aliphatic amino group, an acylamino group, and a carbamoylamino group. The aliphatic oxycarbonyl group represented by G is preferably an alkoxycarbonyl group containing a total of from 2 to 8 carbon atoms, more preferably an alkoxycarbonyl group containing a total of from 2 to 4 carbon atoms. Examples thereof include methoxycarbonyl, ethoxycarbonyl, and (t)-butoxycarbonyl.

The carbamoyl group represented by G may have a substituent. As a group which may be the substituent, any group that has been described hereinbefore in the aforesaid paragraph on substituents and that is substitutable may be employed, and preferred substituents are an aliphatic group, an aryl group, and a heterocyclic group. As the carbamoyl group which is represented by G and which may have a substituent, an unsubstituted carbamoyl group, an alkylcarbamoyl group containing a total of from 2 to 9 carbon atoms, and a carbamoyl group containing a total of from 7 to 11 carbon atoms are preferred, and an unsubstituted carbamoyl group and an alkylcarbamoyl group containing a total of from 2 to 5 carbon atoms are more preferred. Examples thereof include N-methylcarbamoyl, N,N-dimethylcarbamoyl, and N-phenylcarbamoyl.

The aliphatic sulfonyl group represented by G may be saturated or unsaturated, and may have a substituent. As a group which may be the substituent, any group that has been described hereinbefore in the aforesaid paragraph on substituents and that is substitutable may be employed, and preferred substituents are a hydroxyl group, an aryl group, an aliphatic oxy group, a carbamoyl group, an aliphatic oxycarbonyl group, an aliphatic thio group, an amino group, an aliphatic amino group, an acylamino group, and a carbamoylamino group. The aliphatic sulfonyl group represented by G is preferably an alkylsulfonyl group containing a total of from 1 to 6 carbon atoms, more preferably an alkylsulfonyl group containing a total of from 1 to 4 carbon atoms, and is exemplified by methanesulfonyl.

The arylsulfonyl group represented by G may have a substituent. As a group which may be the substituent, any group that has been described hereinbefore in the aforesaid paragraph on substituents and that is substitutable may be employed, and preferred substituents are a hydroxyl group, an aliphatic group, an aliphatic oxy group, a carbamoyl group, an aliphatic oxycarbonyl group, an aliphatic thio group, an amino group, an aliphatic amino group, an acylamino group, and a carbamoylamino group. The arylsulfonyl group represented by G is preferably an arylsulfonyl group containing a total of from 6 to 10 carbon atoms, and is exemplified by benzenesulfonyl.

G is preferably a hydrogen atom, an aliphatic group, an aryl group, or a heterocyclic group, more preferably a hydrogen atom. Because, it facilitates forming an intramolecular hydrogen bond or an intramolecular cross-linking hydrogen bond.

The amino group represented by $R_1$ may have a substituent. As a group which may be the substituent, any group that has been described hereinbefore in the aforesaid paragraph on substituents and that is substitutable may be employed, and preferred substituents are an aliphatic group, an aryl group, and a heterocyclic group.

These substituents may further have a substituent and, as such substituent, an aliphatic group, a hydroxyl group, and a substituent having, for example, an amido bond, an ether bond, an oxycarbonyl bond or a thioether bond are preferred, with substituents having a bond between a hetero atom and a hydrogen atom being more preferred in the point that they facilitate intramolecular mutual action such as intramolecular hydrogen bonding.

The amino group which is represented by $R_1$ and which may have a substituent is preferably an unsubstituted amino group, an alkylamino group containing a total of from 1 to 10 carbon atoms, a dialkylamino group containing a total of from 2 to 10 carbon atoms, an arylamino group containing a total of from 6 to 13 carbon atoms, or a saturated or unsaturated heterocyclic amino group containing a total of from 2 to 12 carbon atoms, more preferably an unsubstituted amino group, an alkylamino group containing a total of from 1 to 8 carbon atoms, an arylamino group containing a total of from 6 to 13 carbon atoms, or a saturated or unsaturated heterocyclic amino group containing a total of from 2 to 12 carbon atoms. Examples thereof include methylamino, N,N-dimethylamino, N-phenylamino, and N-(2-pyrimidyl)amino.

More preferred are an arylamino group optionally having a substituent and containing a total of from 6 to 13 carbon atoms and a saturated or unsaturated heterocyclic amino group optionally having a substituent and containing a total of from 2 to 12 carbon atoms.

In the case where $R_1$ is an arylamino group, the substituent on the aryl group is preferably at a p-position with respect to the amino group-bonding position and, most preferably, the aryl group is substituted only at the p-position. As the substituent, any group that has been described hereinbefore in the aforesaid paragraph on substituents and that is substitutable may be employed, and preferred substituents are an aliphatic group optionally having a substituent and containing a total of from 1 to 7 carbon atoms, more preferably from 1 to 4 carbon atoms (e.g., methyl, ethyl, allyl, (i)-propyl, or (t)-butyl), an aliphatic oxy group optionally having a substituent and containing a total of from 1 to 7 carbon atoms, more preferably from 1 to 4 carbon atoms (e.g., methoxy, ethoxy, (i)-propyloxy, or allyloxy), a halogen atom (e.g., fluorine, chlorine, or bromine), a carbamoyl group optionally having a substituent and containing a total of from 1 to 7 carbon atoms, more preferably from 1 to 4 carbon atoms (e.g., carbamoyl, N-phenylcarbamoyl, or N-methylcarbamoyl), a ureido group optionally having a substituent and containing a total of from 1 to 7 carbon atoms, more preferably from 1 to 4 carbon atoms (e.g., ureido, N-methylureido, N,N-dimethylureido, N-4-pyridylureido, or N-phenylureido), a nitro group, a heterocyclic group condensed with an aryl group containing a total of from 1 to 7 aryl group (e.g., imidazolone), a hydroxyl group, an aliphatic thio group optionally having a substituent and containing a total of from 1 to 7 carbon atoms, more preferably from 1 to 4 carbon atoms (e.g., methylthio, ethylthio, (i)-propylthio, allylthio, or (t)-butylthio), an acylamino group optionally having a substituent and containing a total of from 2 to 7 carbon atoms, more preferably from 2 to 4 carbon atoms (e.g., acetamino, propionylamino, pivaloylamino, or benzoylamino), an aliphatic oxycarbonylamino group optionally having a substituent and containing a total of from 1 to 7 carbon atoms, more preferably from 1 to 4 carbon atoms (e.g., methoxycarbonylamino or propyloxycarbonylamino), an aliphatic oxycarbonyl group optionally having a substituent and containing a total of from 2 to 7 carbon atoms, more preferably from 2 to 4 carbon atoms (e.g., methoxycarbonyl or ethoxycarbonyl), and an acyl group optionally having a substituent and containing a total of from 2 to 7 carbon atoms, more preferably from 2 to 4 carbon atoms (which may be an aliphatic carbonyl group, an aryl carbonyl group, or a heterocyclic carbonyl group, and may have a substituent; as the group which may be the substituent, any group that has been described hereinbefore in the aforesaid paragraph on substituents and that is substitutable may be employed; preferred substituents are acyl groups containing a total of from 2 to 7 carbon atoms, more preferably acyl groups containing a total of from 2 to 4 carbon atoms, and are exemplified by acetyl, propanoyl, benzoyl, and 3-pyridinecarbonyl).

In the case where the substituent on the aryl group is positioned at a p-position with respect to the amino group-binding position, the substituent exists at the end of the molecule, which serves to facilitate intramolecular mutual action such as intramolecular hydrogen bonding. Thus, there results a sharp hue. In the case where the substituent on the aryl group further has a substituent, the substituent is preferably an aliphatic group, a hydroxyl group, or a substituent having, for example, an amido bond, an ether bond, an oxycarbonyl bond or a thioether bond, with substituents having a bond between a hetero atom and a hydrogen atom being more preferred in the point that they facilitate intramolecular mutual action such as intramolecular hydrogen bonding.

In the case where $R_1$ is a heterocyclic amino group, any group that has been described hereinbefore in the aforesaid paragraph on substituents and that is substitutable may be employed as the substituent, and preferred substituents are those substituents which are the same as with the aforesaid arylamino group. In the case where the substituent on the heterocyclic group further has a substituent, the substituent is preferably an aliphatic group, a hydroxyl group, or a substituent having, for example, an amido bond, an ether bond, an oxycarbonyl bond or a thioether bond, with substituents having a bond between a hetero atom and a hydrogen atom being more preferred in the point that they facilitate intramolecular mutual action such as intramolecular hydrogen bonding.

In the case where $R_1$ is an arylamino group or a heterocyclic amino group, more preferred substituents are an aliphatic group, an aliphatic oxy group, a halogen atom, a carbamoyl group, a heterocyclic group condensed with the aryl group, and an aliphatic oxycarbonyl group. Still more preferred substituents are an aliphatic group containing a total of from 1 to 4 carbon atoms, an aliphatic oxy group containing a total of from 1 to 4 carbon atoms, a halogen atom, a carbamoyl group containing a total of from 1 to 4 carbon atoms, a nitro group, and an aliphatic oxycarbonyl group containing a total of from 2 to 4 carbon atoms.

The aliphatic oxy group represented by $R_1$ may have a substituent and may be saturated or unsaturated. As the substituent, any group that has been described hereinbefore in the aforesaid paragraph on substituents and that is substitutable may be employed, and preferred substituents are a hydroxyl group, an aliphatic oxy group, a carbamoyl group, an aliphatic oxycarbonyl group, an aliphatic thio group, an amino group, an aliphatic amino group, an acylamino group, and a carbamoylamino group. As the aliphatic oxy group of $R_1$, an alkoxy group containing a total of from 1 to 8 carbon atoms is preferred, an alkoxy group containing a total of from 1 to 4 carbon atoms is more preferred, and an alkoxy group containing a total of 1 or 2 is still more preferred. Examples thereof include methoxy, ethoxy, (t)-butoxy, methoxyethoxy, and carbamoylmethoxy.

The aliphatic group represented by $R_1$ may have a substituent and may be saturated or unsaturated. As the substituent, any group that has been described hereinbefore in the aforesaid paragraph on substituents and that is substitutable may be employed, and preferred substituents are a hydroxyl group, an aliphatic oxy group, a carbamoyl group, an aliphatic oxycarbonyl group, an aliphatic thio group, an amino group, an aliphatic amino group, an acylamino group, and a carbamoylamino group. As the aliphatic group of $R_1$, an alkyl group containing a total of from 1 to 8 carbon atoms is preferred, and an alkyl group containing a total of from 1 to 4 carbon atoms is more preferred. Examples thereof include methyl, ethyl, (s)-butyl, methoxyethyl, and carbamoylmethyl.

The aryl group represented by $R_1$ may have a substituent. As the substituent, any group that has been described hereinbefore in the aforesaid paragraph on substituents and that is substitutable may be employed, and preferred substituents are an aliphatic group, an aliphatic oxy group, a halogen atom, a carbamoyl group, a heterocyclic group condensed with the aryl group, and an aliphatic oxycarbonyl group. The aryl group of $R_1$ is preferably an aryl group containing a total of from 6 to 12 carbon atoms, more preferably an aryl group containing a total of from 6 to 10 carbon atoms. Examples thereof include phenyl, 4-methylphenyl, and 3-chlorophenyl.

The heterocyclic group represented by $R_1$ may be a saturated heterocyclic group or an unsaturated heterocyclic group, may have a substituent, and may be condensed with other ring. As the substituent, any group that has been described hereinbefore in the aforesaid paragraph on substituents and that is substitutable may be employed, and preferred substituents are an aliphatic group, an aliphatic oxy group, a carbamoyl group, a heterocyclic group condensed with the heterocyclic group, and an aliphatic oxycarbonyl group. The heterocyclic group represented by $R_1$ is preferably a heterocyclic group containing a total of from 2 to 10 carbon atoms, more preferably a saturated heterocyclic group containing a total of from 2 to 8 carbon atoms and being connected through a nitrogen atom. Examples thereof include 1-piperidyl, 4-morpholinyl, 2-pyrimidyl, and 4-pyridyl.

$R_1$ is preferably an amino group which may have a substituent, an aliphatic oxy group, or a saturated heterocyclic group connected through a nitrogen atom, more preferably an amino group which may have a substituent or an aliphatic oxy group, still more preferably an amino group which may have a substituent, particularly preferably an alkylamino group or an arylamino group. The alkylamino group or arylamino group may further have a substituent and, as the substituent in the case where the alkylamino group or arylamino group has a substituent, an alkoxy group is preferred.

The substituent represented by $R_2$ may be any group that has been described hereinbefore in the aforesaid paragraph on substituents and that is substitutable may be employed, and preferred substituents are an aliphatic group, an aryl group, a heterocyclic group, an aliphatic oxycarbonyl group, a carboxyl group, a carbamoyl group which may have a substituent, an acylamino group, a sulfonamido group, a carbamoylamino group which may have a substituent, a sulfamoyl group which may have a substituent, an aliphatic oxy group, an aliphatic thio group, a cyano group, a halogen atom, and a hydroxyl group, more preferred substituents are an aliphatic oxycarbonyl group, a carbamoyl group which may have a substituent, an acylamino group, a carbamoyl group which may have a substituent, an aliphatic oxy group, and a halogen atom, with an aliphatic oxy group being most preferred.

In the case where these substituents further have a substituent, an aliphatic group, a hydroxyl group, and a substituent having, for example, an amido bond, an ether bond, an oxycarbonyl bond or a thioether bond are preferred, with substituents having a bond between a hetero atom and a hydrogen atom being more preferred in the point that they facilitate intramolecular mutual action such as intramolecular hydrogen bonding.

The aliphatic group represented by $R_2$ may have a substituent, and may be saturated or unsaturated and, as a group which may be the substituent, any group that has been described hereinbefore in the aforesaid paragraph on substituents and that is substitutable may be employed. The aliphatic group of $R_2$ is preferably an alkyl group containing a total of from 1 to 8 carbon atoms, more preferably an alkyl group containing a total of from 1 to 6 carbon atoms, and examples thereof include methyl, ethyl, i-propyl, cyclohexyl, and t-butyl.

The aryl group represented by $R_2$ may have a substituent and, as a group which may be the substituent, any group that has been described hereinbefore in the aforesaid paragraph on substituents and that is substitutable may be employed. The aryl group of $R_2$ is preferably an aryl group containing a total of from 6 to 12 carbon atoms, more preferably an aryl group containing a total of from 6 to 10 carbon atoms, and examples thereof include phenyl, 3-methoxyphenyl, and 4-carbamoylphenyl.

The heterocyclic group represented by $R_2$ may have a substituent, may be saturated or unsaturated, and may be condensed with other ring. As a group which may be the substituent, any group that has been described hereinbefore in the aforesaid paragraph on substituents and that is substitutable may be employed. The heterocyclic group of $R_2$ is preferably a heterocyclic group containing a total of from 2 to 16 carbon atoms, more preferably a 5- or 6-membered heterocyclic ring containing a total of from 2 to 12 carbon atoms. Examples thereof include 1-pyrrolidinyl, 4-morpholinyl, 2-pyridyl, 1-pyrrolyl, 1-imidazolyl, and 1-benzimidazolyl.

The aliphatic oxycarbonyl group represented by $R_2$ may have a substituent and may be saturated or unsaturated. As a group which may be the substituent, any group that has been described hereinbefore in the aforesaid paragraph on substituents and that is substitutable may be employed. The aliphatic oxycarbonyl group of $R_2$ is preferably an alkoxycarbonyl group containing a total of from 1 to 8 carbon atoms, more preferably an alkoxycarbonyl group containing a total of from 1 to 6 carbon atoms. Examples thereof include methoxycarbonyl, i-propyloxycarbonyl, and carbamoylmethoxycarbonyl.

The carbamoyl group represented by $R_2$ may have a substituent and, as a group which may be the substituent, any group that has been described hereinbefore in the aforesaid paragraph on substituents and that is substitutable may be employed. The substituent may be an aliphatic group, an aryl group, or a heterocyclic group. The carbamoyl group of $R_2$ which may have a substituent is preferably a carbamoyl group, an alkylcarbamoyl group containing a total of from 2 to 9 carbon atoms, a dialkylcarbamoyl group containing a total of from 3 to 10 carbon atoms, an arylcarbamoyl group containing a total of from 7 to 13 carbon atoms, or a heterocyclic carbamoyl group containing a total of from 3 to 12 carbon atoms, more preferably a carbamoyl group, an alkylcarbamoyl group containing a total of from 2 to 7 carbon atoms, a dialkylcarbamoyl group containing a total of from 3 to 6 carbon atoms, an arylcarbamoyl group containing a total of from 7 to 11 carbon atoms, or a heterocyclic carbamoyl group containing a total of from 3 to 10 carbon atoms. Examples thereof include carbamoyl, methylcarbamoyl, dimethylcarbamoyl, phenylcarbamoyl, and 4-pyridinecarbamoyl.

The acylamino group represented by $R_2$ may have a substituent and may be aliphatic, aromatic, or heterocyclic and, as a group which may be the substituent, any group that has been described hereinbefore in the aforesaid paragraph on substituents and that is substitutable may be employed. The acylamino group of $R_2$ is preferably an acylamino group containing a total of from 2 to 12 carbon atoms, more preferably an acylamino group containing a total of from 2 to 8 carbon atoms, still more preferably an alkylcarbonylamino group containing a total of from 2 to 8 carbon atoms. Examples thereof include acetylamino, benzoyl amino, 2-pyridinecarbonylamino, and propanoylamino.

The sulfonamido group represented by $R_2$ may have a substituent and may be aliphatic, aromatic, or heterocyclic and, as a group which may be the substituent, any group that has been described hereinbefore in the aforesaid paragraph on substituents and that is substitutable may be employed. The sulfonamido group of $R_2$ is preferably a sulfonamido group containing a total of from 1 to 12 carbon atoms, more preferably a sulfonamido group containing a total of from 1 to 8 carbon atoms, still more preferably an alkylsulfonamido group containing a total of from 1 to 8 carbon atoms. Examples thereof include methanesulfonamido, benzenesulfonamido, and 2-pyridinesulfonamido.

The carbamoylamino group represented by $R_2$ may have a substituent and, as a group which may be the substituent, any group that has been described hereinbefore in the aforesaid paragraph on substituents and that is substitutable may be employed. The substituent is preferably an aliphatic group, an aryl group, or a heterocyclic group. The carbamoylamino group of $R_2$ which may have a substituent is preferably a carbamoylamino group, an alkylcarbamoylamino group containing a total of from 2 to 9 carbon atoms, a dialkylcarbamoylamino group containing a total of from 3 to 10 carbon atoms, an arylcarbamoylamino group containing a total of from 7 to 13 carbon atoms, or a heterocyclic carbamoylamino group containing a total of from 3 to 12 carbon atoms, more preferably a carbamoylamino group, an alkylcarbamoylamino group containing a total of from 2 to 7 carbon atoms, a dialkylcarbamoylamino group containing a total of from 3 to 6 carbon atoms, an arylcarbamoylamino group containing a total of from 7 to 11 carbon atoms, or a heterocyclic carbamoylamino group containing a total of from 3 to 10 carbon atoms. Examples thereof include carbamoylamino, methylcarbamoylamino, N,N-dimethylcarbamoylamino, phenylcarbamoylamino, and 4-pyridinecarbamoylamino.

With the sulfamoyl group which is represented by $R_2$ and which may have a substituent, the substituent may be any group that has been described hereinbefore in the aforesaid paragraph on substituents and that is substitutable. The substituent is preferably an aliphatic group, an aryl group, or a heterocyclic group. The sulfamoyl group of $R_2$ which may have a substituent is preferably a sulfamoyl group, an alkylsulfamoyl group containing a total of from 1 to 9 carbon atoms, a dialkylsulfamoyl group containing a total of from 2 to 10 carbon atoms, an arylsulfamoyl group containing a total of from 7 to 13 carbon atoms, or a heterocyclic sulfamoyl group containing a total of from 2 to 12 carbon atoms, more preferably a sulfamoyl group, an alkylsulfamoyl group containing a total of from 1 to 7 carbon atoms, a dialkylsulfamoyl group containing a total of from 3 to 6 carbon atoms, an arylsulfamoyl group containing a total of from 6 to 11 carbon atoms, or a heterocyclic sulfamoyl group containing a total of from 2 to 10 carbon atoms. Examples thereof include sulfamoyl, methylsulfamoyl, N,N-dimethylsulfamoyl, phenylsulfamoyl, and 4-pyridinesulfamoyl.

The aliphatic oxy group represented by $R_2$ may have a substituent and may be saturated or unsaturated and, as a group which may be the substituent, any group that has been described hereinbefore in the aforesaid paragraph on substituents and that is substitutable may be employed. The aliphatic oxy group of $R_2$ is preferably an alkoxy group containing a total of from 1 to 8 carbon atoms, more preferably an alkoxy group containing a total of from 1 to 6 carbon atoms, and examples thereof include methoxy, ethoxy, i-propyloxy, cyclohexyloxy, and methoxyethoxy.

The aliphatic thio group represented by $R_2$ may have a substituent and may be saturated or unsaturated and, as a group which may be the substituent, any group that has been described hereinbefore in the aforesaid paragraph on substituents and that is substitutable may be employed. The aliphatic thio group of $R_2$ is preferably an alkyl thio group containing a total of from 1 to 8 carbon atoms, more preferably an alkyl thio group containing a total of from 1 to 6 carbon atoms, and examples thereof include methylthio, ethylthio, carbamoylmethylthio, and t-butylthio.

The halogen atom represented by $R_2$ is preferably a fluorine atom, a chlorine atom, or a bromine atom, more preferably a chlorine atom.

In view of the effect of the invention, $R_2$ is preferably an aliphatic oxy group, an aliphatic oxycarbonyl group, or a carbamoyl group which may have a substituent, more preferably an aliphatic oxy group.

The aromatic 5- or 6-membered heterocyclic group represented by A may be condensed with other ring or may be monocyclic, and the other ring may be carbocyclic, heterocyclic, aromatic, or non-aromatic. The heterocyclic group is preferably an aromatic 5- or 6-membered ring containing from 1 to 3 hetero atoms. The aromatic 5- or 6-membered heterocyclic group which is represented by A and which may be condensed with other ring preferably contains a total of from 2 to 15 carbon atoms, more preferably from 2 to 10 carbon atoms. Examples thereof include a pyridine ring, a pyrazine ring, a pyrimidine ring, a pyridazine ring, a triazine ring, a pyrrole ring, a furan ring, a thiophene ring, an imidazole ring, a pyrazole ring, an oxazole ring, a thiazole ring, an isoxazole ring, an isothiazole ring, a triazole ring, a thiadiazole ring, an oxadiazole ring, and a condensed heterocyclic group wherein one of these groups is condensed with a benzene ring derivative or a heterocyclic derivative.

m is preferably from 0 to 3, more preferably from 0 to 1, still more preferably 0. n is preferably 1 or 2.

Azo pigments represented by the general formula (1) are preferably azo pigments represented by the following general formula (2-1).

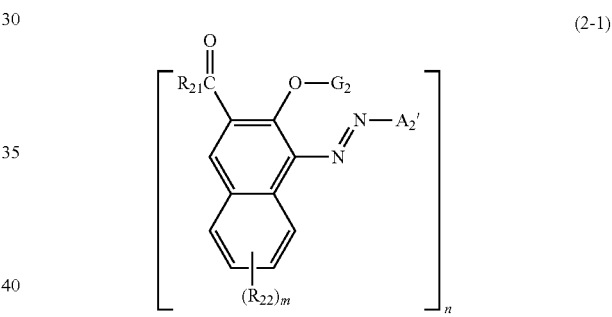

(2-1)

In the general formula (2-1), $G_2$ represents a hydrogen atom, an aliphatic group, an aryl group, or a heterocyclic group, $R_{21}$ represents an amino group, an aliphatic oxy group, an aliphatic group, an aryl group, or a heterocyclic group, and $R_{22}$ represents a substituent. $A_2'$ represents the following general formulae (A-1) to (A-18), (A-20) to (A-28), or (A-30) to (A-32). m and n are the same as are defined with respect to the general formula (1). When n=2, the general formula (2-1) represents a dimer formed through $R_{21}$, $R_{22}$, $G_2$, or $A_2'$. When n=3, the general formula represents a trimer formed through $R_{21}$, $R_{22}$, $G_2$, or $A_2'$. When n=4, the general formula represents a tetramer formed through $R_{21}$, $R_{22}$, $G_2$, or $A_2'$. The general formula (2-1) does not contain any ionic hydrophilic group.

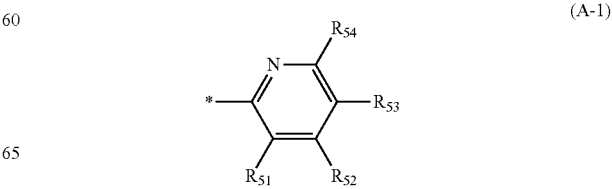

(A-1)

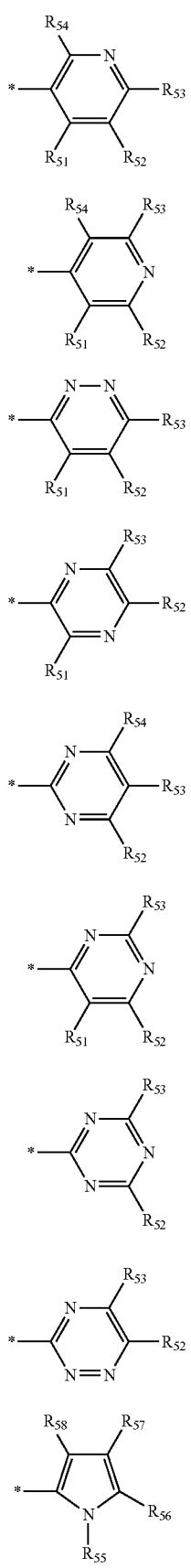
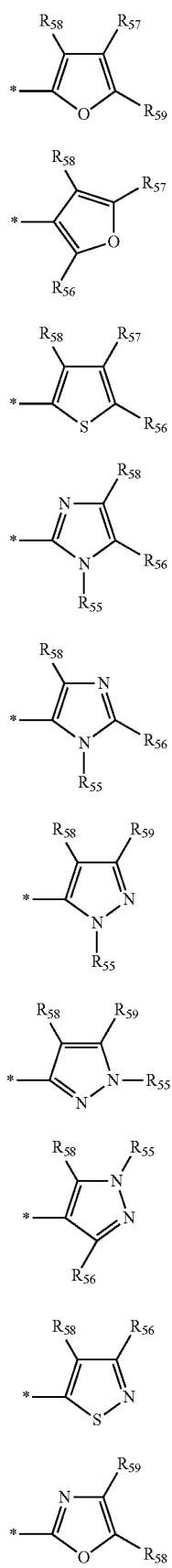

(A-22) [structure: isoxazole with $R_{58}$, $R_{56}$]

(A-23) [structure: isoxazole isomer with $R_{58}$, $R_{56}$]

(A-24) [structure: isoxazole with $R_{58}$, $R_{56}$]

(A-25) [structure: 1,2,4-triazole with $R_{56}$, $R_{55}$]

(A-26) [structure: 1,2,4-triazole isomer with $R_{56}$, $R_{55}$]

(A-27) [structure: 1,2,4-triazole with $R_{56}$, $R_{55}$]

(A-28) [structure: 1,3,4-thiadiazole with $R_{56}$]

(A-30) [structure: 1,3,4-oxadiazole with $R_{56}$]

(A-31) [structure: 1,2,4-oxadiazole with $R_{56}$]

(A-32) [structure: thiophene with $R_{57}$, $R_{56}$, $R_{58}$]

In the general formulae (A-1) to (A-18), (A-20) to (A-28), and (A-30) to (A-32), $R_{51}$ to $R_{59}$ each represents a hydrogen atom or a substituent, and adjacent substituents may be connected to each other to form a 5- or 6-membered ring. * shows the position connected to the azo group in the general formula (2-1).

The aliphatic group, aryl group, and heterocyclic group represented by $G_2$ are the same as are described for G in the general formula (1). In view of the effects of the invention, $G_2$ is preferably a hydrogen atom.

The amino group, aliphatic oxy group, aliphatic group, aryl group, and heterocyclic group represented by $R_{21}$ are the same as described with respect to $R_1$ in the general formula (1). In view of the effects of the invention, $R_{21}$ is preferably an amino group which may have a substituent or a saturated heterocyclic group connected through the nitrogen atom, more preferably an amino group which may have a substituent.

The substituent represented by $R_{22}$ is the same as is described for $R_2$ in the general formula (1).

The general formulae (A-1) to (A-18), (A-20) to (A-28), and (A-30) to (A-32) represented by $A_2$' will be described.

The substituents represented by $R_{51}$ to $R_{54}$ may be any group that has been described hereinbefore in the aforesaid paragraph on substituents and that is substitutable may be employed. The substituent of $R_{51}$ to $R_{54}$ is preferably an aliphatic group, an aryl group, a heterocyclic group, an aliphatic oxycarbonyl group, a carbamoyl group which may have a substituent, an acylamino group, a sulfonamido group, an aliphatic oxy group, an aliphatic thio group, a cyano group, or the like, more preferably an aliphatic group, an aliphatic oxycarbonyl group, a carbamoyl group which may have a substituent, an aliphatic oxy group, a cyano group, or the like.

In view of the effects of the invention, $R_{51}$ to $R_{54}$ each is preferably a hydrogen atom, an aliphatic group, an aryl group, a heterocyclic group, an aliphatic oxycarbonyl group, a carbamoyl group which may have a substituent, an acylamino group, a sulfonamido group, an aliphatic oxy group, an aliphatic thio group, a cyano group, or the like, more preferably a hydrogen atom, an aliphatic group, an aliphatic oxycarbonyl group, a carbamoyl group which may have a substituent, an aliphatic oxy group, or a cyano group.

The substituent represented by $R_{55}$ may be any group that has been described hereinbefore in the aforesaid paragraph on substituents and that is substitutable may be employed. The substituent of $R_{55}$ is preferably an aliphatic group, an aryl group, a heterocyclic group, or the like, more preferably an aliphatic group, an aryl group, or an aromatic 5- or 6-membered heterocyclic group containing a nitrogen atom at a position adjacent to the position connected to the nitrogen atom.

In view of the effects of the invention, $R_{55}$ is preferably an aliphatic group, an aryl group, or a heterocyclic group, more preferably an aliphatic group, an aryl group, or an aromatic 5- or 6-membered heterocyclic group containing a nitrogen atom at a position adjacent to the position connected to the nitrogen atom, still more preferably an aromatic 5- or 6-membered heterocyclic group containing a nitrogen atom at a position adjacent to the position connected to the nitrogen atom. When $R_{55}$ is an aromatic 5- or 6-membered heterocyclic group containing a nitrogen atom at a position adjacent to the position connected to the nitrogen atom, not only the intermolecular mutual action of the colorant molecules but the intramolecular mutual action is easily strengthened. This is favorable in the point that it facilitates formation of a pigment having a stable molecular arrangement, which serves to show good hue and high fastness (light fastness, gas fastness, heat fastness, water fastness, etc.).

The aromatic 5- or 6-membered heterocyclic group containing a nitrogen atom at a position adjacent to the position connected to the nitrogen atom, which is preferred as $R_{55}$ in view of the effects of the invention, may have a substituent and, as a group which may be the substituent, any group that has been described hereinbefore in the aforesaid paragraph on substituents and that is substitutable may be employed. Preferred substituents are a hydroxyl group, an aliphatic oxy group, a carbamoyl group, an aliphatic oxycarbonyl group, an aliphatic thio group, an amino group, an aliphatic amino group, an acylamino group, and a carbamoylamino group. The heterocyclic group may be a saturated heterocyclic group or an unsaturated heterocyclic group, or may be a condensed heterocyclic group, and is preferably an aromatic 5- or 6-membered heterocyclic group containing a nitrogen atom at a position adjacent to the position connected to the nitrogen atom and containing a total of from 2 to 12 carbon atoms, more preferably an aromatic 5- or 6-membered heterocyclic group containing a nitrogen atom at a position adjacent to the position connected to the nitrogen atom and containing a total of from 2 to 10 carbon atoms. Examples thereof include a 2-thiazolyl group, a 2-benzothiazolyl group, a 2-oxazolyl group, a 2-benzoxazolyl group, a 2-pyridyl group, a 2-pyrazinyl group, a 3-pyridazinyl group, a 2-pyrimidinyl group, a 4-pyrimidinyl group, a 2-imidazolyl group, a 2-benzimidazolyl group, and a 2-triazinyl group. These heterocyclic groups may have a tautomer structure together with the substituent.

The aryl group preferred as $R_{55}$ in view of the effects of the invention may have a substituent and, as a group which may be the substituent, any group that has been described hereinbefore in the aforesaid paragraph on substituents and that is substitutable may be employed. Preferred substituents are a hydroxyl group, a nitro group, an aliphatic oxy group, a carbamoyl group, an aliphatic oxycarbonyl group, an aliphatic thio group, an amino group, an aliphatic amino group, an acylamino group, and a carbamoylamino group. The aryl group of $R_{55}$ is preferably an aryl group containing a total of from 6 to 12 carbon atoms, more preferably an aryl group containing a total of from 6 to 10 carbon atoms. Examples thereof include phenyl, 3-methoxyphenyl, 4-carbamoylphenyl, etc., with a phenyl group being preferred.

The aliphatic group preferred as $R_{55}$ in view of the effects of the invention may have a substituent, may be saturated or unsaturated and, as a group which may be the substituent, any group that has been described hereinbefore in the aforesaid paragraph on substituents and that is substitutable may be employed. Preferred substituents are a hydroxyl group, an aliphatic oxy group, a carbamoyl group, an aliphatic oxycarbonyl group, an aliphatic thio group, an amino group, an aliphatic amino group, an acylamino group, and a carbamoylamino group. The aliphatic group of $R_{55}$ is preferably an alkyl group containing a total of from 1 to 8 carbon atoms, more preferably an alkyl group containing a total of from 1 to 4 carbon atoms. Examples thereof include a methyl group, an ethyl group, a vinyl group, a cyclohexyl group, a carbamoylmethyl group, etc.

In the general formula (2-1), $R_{55}$ is preferably any one of the following (Y-1) to (Y-13) and, in order to form a structure which easily forms an intramolecular hydrogen bond structure, any one of the 6-membered following (Y-1) to (Y-6) is more preferred, any one of the following (Y-1), (Y-3), (Y-4), and (Y-6) is still more preferred, and the following (Y-1) or (Y-4) is particularly preferred. * in the general formulae (Y-1) to (Y-13) shows the point of attachment to the N atom of the pyrazole ring. $Y_1$ to $Y_{11}$ each represents a hydrogen atom or a substituent. $G_{11}$ in (Y-13) represents non-metallic atoms capable of forming a 5- or 6-membered heterocyclic ring. The heterocyclic ring represented by $G_{11}$ may be unsubstituted or may have a substituent, and may be a monocyclic ring or a condensed ring. Formulae (Y-1) to (Y-13) may have a tautomer structure together with the substituent.

As the heterocyclic ring represented by $G_{11}$, there can be illustrated, for example, a heterocyclic ring containing a total of from 2 to 15 carbon atoms, preferably a total of from 2 to 10 carbon atoms. Examples thereof include a pyridine ring, a pyrazine ring, a pyrimidine, ring, a pyridazine ring, a triazine ring, a pyrrole ring, a furan ring, a thiophene ring, an imidazole ring, a pyrazole ring, an oxazole ring, a thiazole ring, an isoxazole ring, an isothiazole ring, a triazole ring, a thiadiazole ring, and an oxadiazole ring, with a pyridine ring, a pyrrole ring, and a thiophene ring being preferred.

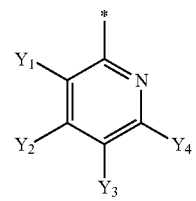

(Y-1)

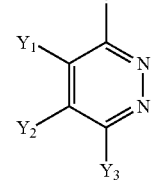

(Y-2)

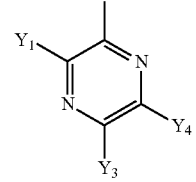

(Y-3)

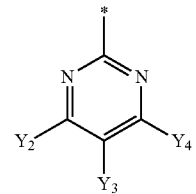

(Y-4)

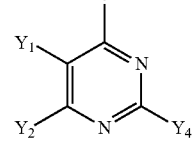

(Y-5)

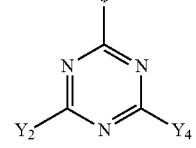

(Y-6)

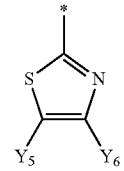

(Y-7)

-continued

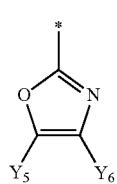
(Y-8)

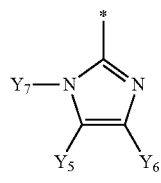
(Y-9)

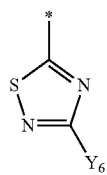
(Y-10)

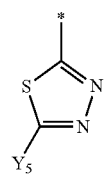
(Y-11)

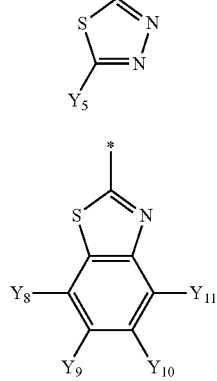
(Y-12)

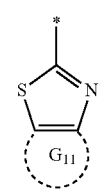
(Y-13)

In view of the effects of the invention, $Y_1$ to $Y_{11}$ each is preferably a hydrogen atom, an aliphatic group, an aryl group, a heterocyclic group, an aliphatic oxycarbonyl group, a carbamoyl group which may have a substituent, an acylamino group, a sulfonamido group, an aliphatic oxy group, an aliphatic thio group, a cyano group, or the like, more preferably a hydrogen atom, an aliphatic group, an aliphatic oxycarbonyl group, a carbamoyl group which may have a substituent, an aliphatic oxy group, or a cyano group.

As the substituent represented by $R_{56}$, $R_{57}$, or $R_{59}$, any group that has been described hereinbefore in the aforesaid paragraph on substituents and that is substitutable may be employed. The substituents of $R_{56}$, $R_{57}$, and $R_{59}$ are preferably an aliphatic group, an aryl group, a heterocyclic group, an aliphatic oxycarbonyl group, a carbamoyl group which may have a substituent, an acylamino group, a sulfonamido group, an aliphatic oxy group, an aliphatic thio group, a cyano group, etc., more preferably an aliphatic group, an aliphatic oxy group, an aliphatic thio group, a cyano group, etc.

In view of the effects of the invention, $R_{56}$, $R_{57}$, and $R_{59}$ each is preferably a hydrogen atom, an aliphatic group, an aryl group, a heterocyclic group, an aliphatic oxycarbonyl group, a carbamoyl group which may have a substituent, an acylamino group, a sulfonamido group, an aliphatic oxy group, an aliphatic thio group, a cyano group, etc., more preferably a hydrogen atom, an aliphatic group, an aliphatic oxy group, an aliphatic thio group, or a cyano group.

As the substituent represented by $R_{58}$, any group that has been described hereinbefore in the aforesaid paragraph on substituents and that is substitutable may be employed. In view of the effects of the invention, $R_{58}$ is preferably a heterocyclic group or an electron-withdrawing group having a Hammett substituent σp value of 0.2 or more, more preferably an electron-withdrawing group having a Hammett substituent σp value of 0.3 or more. With the electron-withdrawing group, the upper limit of the Hammett substituent σp value is 1.0 or less. As long as $R_{58}$ has a σp value within this range, the pigment can be synthesized in the similar manner, and there can be obtained similar effects with respect to hue wavelength shift toward longer wavelength side.

Specific examples of $R_{58}$ having a σp value of 0.2 or more include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanato group, a thiocarbonyl group, a halogenated alkyl group, a halogenated alkoxy group, a halogenated aryloxy group, a halogenated alkylamino group, a halogenated alkylthio group, an aryl group substituted with other electron-withdrawing group having a σp value of 0.2 or more, a heterocyclic group, a halogen atom, an azo group, and a selenocyanato group.

In view of the effects of the invention, the pigment represented by the general formula (2-1) is preferably a pigment wherein $G_2$ represents a hydrogen atom, $R_{21}$ represents an amino group which may have a substituent or represents a saturated heterocyclic group connected at the nitrogen atom, m is 0 or 1 and, when m is 1, $R_{22}$ represents an aliphatic oxycarbonyl group or a carbamoyl group which may have a substituent, $A_2'$ represents any one of (A-1), (A-10) to (A-17), (A-20) to (A-23), (A-27), (A-28), and (A-30) to (A-32), and n is 1 or 2, more preferably a pigment wherein $G_2$ represents a hydrogen atom, $R_{21}$ represents an amino group which may have a substituent or represents a saturated heterocyclic group connected at the nitrogen atom, m is 0 or 1 and, when m is 1, $R_{22}$ represents an aliphatic oxycarbonyl group or a carbamoyl group which may have a substituent, $A_2'$ represents any one of (A-10), (A-11), (A-13) to (A-17), (A-20), (A-22) to (A-23), (A-27), (A-28), and (A-30) to (A-32), and n is 1 or 2, still more preferably a pigment wherein $G_2$ represents a hydrogen atom, $R_{21}$ represents an amino group which may have a substituent or represents a saturated heterocyclic group connected at the nitrogen atom, m is 0, $A_2'$ represents any one of (A-10), (A-11), (A-13) to (A-17), (A-20), (A-22) to (A-23), (A-27), (A-28), and (A-30) to (A-32), and n is 1 or 2, particularly preferably a pigment wherein $G_2$ represents a hydrogen atom, $R_{21}$ represents an amino group which may have a substituent, m is 0, $A_2'$ represents any one of (A-16) to (A-17), (A-20), (A-28), and (A-32), and n is 1 or 2, most preferably a pigment wherein $G_2$ represents a hydrogen atom, $R_{21}$ represents an amino group which may have a substituent, m is 0, $A_2'$ represents (A-16), and n is 1 or 2.

In one embodiment, the azo pigment represented by the foregoing general formula (2-1) is preferably a pigment wherein $A_2'$ is (A-10), (A-14) to (A-16), (A-25) or (A-26), more preferably a pigment wherein $A_2'$ is (A-10), (A-14) to (A-16), or (A-26), still more preferably a pigment wherein $A_2'$ is (A-16).

In view of the effects of the invention, the azo pigments represented by the general formulae (1) and (2-1) are preferably azo pigments represented by the following general formula (3).

The azo pigments represented by the general formula (3), and the tautomers, salts, and hydrates thereof will be described in detail below.

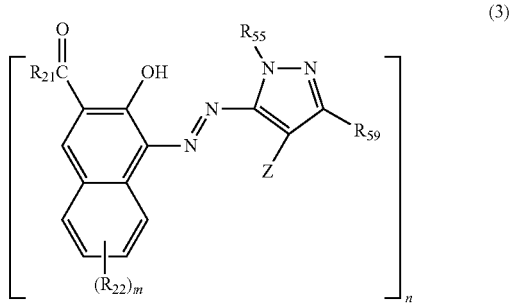

(3)

In the general formula (3), $R_{21}$, $R_{22}$, $R_{55}$, $R_{59}$, m, and n are the same as those defined with respect to the general formula (2-1). Z represents an electron-withdrawing group having a Hammett σp value of 0.2 or more. When n=2, the general formula (3) represents a dimer formed through $R_{21}$, $R_{22}$, $R_{55}$, $R_{59}$, or Z. When n=3, the general formula (3) represents a trimer formed through $R_{21}$, $R_{22}$, $R_{55}$, $R_{59}$, or Z. When n=4, the general formula (3) represents a tetramer formed through $R_{21}$, $R_{22}$, $R_{55}$, $R_{59}$, or Z. The general formula (3) does not have any ionic hydrophilic group.

As the substituent represented by Z and having a Hammett σp value of 0.2 or more, there are illustrated those groups which have been mentioned in the description on $R_{58}$ in the general formula (2-1).

Preferred substituents or scopes of $R_{21}$, $R_{22}$, $R_{55}$, $R_{59}$, m, and n in the pigments represented by the general formula (3) are the same as those in the general formula (2-1).

In view of the effects of the invention, Z is preferably an acyl group, a carbamoyl group, an alkyloxycarbonyl group, a cyano group, an alkylsulfonyl group, or a sulfamoyl group, more preferably a carbamoyl group, an alkyloxycarbonyl group, or a cyano group, most preferably a cyano group.

In view of the effects of the invention, the pigment represented by the general formula (3) is a pigment wherein $R_{21}$ represents an amino group which may have a substituent or represents a saturated heterocyclic group connected at the nitrogen atom, m is 0 or 1 and, when m is 1, $R_{22}$ represents an aliphatic oxycarbonyl group or a carbamoyl group which may have a substituent, $R_{55}$ represents an aromatic 5- or 6-membered heterocyclic group containing a nitrogen atom at a position adjacent to the position connected to the nitrogen atom, $R_{59}$ represents a hydrogen atom or an aliphatic group, Z represents an acyl group, a carbamoyl group, an alkyloxycarbonyl group, a cyano group, an alkylsulfonyl group, or a sulfamoyl group, and n represents 1 or 2, more preferably a pigment wherein $R_{21}$ represents an amino group which may have a substituent or represents a saturated heterocyclic group connected at the nitrogen atom, m is 0, $R_{55}$ is any one of (Y-1) to (Y-13), $R_{59}$ represents a hydrogen atom or an aliphatic group, Z represents a carbamoyl group, an alkyloxycarbonyl group, or a cyano group, and n represents 1 or 2, still more preferably a pigment wherein $R_{21}$ represents an amino group which may have a substituent, m is 0, $R_{55}$ is any one of (Y-1) to (Y-6), $R_{59}$ represents a hydrogen atom or an aliphatic group, Z represents a carbamoyl group, an alkyloxycarbonyl group, or a cyano group, and n represents 1 or 2, yet more preferably a pigment wherein $R_{21}$ represents an amino group which may have a substituent, m is 0, $R_{55}$ is any one of (Y-1), (Y-4), and (Y-6), $R_{59}$ represents a hydrogen atom, Z represents a cyano group, and n represents 1 or 2.

In view of the effects of the invention, the pigment represented by the general formula (1) is preferably a pigment which has a "total carbon number/azo group number" ratio of 40 or less, more preferably 30 or less. In view of the effects of the invention, the pigment represented by the general formula (1) is preferably a pigment which has a "molecular weight/azo group number" ratio of 700 or less. In view of the effects of the invention, the pigment represented by the general formula (1) is preferably a pigment which does not have an ionic substituent such as a sulfo group or a carboxyl group.

In another embodiment, the azo pigment represented by the foregoing general formula (2-1) is preferably a pigment wherein $A_2'$ is (A-1) to (A-9), (A-11) to (A-13), (A-17), (A-20) to (A-23), (A-27), (A-28), or (A-30) to (A-32), more preferably a pigment wherein $A_2'$ is (A-11) to (A-13), (A-17), (A-20) to (A-23), (A-27), (A-28), or (A-30) to (A-32), still more preferably a pigment wherein $A_2'$ is (A-17), (A-20), (A-22) to (A-23), (A-27), (A-28), (A-31), or (A-32), still more preferably a pigment wherein $A_2'$ is (A-20), (A-28), or (A-32), most preferably a pigment wherein $A_2'$ is (A-20). Also, $R_{56}$ in (A-20) is particularly preferably $R_{59}$.

The azo pigments represented by the general formula (1) are preferably azo pigments represented by the following general formula (2-2), and the tautomers, salts, and hydrates thereof.

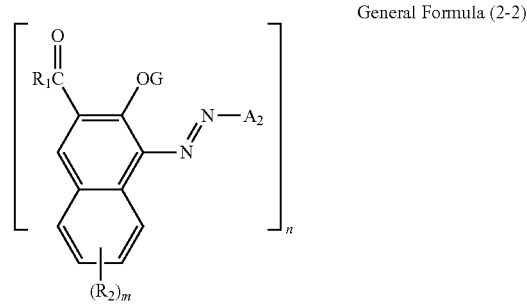

General Formula (2-2)

In the general formula (2-2), G represents a hydrogen atom, an aliphatic group, an aryl group, a heterocyclic group, an acyl group, an aliphatic oxycarbonyl group, a carbamoyl group, an aliphatic sulfonyl or aryl sulfonyl group, $R_1$ represents an amino group, an aliphatic oxy group, an aliphatic group, an aryl group, or a heterocyclic group, $R_2$ represents a substituent, and $A_2$ represents any one of the following formulae (A-17), (A-18), (A-20), (A-22) to (A-24), (A-27), (A-28), (A-31), and (A-32). m represents an integer of from 0 to 5, and n represents an integer of from 1 to 4. When n=2, the general formula (2-2) represents a dimer formed through $R_1$, $R_2$, or $A_2$. When n=3, the general formula represents a trimer formed through $R_1$, $R_2$, or $A_2$. When n=4, the general formula represents a tetramer formed through $R_1$, $R_2$, or $A_2$. The general formula (2-2) does not have any ionic hydrophilic group.

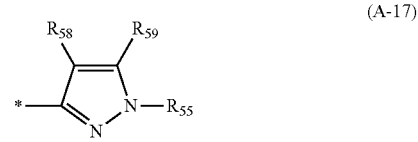

(A-17)

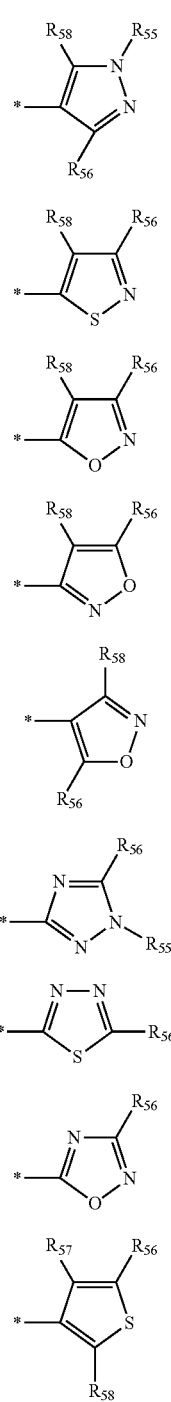

(A-18)

(A-20)

(A-22)

(A-23)

(A-24)

(A-27)

(A-28)

(A-31)

(A-32)

In the general formulae (A-17), (A-18), (A-20), (A-22) to (A-24), (A-27), (A-28), (A-31), and (A-32), $R_{55}$ to $R_{59}$ each represents a hydrogen atom or a substituent. Adjacent $R_{51}$ and $R_{52}$, $R_{52}$ and $R_{53}$, $R_{53}$ and $R_{54}$, $R_{55}$ and $R_{56}$, $R_{56}$ and $R_{57}$, $R_{55}$ and $R_{58}$, $R_{56}$ and $R_{58}$, $R_{57}$ and $R_{58}$, and $R_{55}$ and $R_{59}$ may be connected to each other to form a 5- or 6-membered ring. * shows the point of attachment to the azo group in the general formula (2-2).

Preferred substituents and preferred scopes of G, $R_1$, $R_2$, m, and n in the general formula (2-2) which represents the pigments are the same as G, $R_1$, $R_2$, m, and n in the general formula (1). Also, preferred substituents and preferred scopes of $A_2$, $R_{55}$ to $R_{59}$ in the general formula (2-2) which represents the pigments are the same as $A_2'$, $R_{55}$ to $R_{59}$ in the general formula (2-1).

The azo pigments represented by the foregoing general formula (2-2) are preferably those which are represented by the following general formula (2-3).

General Formula (2-3)

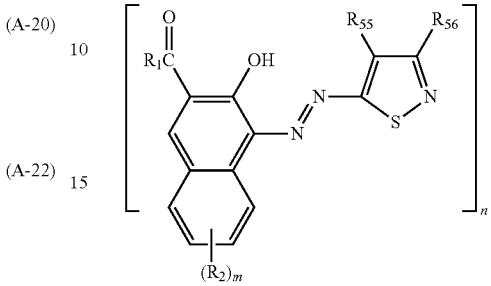

In the general formula (2-3), $R_1$ represents an amino group, an aliphatic oxy group, an aliphatic group, an aryl group, or a heterocyclic group, $R_2$ represents a substituent, $R_{56}$ and $R_{58}$ each represents a hydrogen atom or a substituent, m represents an integer of from 0 to 5, and n represents an integer of from 1 to 4. $R_{56}$ and $R_{58}$ may be connected to each other to form a 5- or 6-membered ring. When n=2, the general formula (2-3) represents a dimer formed through $R_1$, $R_2$, $R_{56}$, or $R_{58}$. When n=3, the general formula represents a trimer formed through $R_1$, $R_2$, $R_{56}$, or $R_{58}$. When n=4, the general formula represents a tetramer formed through $R_1$, $R_2$, $R_{56}$, or $R_{58}$. The general formula (2-3) does not contain any ionic hydrophilic group.

Preferred substituents and preferred scopes of $R_1$, $R_2$, $A_2$, $R_{56}$, $R_{58}$, m, and n in the general formula (2-3) which represents the pigments are the same as $R_{21}$, $R_{22}$, $A_2'$, $R_{56}$, $R_{58}$, m, and n in the general formula (2-1).

The invention includes in its scope tautomers of the azo pigments represented by the general formula (1), general formula (2-1), general formula (2-2), general formula (2-3), and general formula (3). Although the general formula (1), general formula (2-1), general formula (2-2), general formula (2-3), and general formula (3) are shown in the form of limiting structure among several tautomer forms which are possible in view of chemical structure, the azo pigments may be tautomers of other structure than the shown ones, and may be used as a mixture containing plural tautomers.

For example, with the pigment represented by the general formula (1), azo-hydrazone tautomers represented by the following general formula (1') can be considered.

The azo pigment (A) in accordance with the invention also includes in its scope tautomers of the azo pigments represented by the following general formula (1') which are tautomers of the azo pigments represented by the general formula (1).

(1')

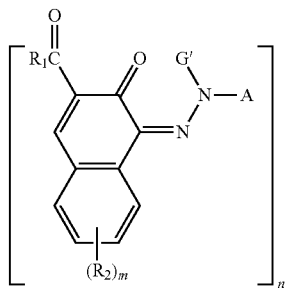

In the general formula (1'), $R_1$, $R_2$, A, m, and n are the same as those defined with respect to the general formula (1). In the general formula (1'), G' is a group corresponding to G defined with respect to the general formula (1). The general formula (1') does not have any ionic hydrophilic group.

Of the azo pigments represented by the general formula (1) and general formula (2-1), examples of particularly preferred pigments are azo pigments represented by the following general formula (3-1) to the general formula (3-4), as has been described hereinbefore. The pigment represented by the above general formula (1) is preferably an azo pigment represented by the following general formula (3-1) to the general formula (3-4).

The azo pigments represented by the following general formula (3-1) to (3-4), and the tautomers, salts, and hydrates thereof will be described in detail below.

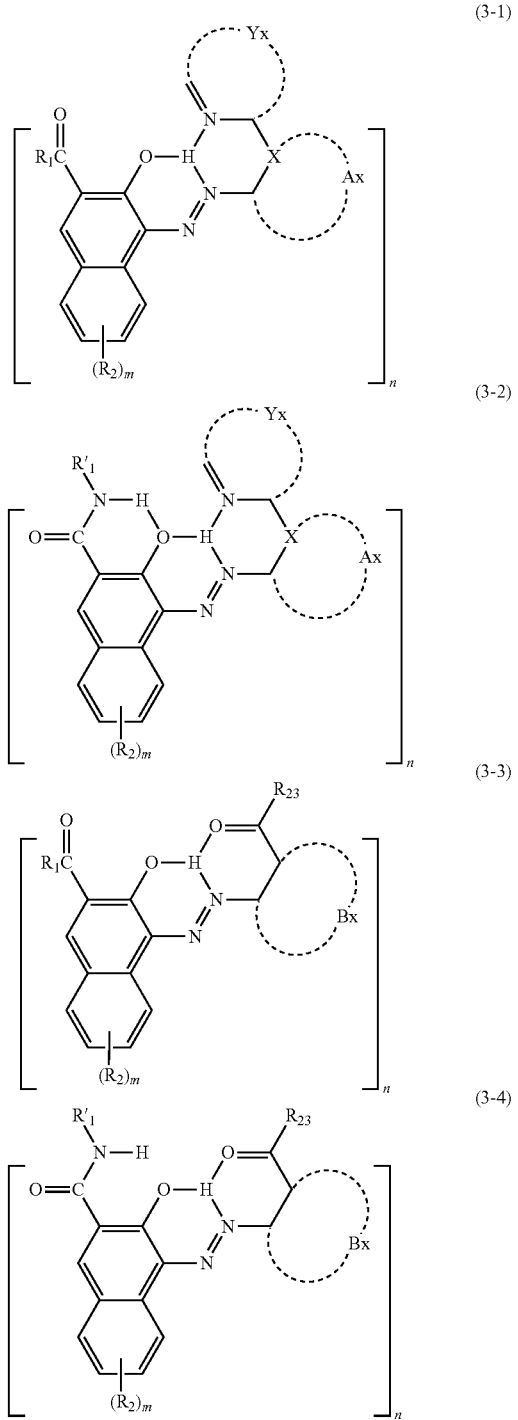

In the general formula (3-1) to the general formula (3-4), $R_1$, $R_2$, m, and n are the same as those defined with respect to the general formula (1) and the general formula (2-1). X represents a carbon atom or a nitrogen atom, $A_x$ and $B_x$ represent those which correspond to (A-1) to (A-18), (A-20) to (A-28), and (A-30) to (A-32) defined for A2' in the general formula (2-1). $R_{23}$ represents a substituent formed by removing carbonyl from a corresponding substituent among the substituents of $R_{51}$, $R_{54}$, $R_{57}$, $R_{58}$, etc. specified with respect to the general formula (2-1). Each of the formed heterocyclic groups represents a group corresponding to the group defined with respect to $A_2'$ in the general formula (2-1). $Y_x$ represents a corresponding heterocyclic group defined for $R_{55}$ in the general formula (2-1) together with the nitrogen atom and carbon atoms. $R'_1$ represents a substituent formed by removing —NH— from the amino group of $R_1$ defined with respect to the general formula (1). The general formula (3-1) to the general formula (3-4) do not have any ionic hydrophilic group.

With the azo pigments represented by the above-described general formulae (1), (2-1), (2-2), (2-3), (3), and (3-1) to (3-4), many tautomers may be considered.

Also, in the invention, the azo pigment represented by the general formula (1) preferably has a substituent capable of forming an intramolecular hydrogen bond or intramolecular crosslinking hydrogen bond. It is more preferred for the azo pigment to have a substituent capable of forming at least one or more intramolecular hydrogen bonds, particularly a substituent capable of forming at least one or more intramolecular crosslinking hydrogen bonds.

The reason why this structure is preferred is that, as is shown by the general formulae (3-1) to (3-4), nitrogen atom constituting the heterocyclic group contained in the azo pigment structure, hydrogen atom and oxygen atom of the hydroxyl group of the naphthalene substituent, nitrogen atom of the azo group or of its tautomer of the hydrazone group, a carbonyl group in the azo component contained in the azo pigment structure, hydrogen atom and oxygen atom of the hydroxyl group of the naphthalene substituent, and nitrogen atom of the azo group or of its tautomer of the hydrazone group are liable to form intramolecular crosslinking hydrogen bonds.

As a result, flatness of the molecule is enhanced, the intramolecular and intermolecular mutual action is improved, crystallinity of the azo pigment represented by the general formulae (3-1) to the general formulae (3-4) is enhanced (higher structure of the pigment becoming liable to be formed), and hence performances required as pigments, i.e., light fastness, heat stability, moist heat stability, water resistance, gas resistance, and/or solvent resistance, can markedly be improved, thus such pigments being more preferred.

In view of this point, too, pigments represented by the general formulae (1) and (2-1) are preferably pigments represented by the general formulae (3) or (3-1) to (3-4), more preferably pigments represented by the general formulae (3), (3-2), or (3-4), particularly preferably pigments represented by the general formula (3).

Specific examples of the azo pigments (A) represented by the foregoing general formula (1) will be shown below. However, the azo pigments to be used in the invention are not limited only to the following examples. Also, although the structures of the following specific examples are shown in the form of limiting structure among several tautomer forms which are possible in view of chemical structure, the azo pigments may be tautomers of other structure than the shown ones.

D-1
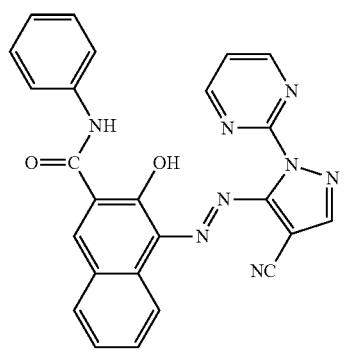
D-5
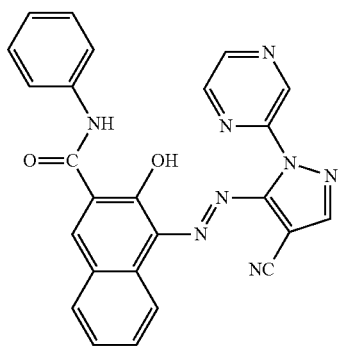
D-2
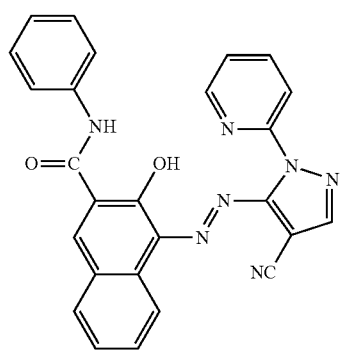
D-6
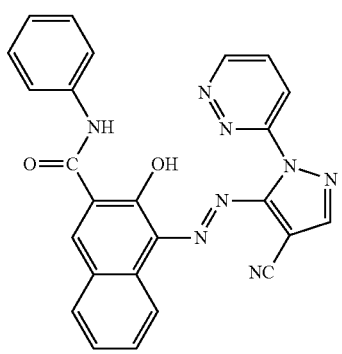
D-3
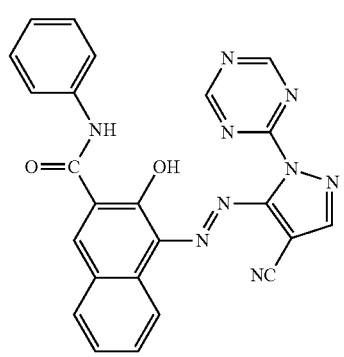
D-7
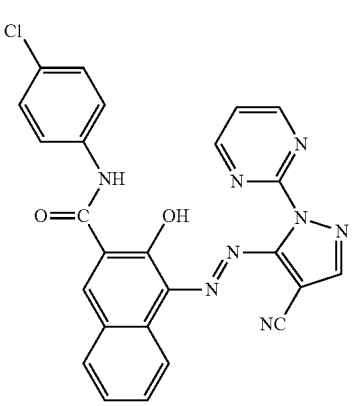
D-4
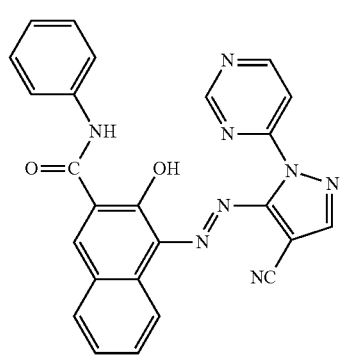
D-8
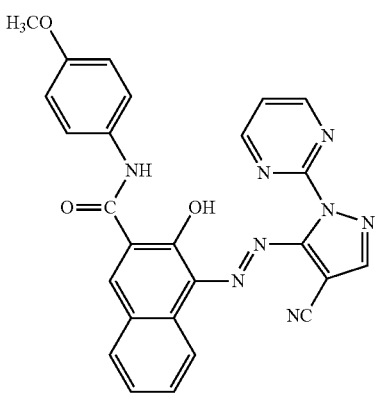

D-9
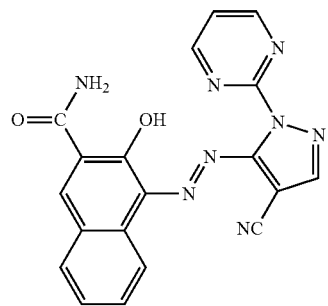
D-10
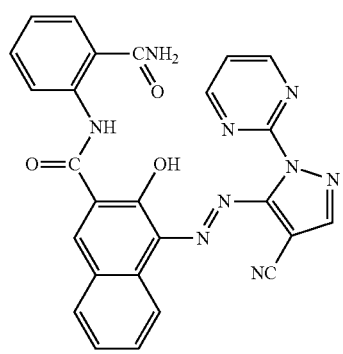
D-11
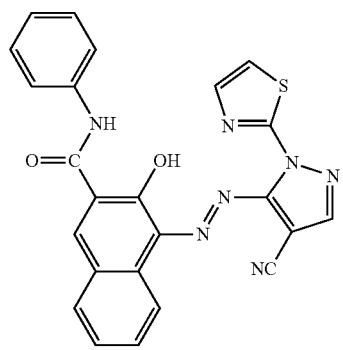
D-12
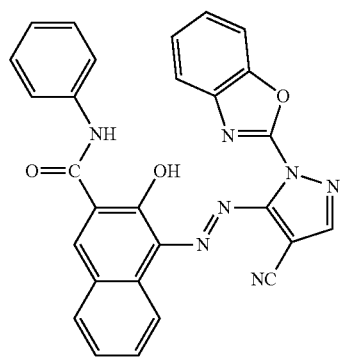
D-13
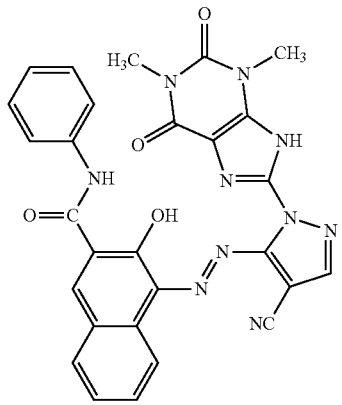
D-14
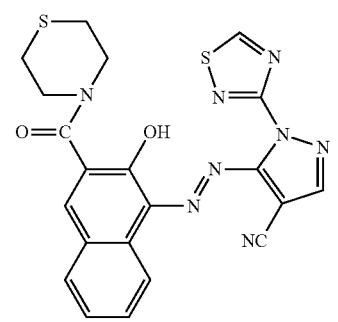
D-15
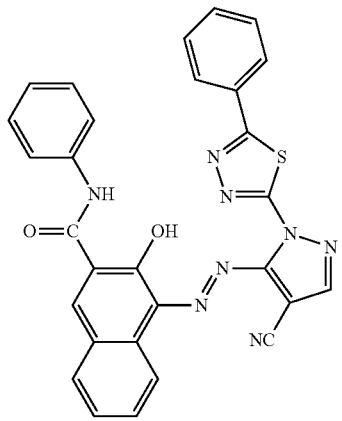
D-16
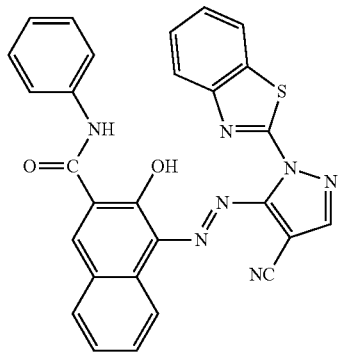

-continued
D-17
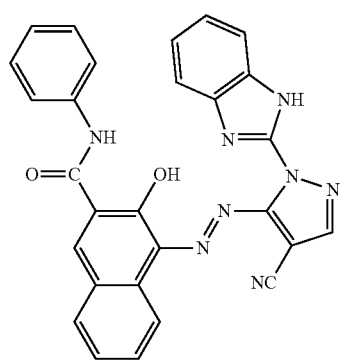
D-18
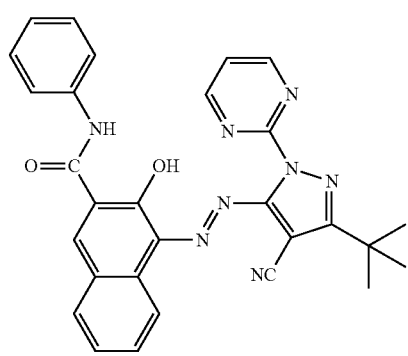
D-19
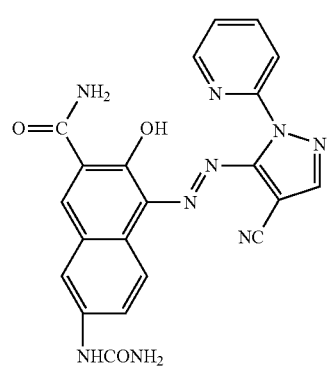
D-20
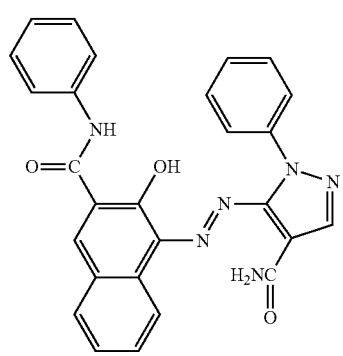
-continued
D-21
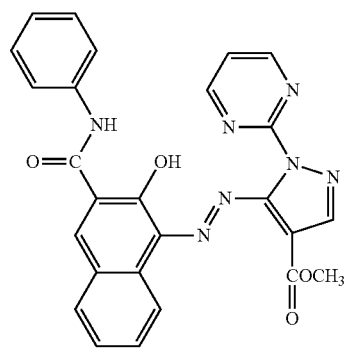
D-22
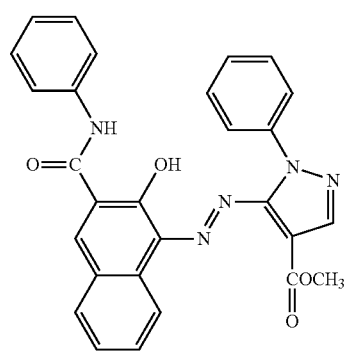
D-23
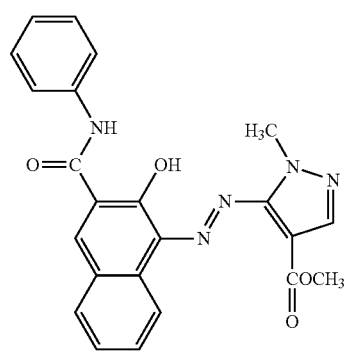
D-24
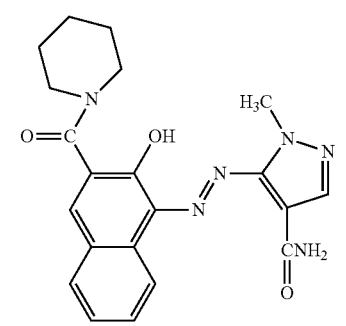

D-25 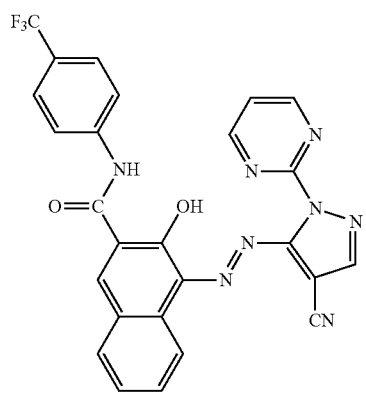
D-26 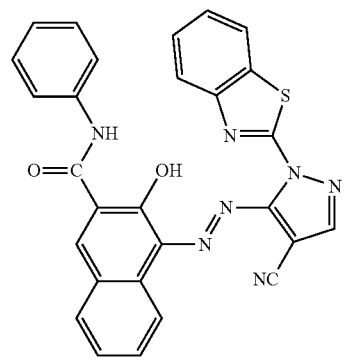
D-27 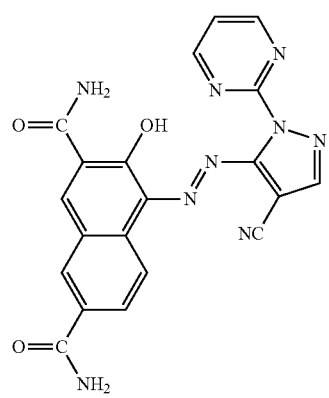
D-28 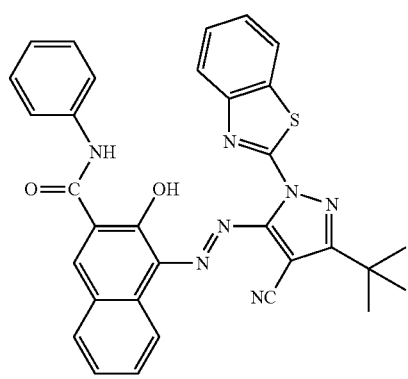
D-29 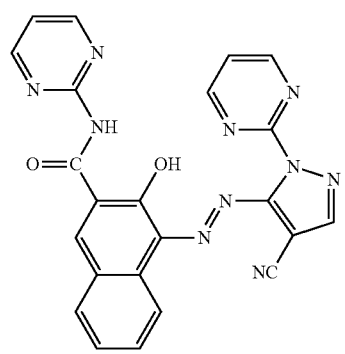
D-30 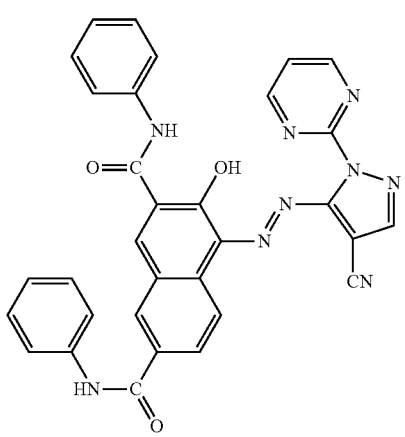
D-31 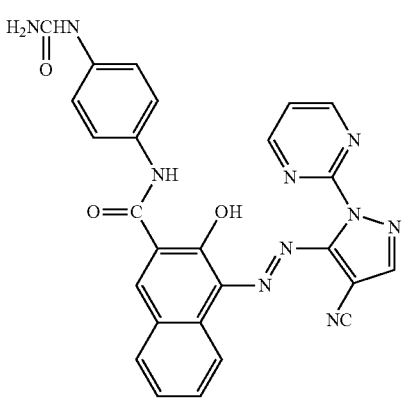
D-32 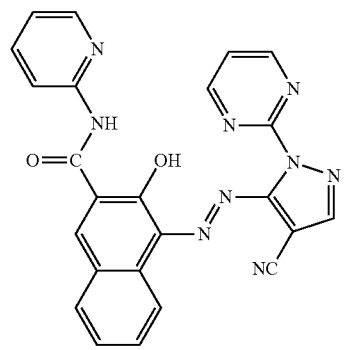

D-33
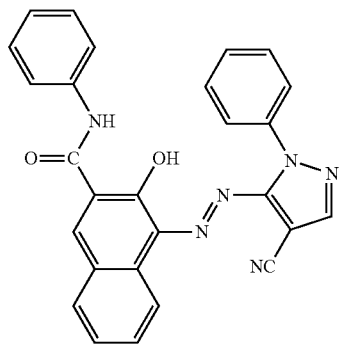
D-34
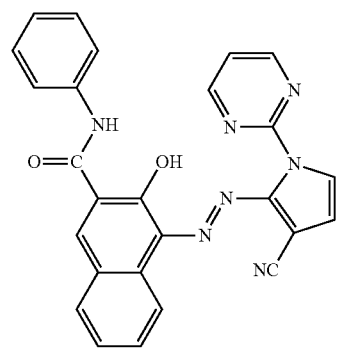
D-35
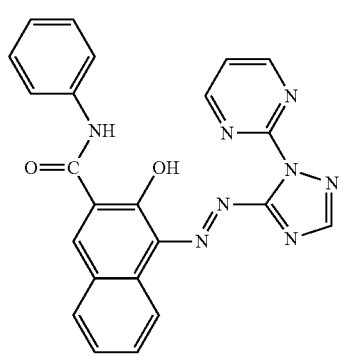
D-36
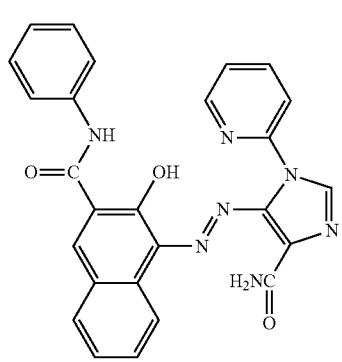
D-37
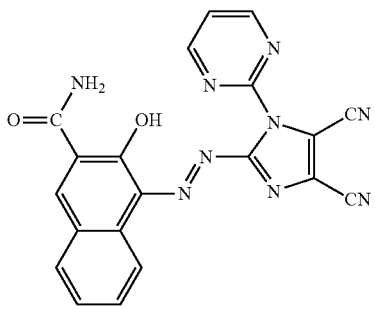
D-38
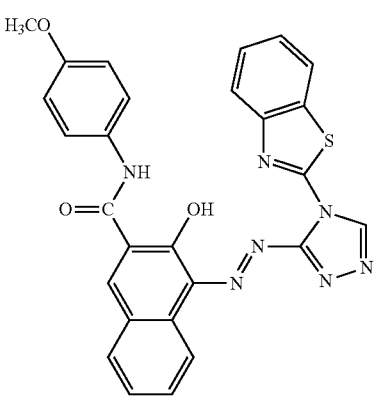
D-39
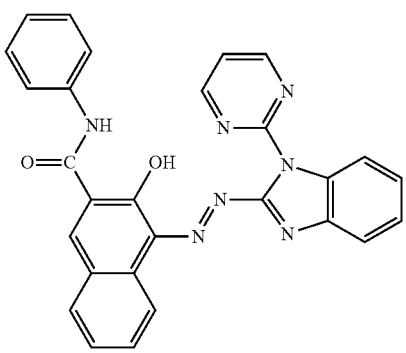
D-40
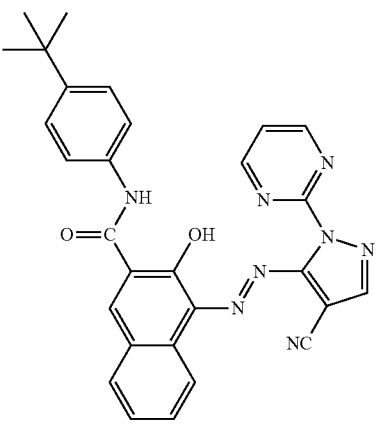

D-41
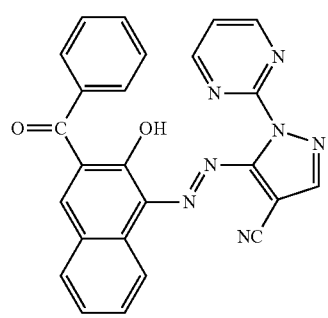
D-42
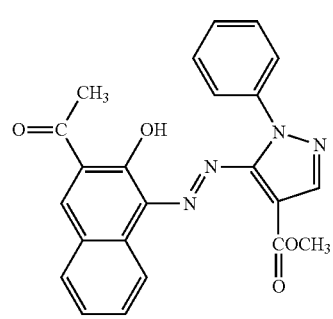
D-43
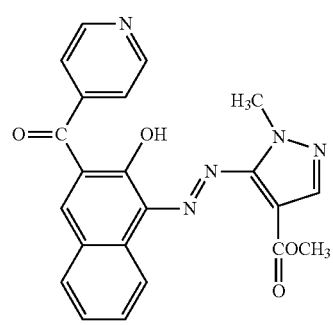
D-44
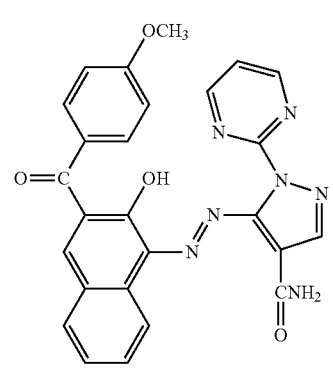
D-45
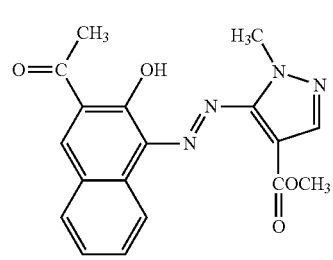
D-71
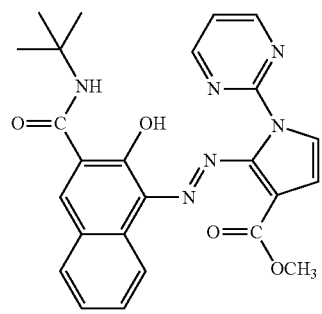
D-72
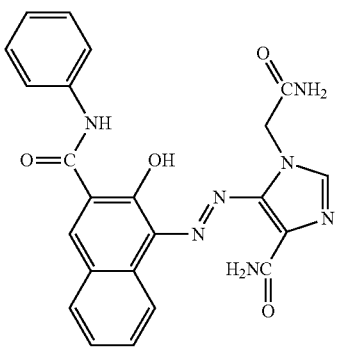
D-73
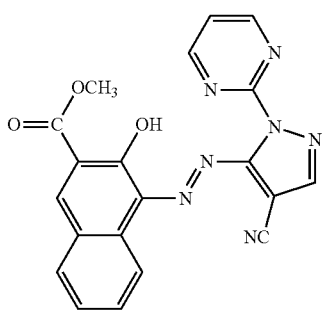
D-74
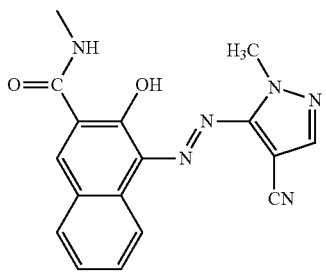
D-75
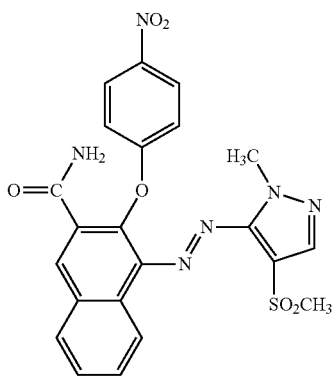

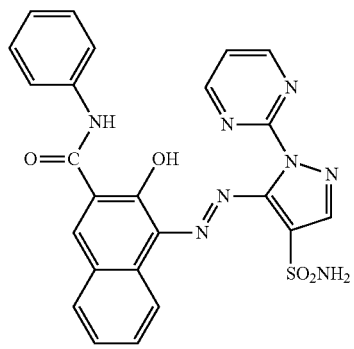
D-76
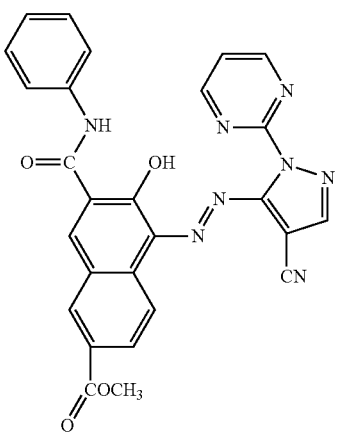
D-77
D-78
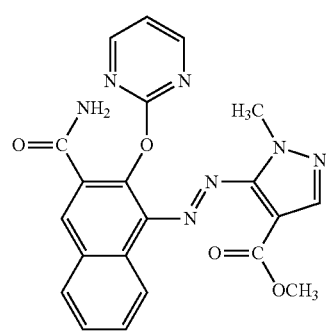
D-79
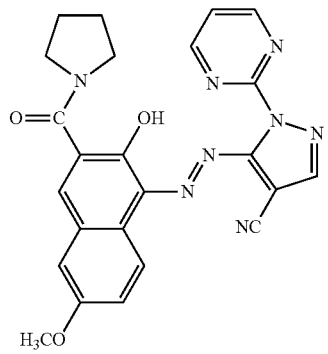
D-80
D-81
D-82
D-83

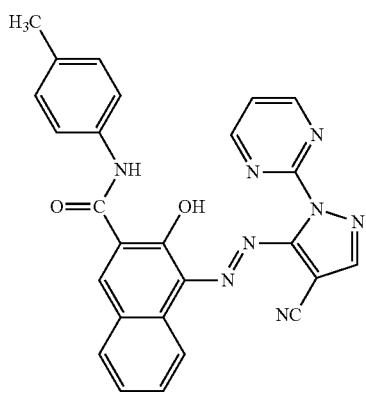
D-84
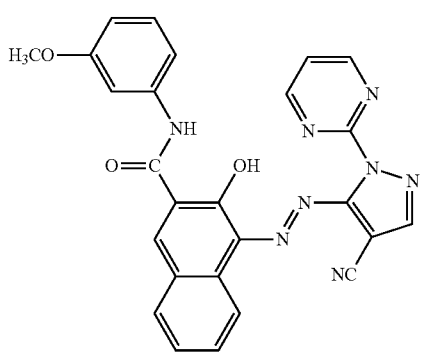
D-88
D-85
D-89
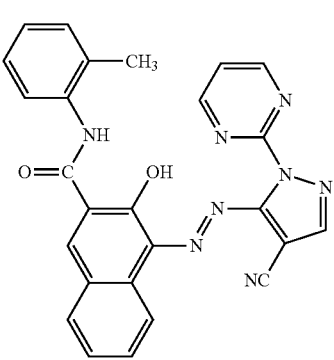
D-86
D-90
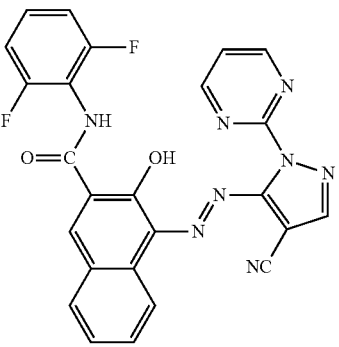
D-87
D-91
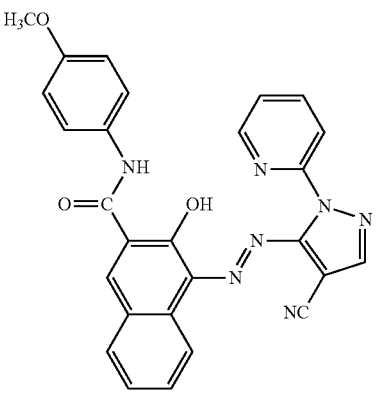

D-92 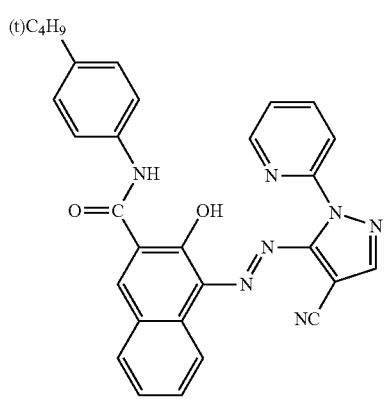
D-93 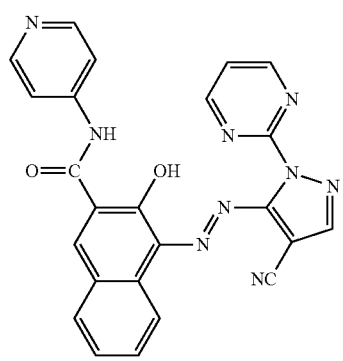
D-94 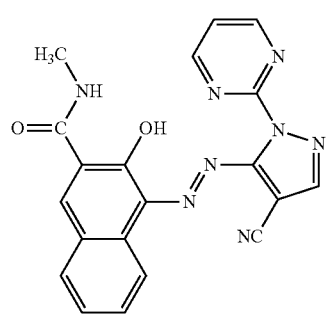
D-95 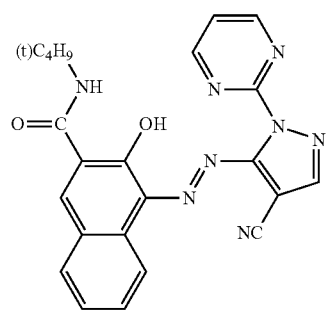
D-96 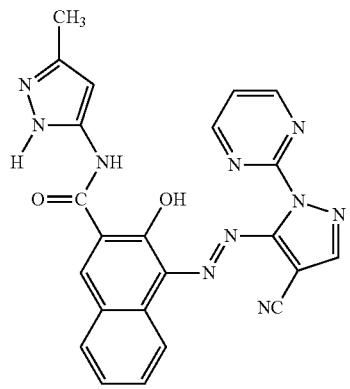
D-97 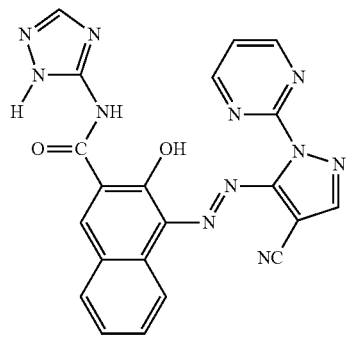
D-98 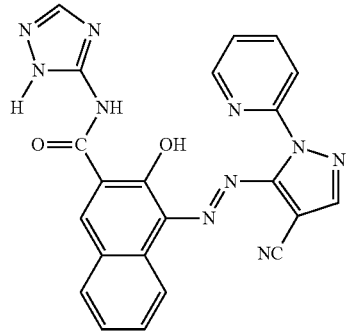
D-99 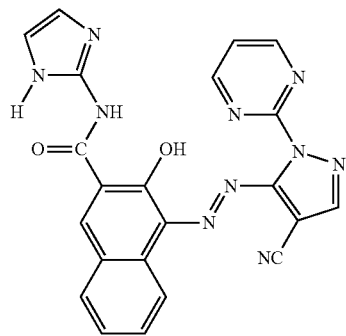

D-100
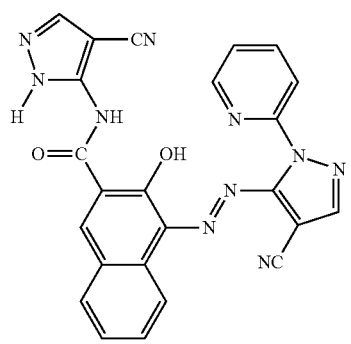
D-101
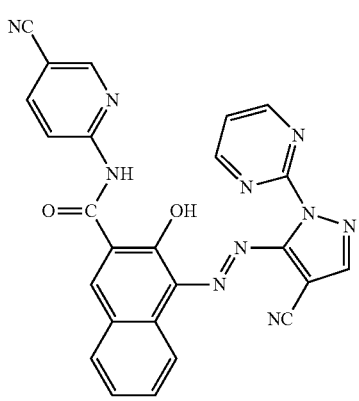
D-102
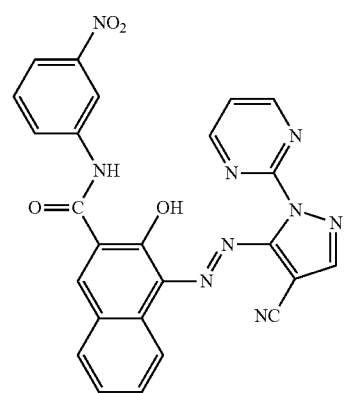
D-103
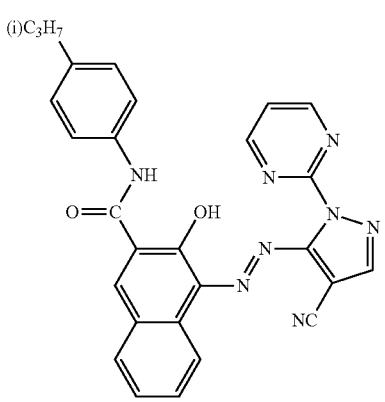
D-104
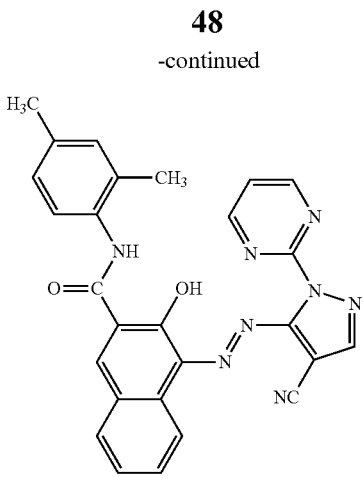
D-105
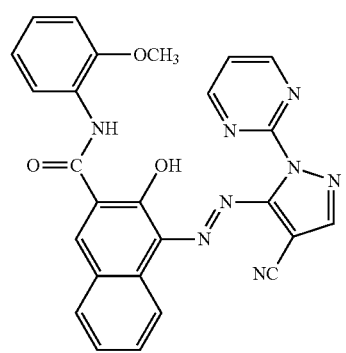
D-106
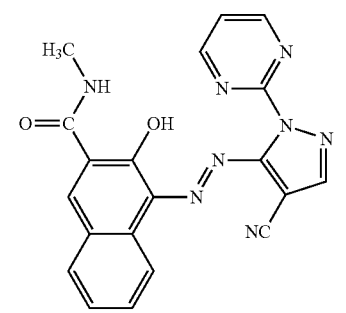
D-107
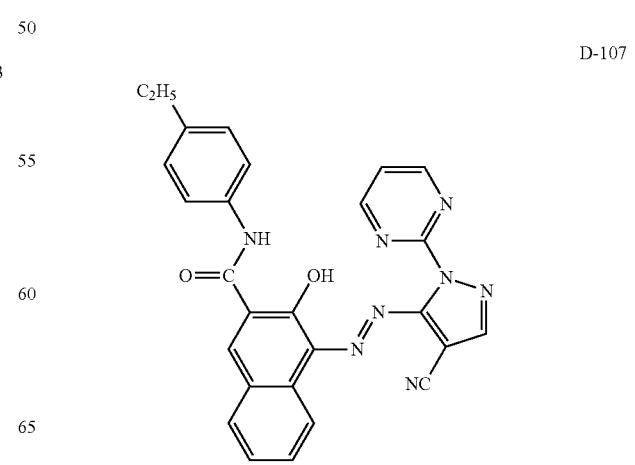

D-108
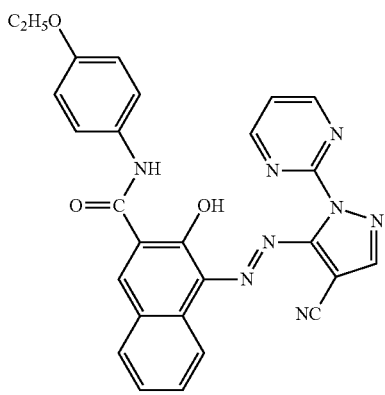
D-109
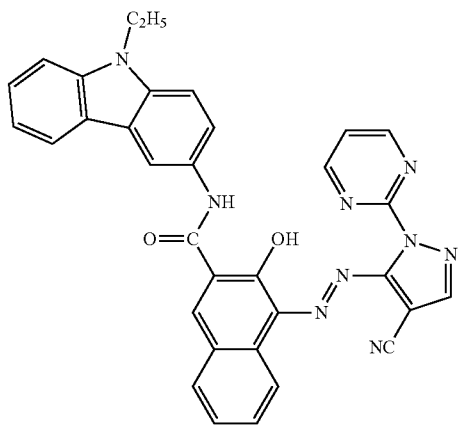
D-110
D-111
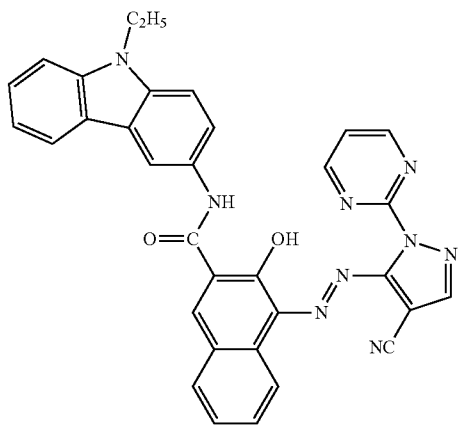
D-112
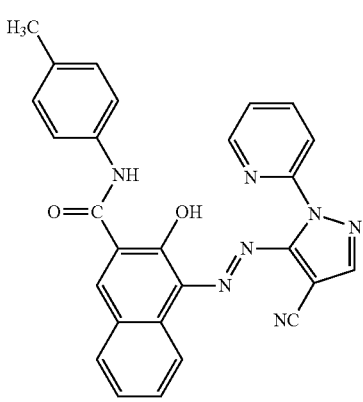
D-113
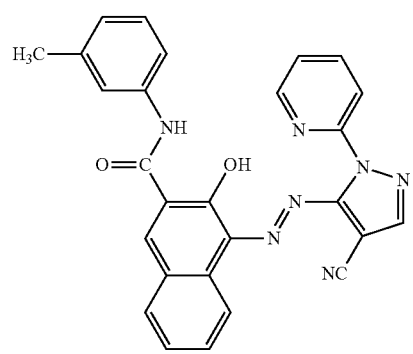
D-114
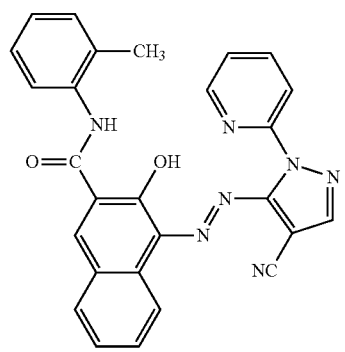

D-115
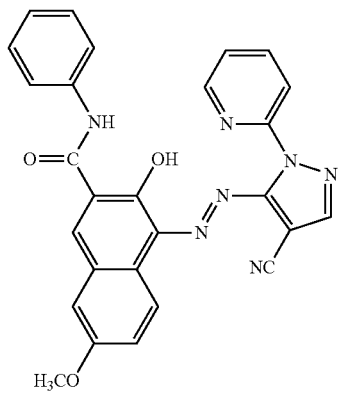
D-116
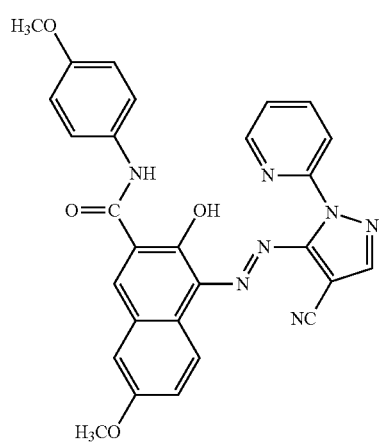
D-117
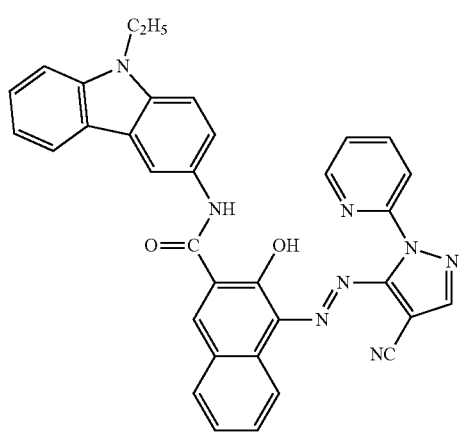
D-118
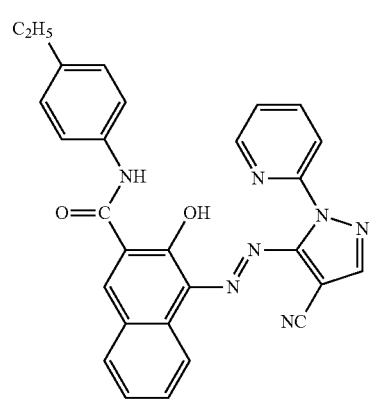
D-119
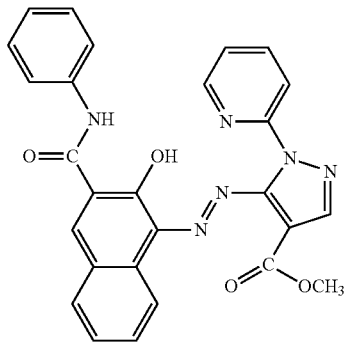
D-120
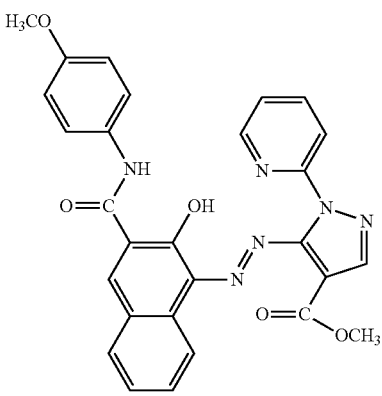
D-121
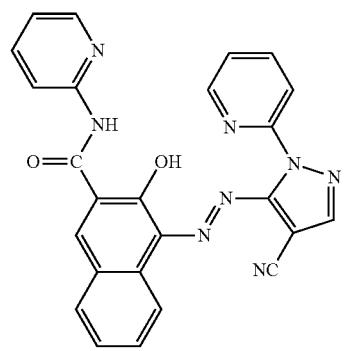
D-122
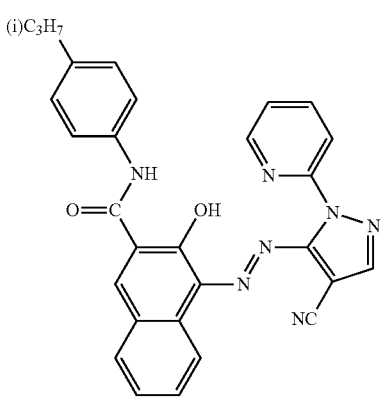

-continued
D-123
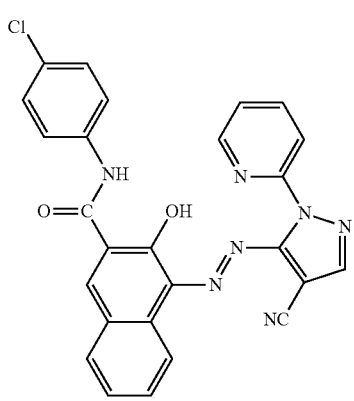
D-124
D-125
D-126
-continued
D-127
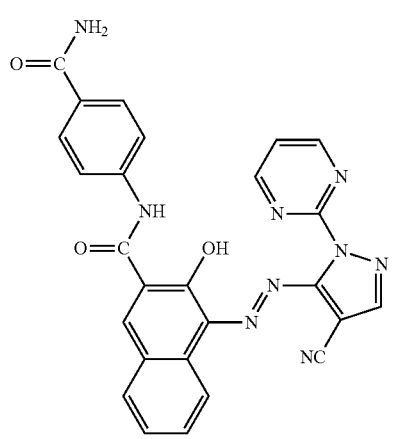
D-128
D-129
D-130

D-131
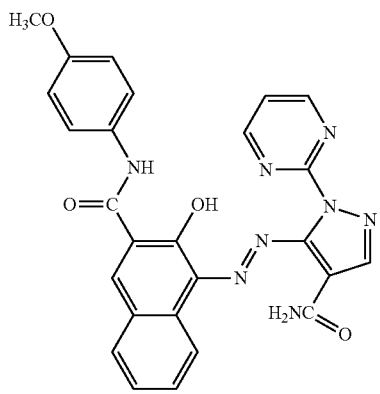
D-132
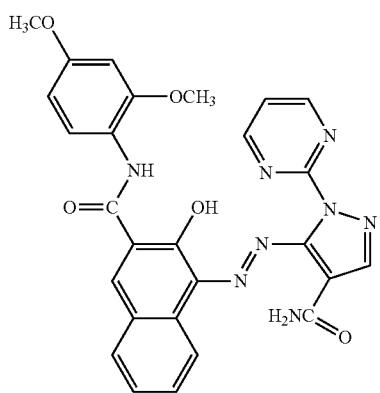
D-133
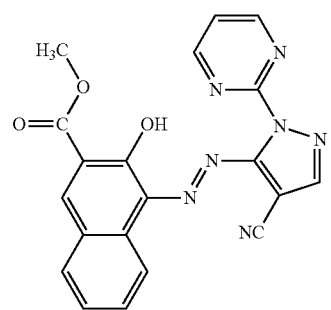
D-134
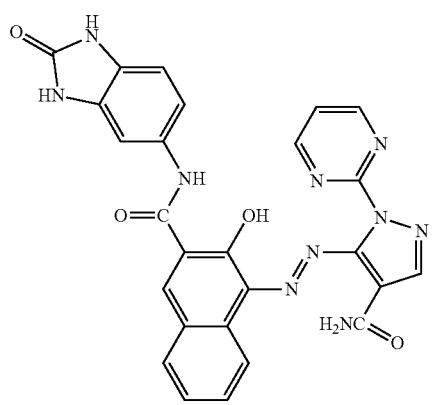
D-135
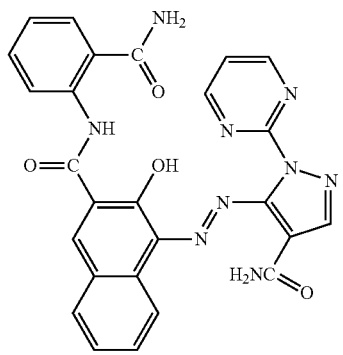
D-136
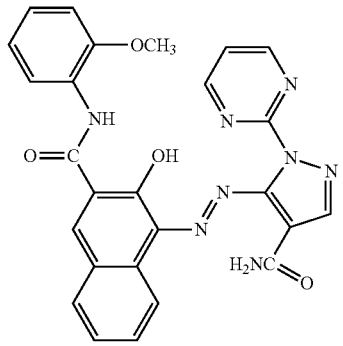
D-137
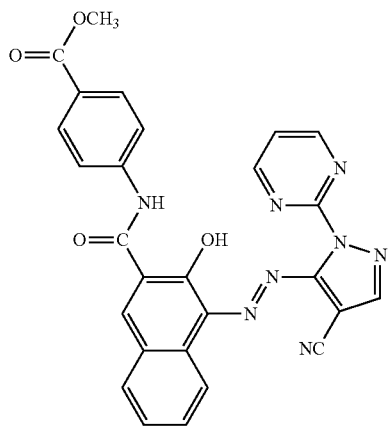
D-138
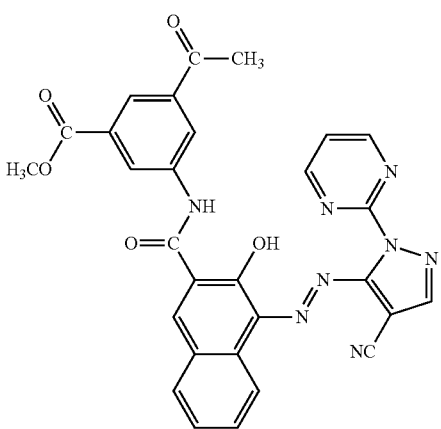

-continued
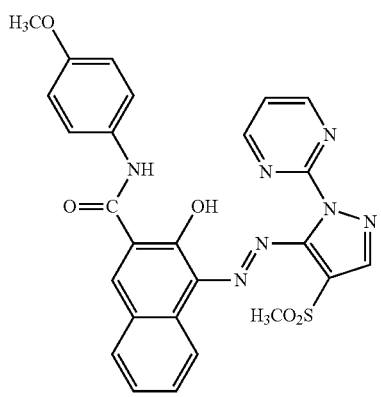
D-139
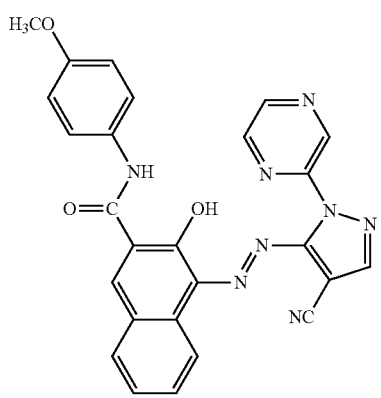
D-140
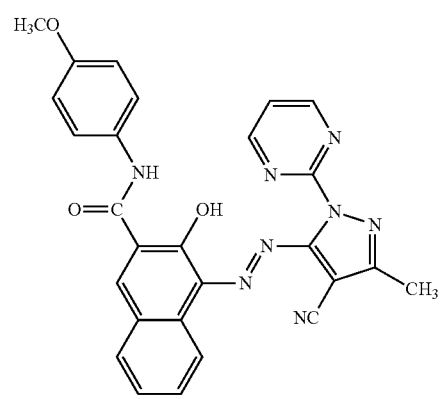
D-141
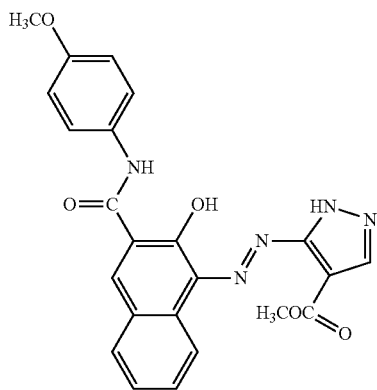
D-142
-continued
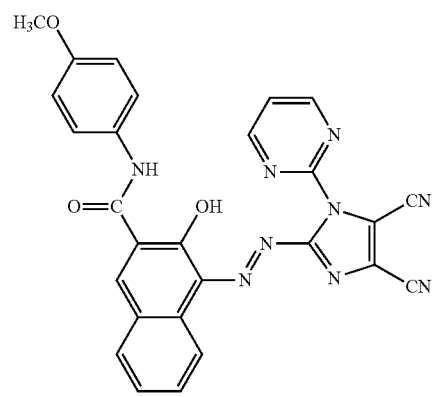
D-143
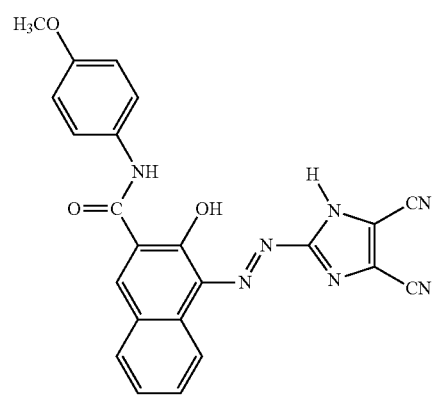
D-144
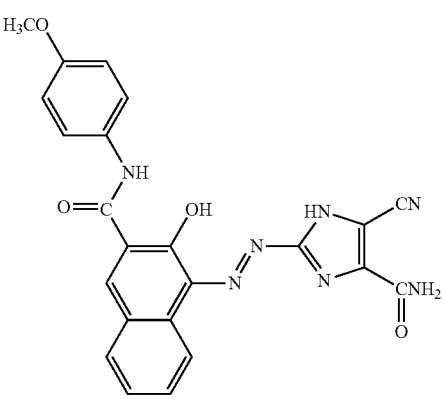
D-145
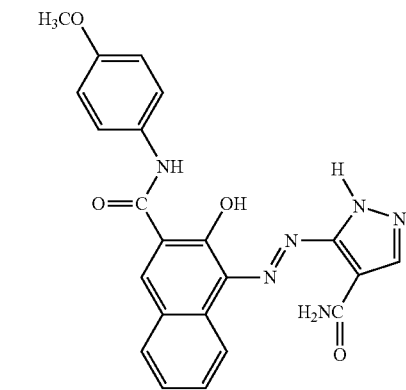
D-146

D-147
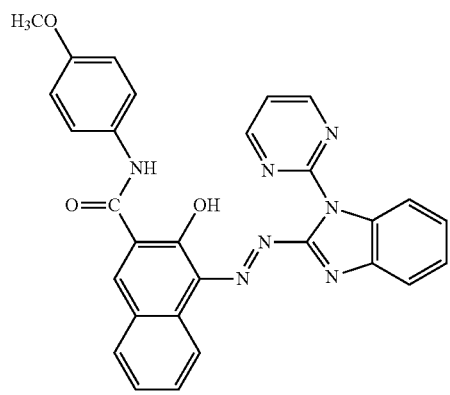
D-148
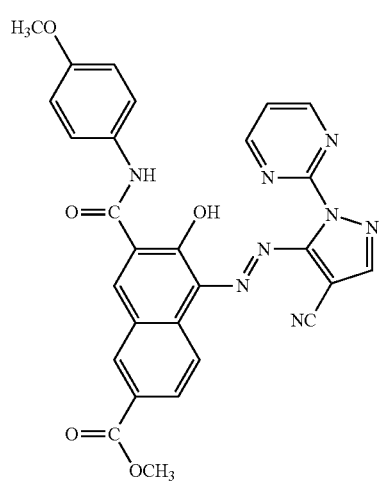
D-149
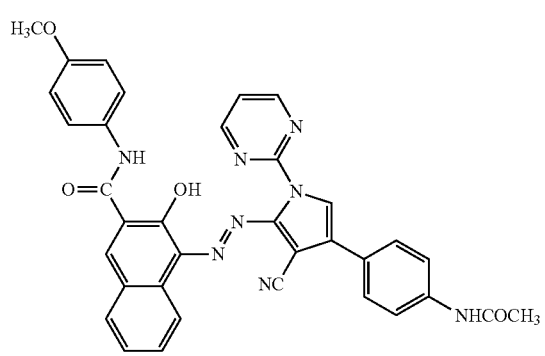
D-150
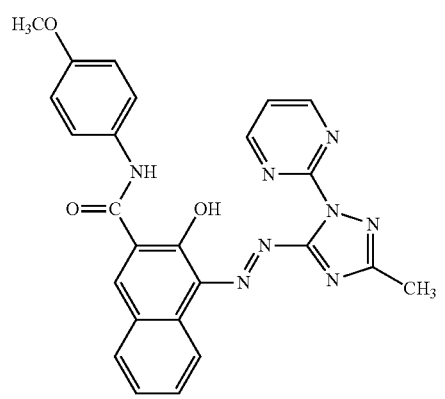
D-151
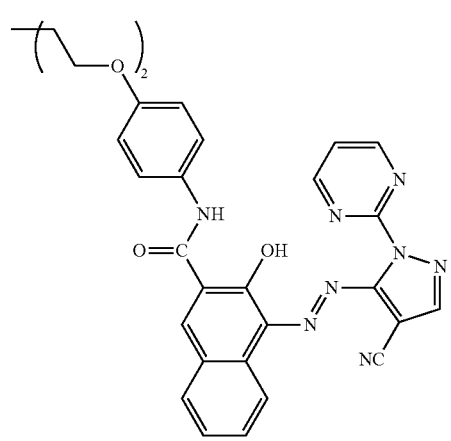
D-152
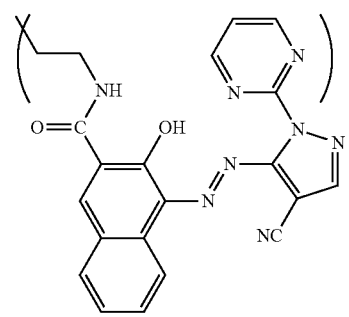
D-153
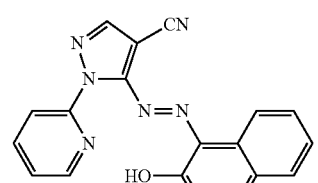
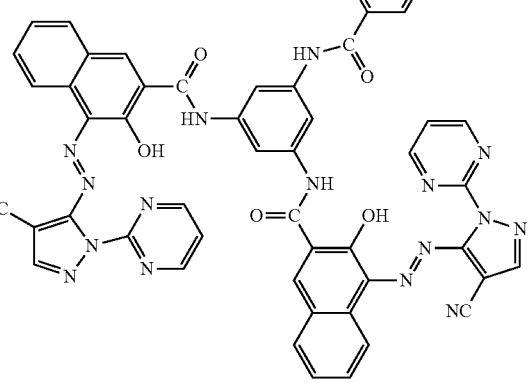

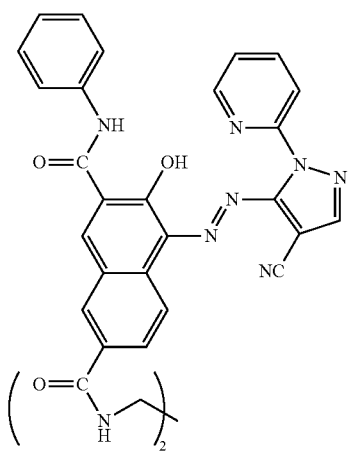
D-154
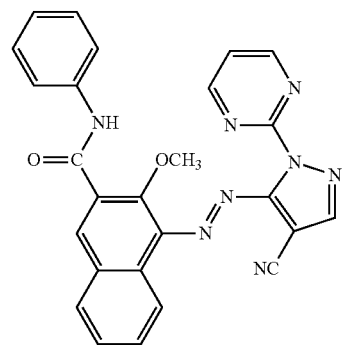
D-155
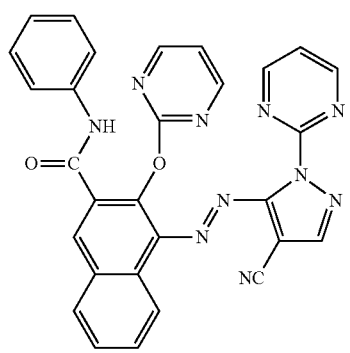
D-156
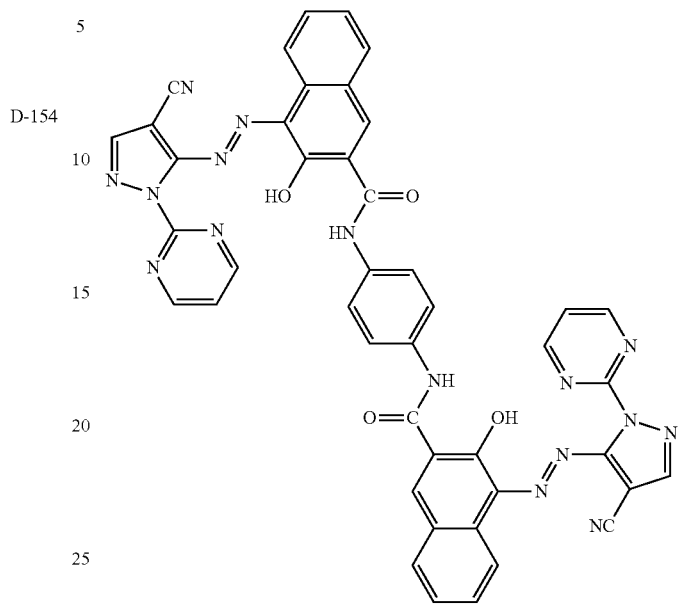
D-157
D-171
D-172
D-173

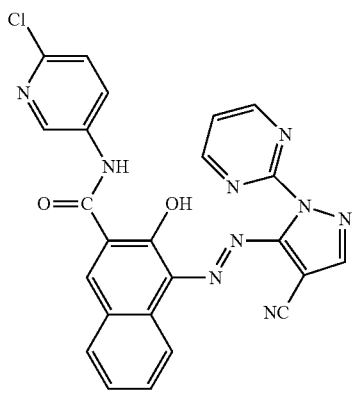
D-174
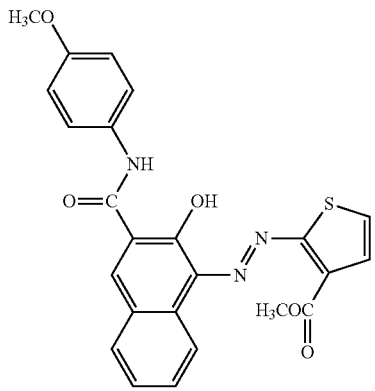
D-201
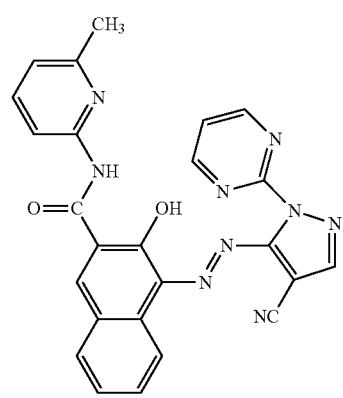
D-175
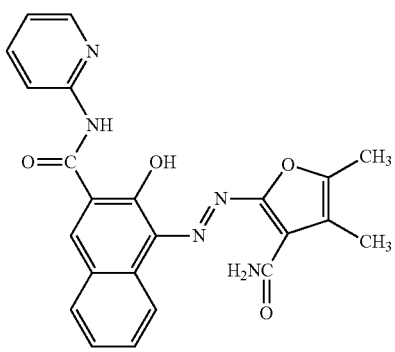
D-202
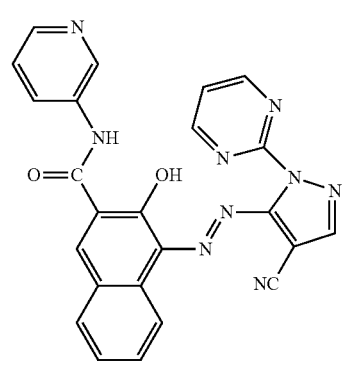
D-176
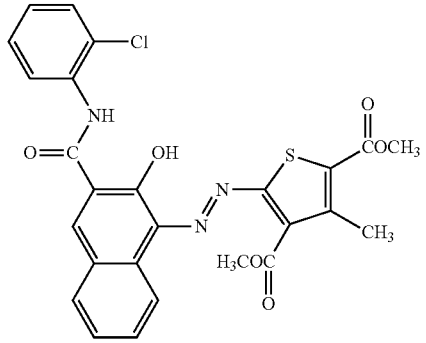
D-203
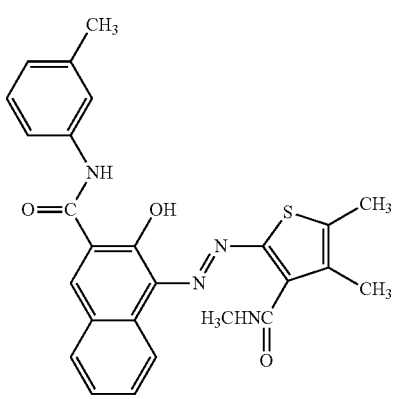
D-177
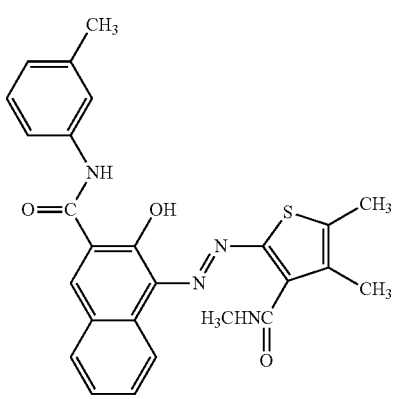
D-204

D-205
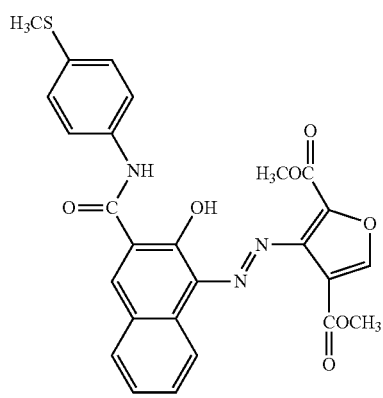
D-206
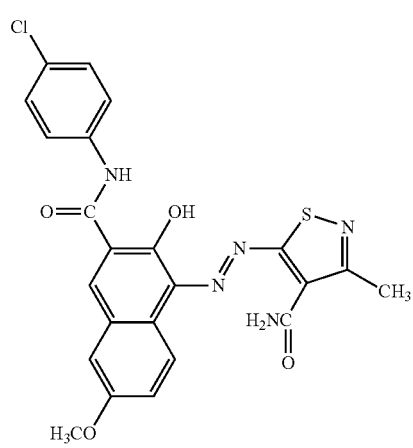
D-207
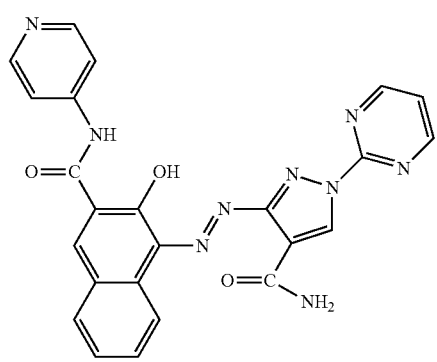
D-208
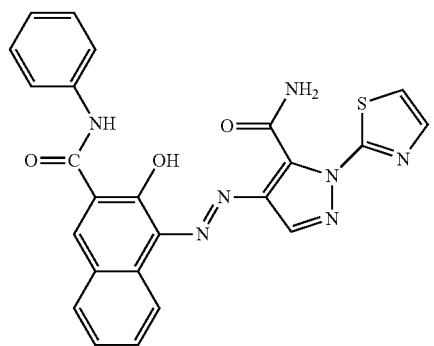
D-209
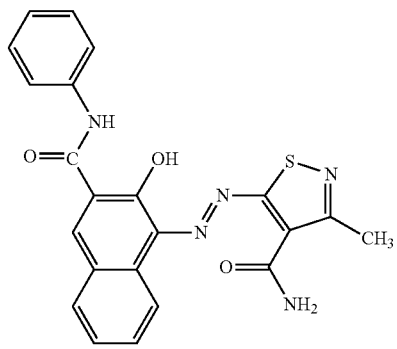
D-210
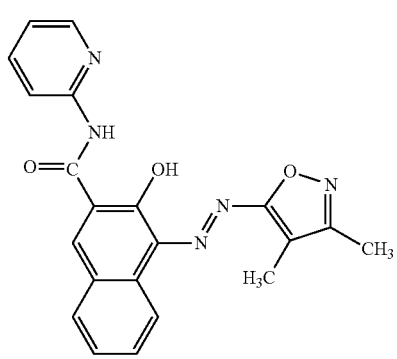
D-211
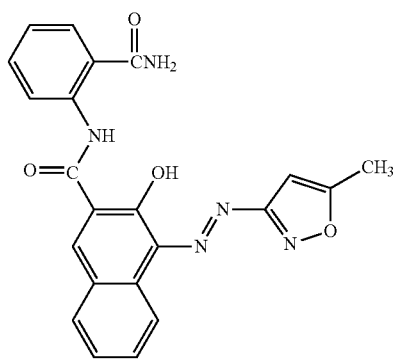
D-212
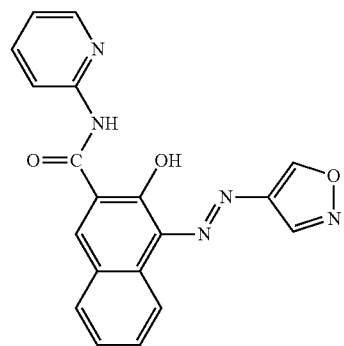

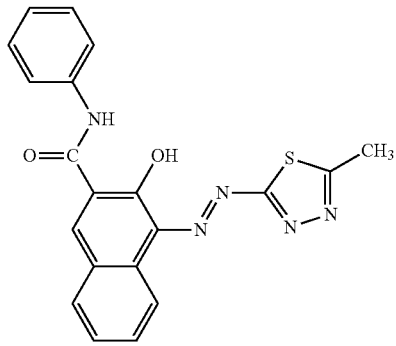
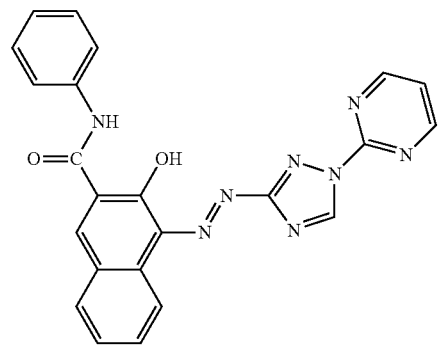

-continued
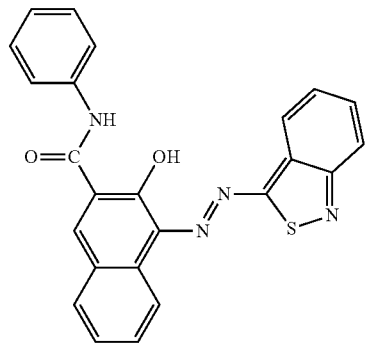
D-221
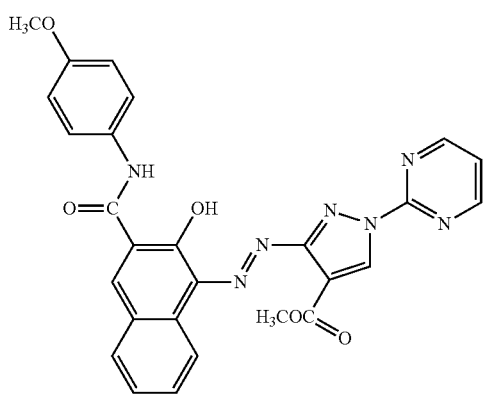
D-225
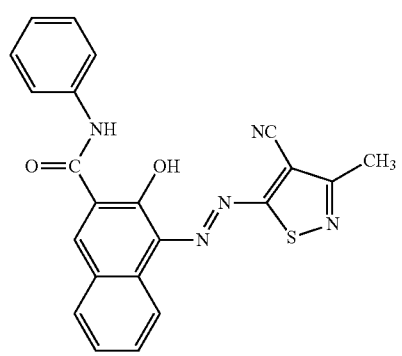
D-222
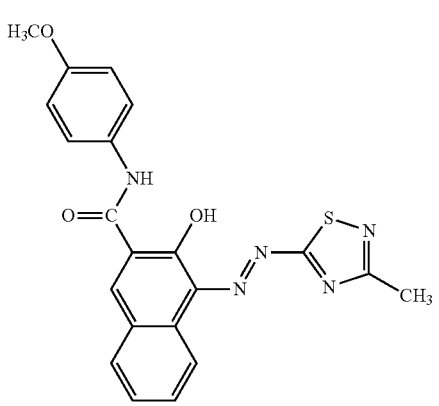
D-226
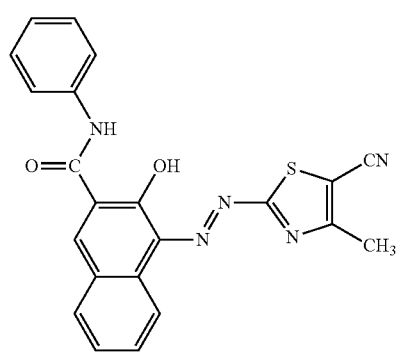
D-223
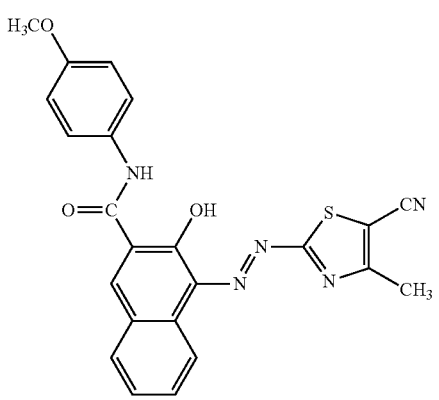
D-227
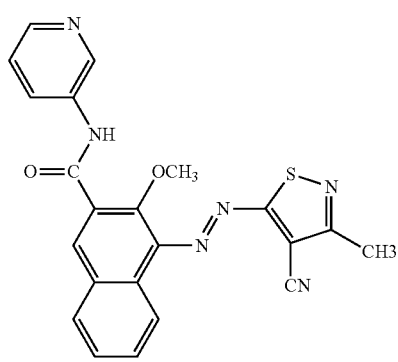
D-224
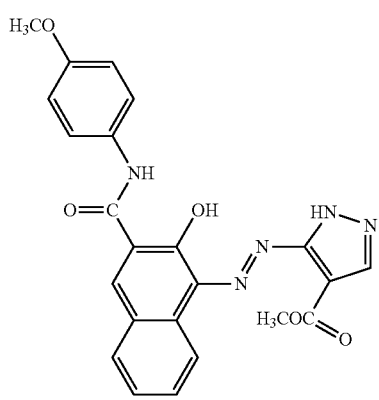
D-228

D-229
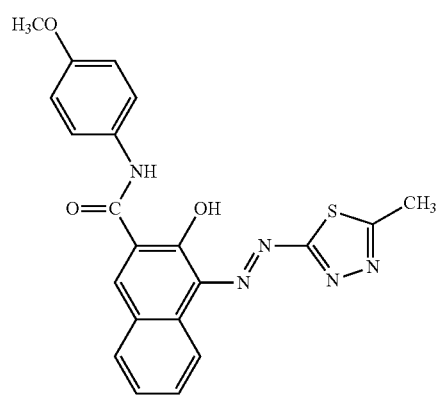
D-230
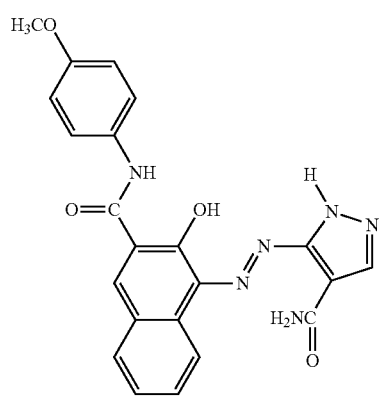
D-231
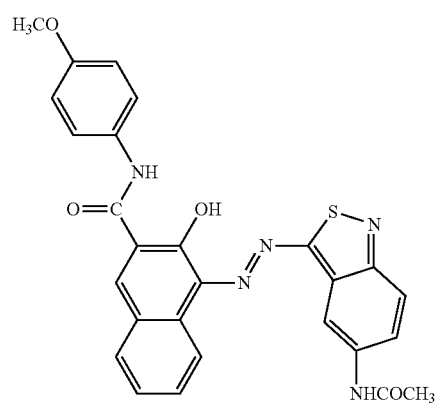
D-232
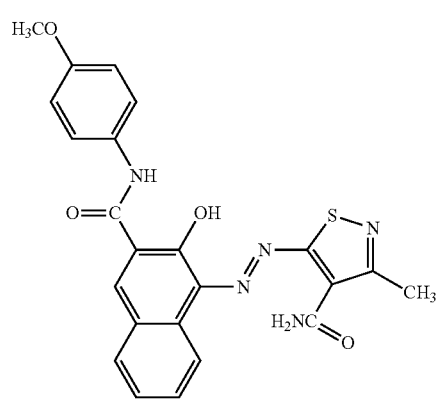
D-233
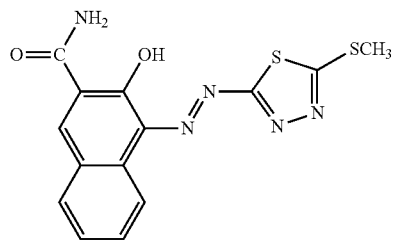
D-234
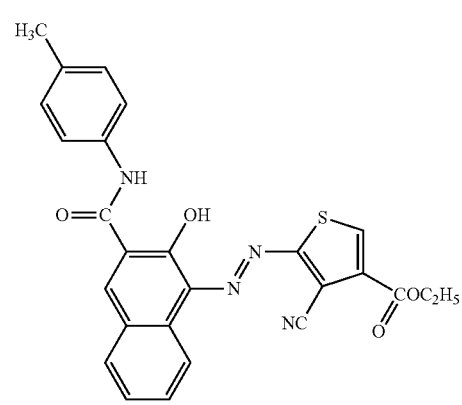
D-235
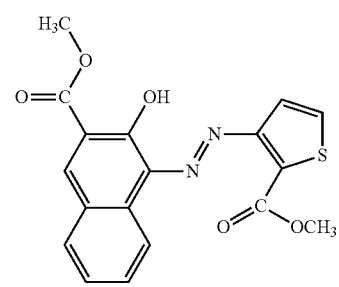
D-236
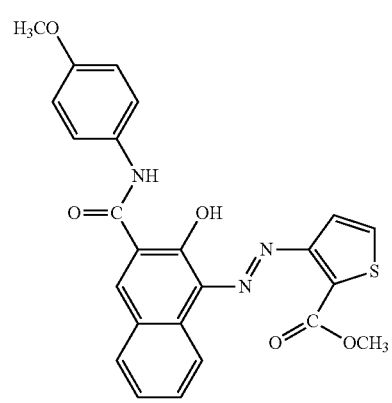

D-237
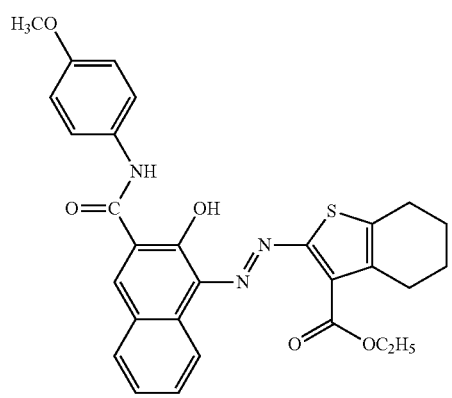
D-238
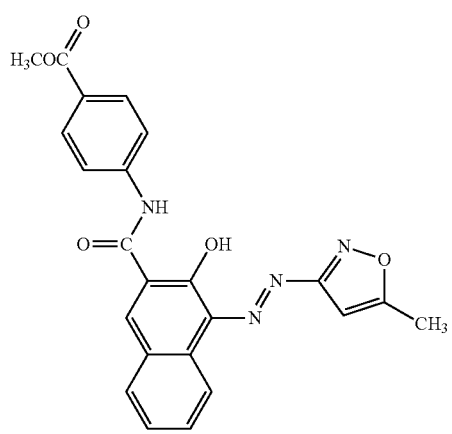
D-239
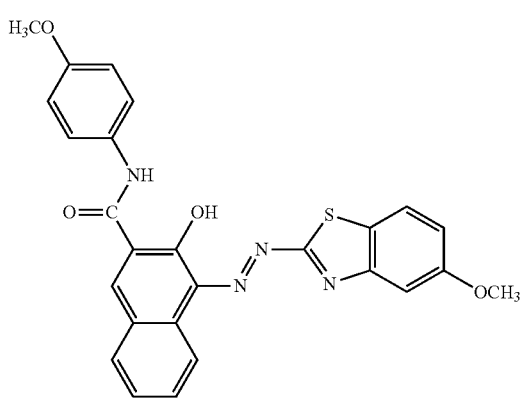
D-240
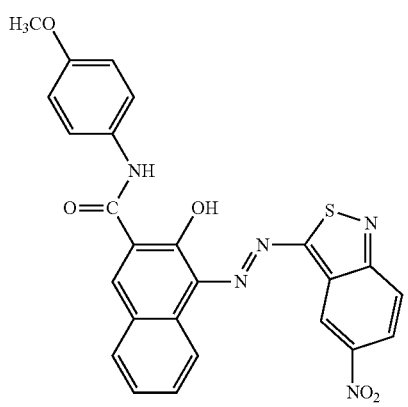
D-241
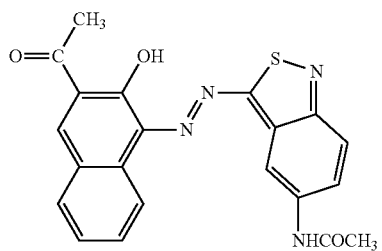
D-242
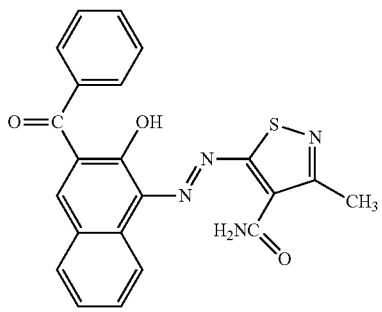
D-243
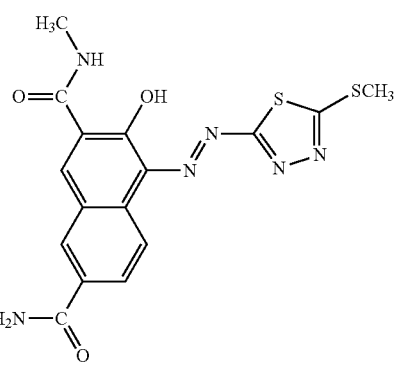
D-244
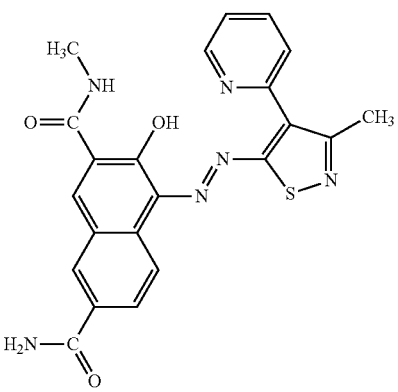
D-245
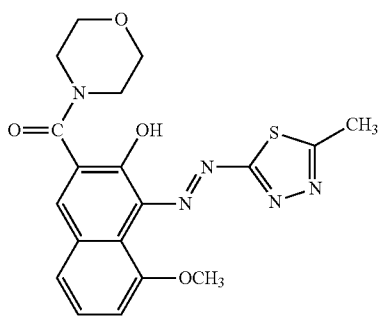

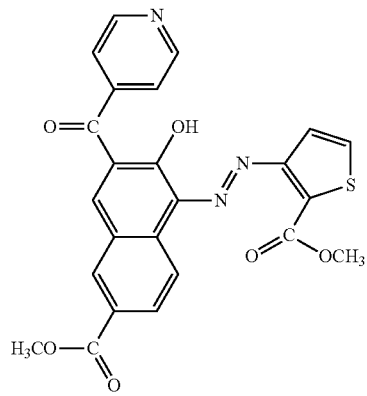
D-246
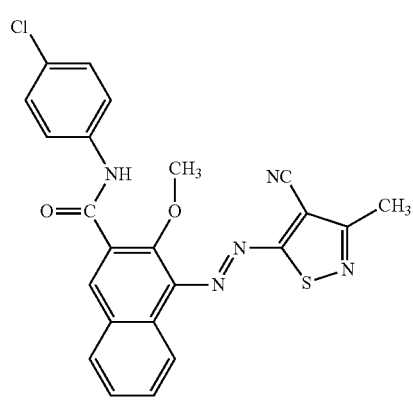
D-247
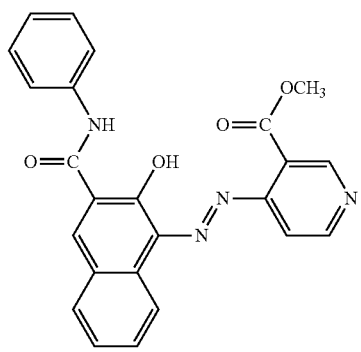
D-253
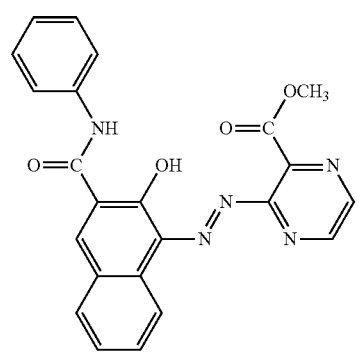
D-254
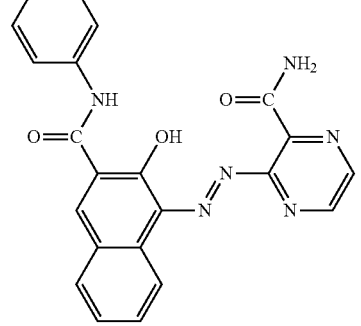
D-255
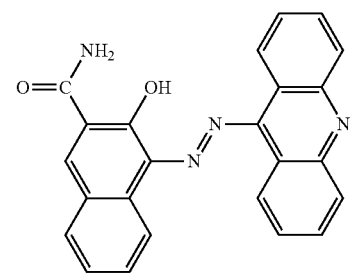
D-256

D-257
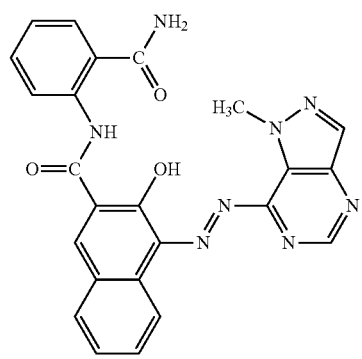
D-258
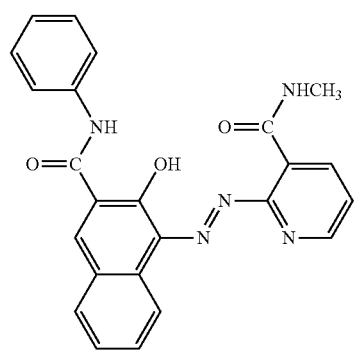
D-259
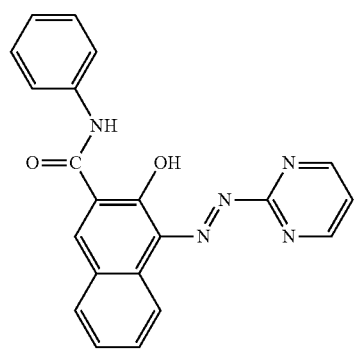
D-260
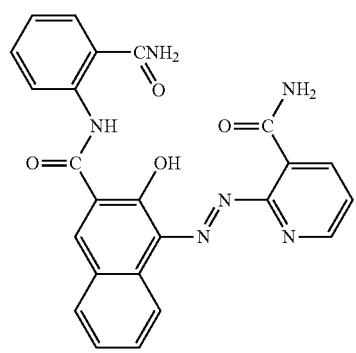
D-261
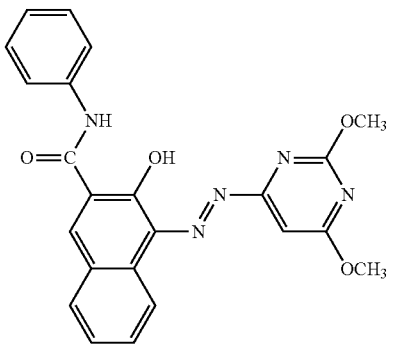
D-262
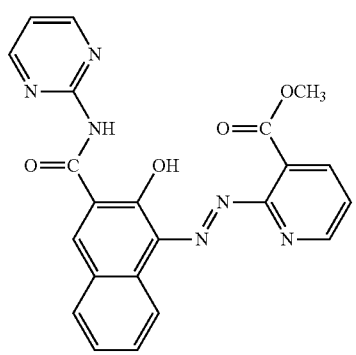
D-263
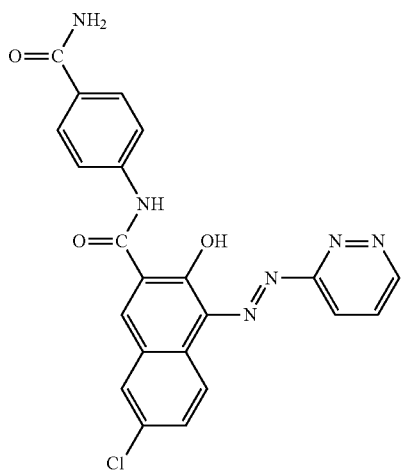
D-264
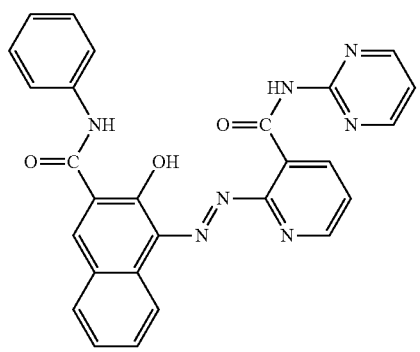

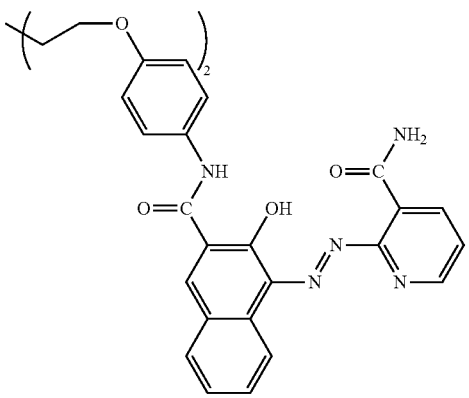

D-265

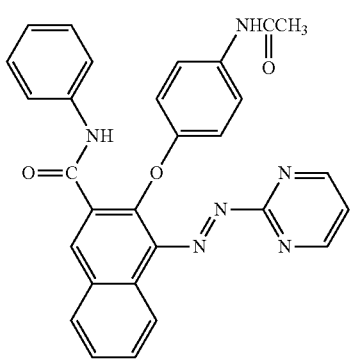

D-266

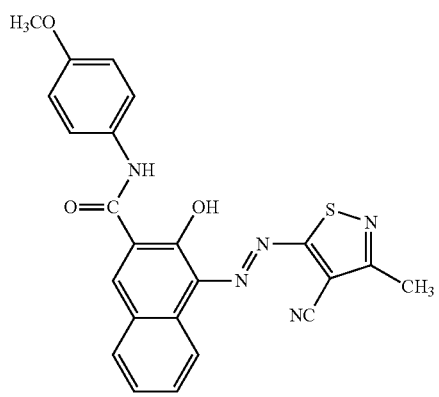

D-267

The pigments (A) of the invention represented by the general formula (1) may have a chemical structure represented by the general formula (1) or may be the tautomers thereof, and may be of any crystal form called polymorphic form.

Polymorphism means that crystals having the same chemical composition can be different from each other in the arrangement of building block (molecules or ions) in the crystal. Chemical and physical properties of the pigments are decided by the crystal structure, and polymorphic forms of the same pigment can be discriminated from each other by rheology, color, and other color characteristics. Also, different polymorphic forms can be confirmed by X-Ray Diffraction (results of powder X-ray diffractiometry) or by X-Ray Analysis (results of X-ray analysis of crystal structure).

In the case where the pigments (A) of the invention represented by the general formula (1) exhibits polymorphism, they may be in any polymorphic forms and may be a mixture of two or more polymorphic forms. However, pigments wherein a single crystal form is predominant are preferred. That is, pigments not contaminated with polymorphic form crystals are preferred. The content of the azo pigment having a single crystal form is from 70% to 100%, preferably from 80% to 100%, more preferably from 90% to 100%, still more preferably from 95% to 100%, particularly preferably 100%, based on the entire azo pigment. When the azo pigment contains a single crystal form azo pigment as a major component, regularity of alignment of the pigment molecules is improved, and the intramolecular and intermolecular mutual action is enhanced, thus a high-level three-dimensional network being easily formed. As a result, hue is improved, and performances required for pigments, such as light fastness, heat fastness, humidity fastness, fastness to an oxidative gas, and solvent resistance, are improved, thus the above-described content being preferred.

The mixing ratio of polymorphic forms in the azo pigment can be confirmed from values obtained by physicochemical measurement of solid such as X-ray crystal structure analysis of single crystal, powder X-ray diffractometry (XRD), microscopic photography of the crystals (TEM), or IR (KBr method).

Control of the above-described tautomerism and/or polymorphism may be achieved by controlling production conditions upon coupling reaction.

Also, with those which have acid groups among the azo pigments of the invention represented by the general formula (1), part or all of the acid groups may be in a salt form, or the pigment may be a mixture of a salt type pigment and a free acid type pigment. Examples of the above-described salt type include salts of an alkali metal such as Na, Li, or K, salts of ammonium optionally substituted by an alkyl group or by a hydroxyalkyl group, and salts of an organic amine. Examples of the organic amine include a lower alkyl amine, a hydroxyl-substituted lower alkyl amine, a carboxy-substituted lower alkyl amine, and a polyamine having from 2 to 10 alkyleneimine units containing from 2 to 4 carbon atoms. With these salt type pigments, they are not necessarily limited to one as to kind, but may be in a mixture of two or more thereof.

Further, as to the structure of the pigment to be used in the invention, in the case where plural acid groups exist in one molecule, the plural acid groups may be of a salt type or an acid type, and may be different from each other.

In the invention, the azo pigments represented by the foregoing general formula (1) may be hydrates which contain water molecules within the crystal.

The azo compounds represented by the general formula can be produced by coupling reaction.

For example, the azo pigment of the invention represented by the general formula (6) can be produced by diazotizing a heterocyclic amine represented by the following general formula (4) under a non-aqueous, acidic condition, subjecting the resulting diazonium salt to coupling reaction with a compound represented by the following general formula (5) in an acidic state, and conducting conventional after-treatment. Azo compounds represented by the general formula (1) can be produced by conducting the similar procedures using a heterocyclic amine corresponding to A in the general formula (1) in place of the compound of the general formula (4).

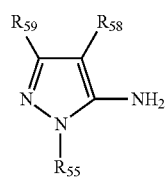

(4)

In the above formula, $R_{55}$, $R_{58}$, and $R_{59}$ are the same as those defined with respect to the foregoing general formula (2-1).

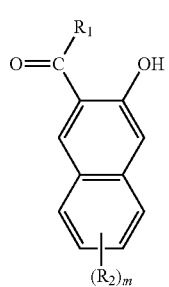

(5)

In the above formula, $R_1$, $R_2$, and m are the same as those defined with respect to the foregoing general formula (1).

The reaction scheme is shown below.

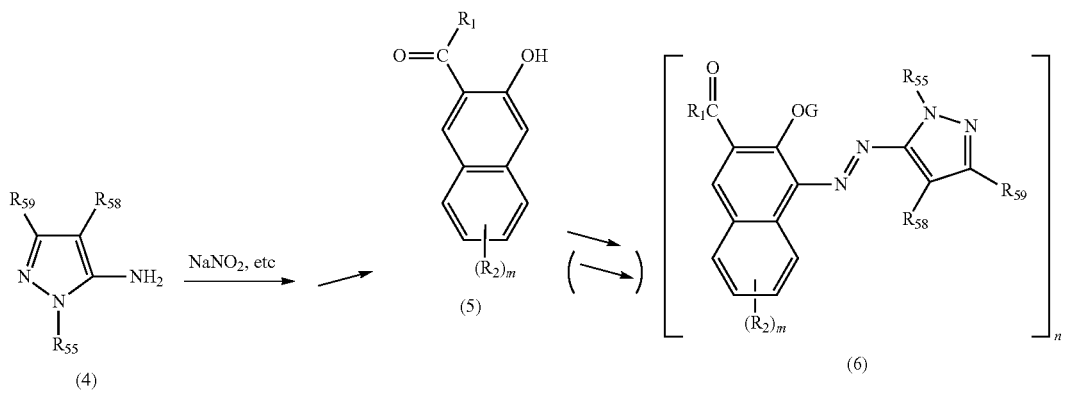

In the above formulae, G, $R_1$ to $R_2$, $R_{55}$, $R_{58}$, $R_{59}$ n, and m are the same as those defined with respect to the foregoing general formula (1) and the general formula (2-1).

Some of the heterocyclic amine corresponding to the amino compound of the above general formula (4), and (A-1) to (A-32) may be commercially available but, generally, the heterocyclic amines may be produced in a conventionally known manner by, for example, the process described in Japanese Patent No. 4,022,271. The heterocyclic coupler represented by the above general formula (5) is commercially available, or can be produced by, or according to, the processes described in JP-A-2008-13472. The diazotization reaction of the heterocyclic amine shown by the above-described reaction scheme can be conducted, for example, by reacting it with a reagent such as sodium nitrite, nitrosylsulfuric acid, or isoamyl nitrite in an acidic solvent such as sulfuric acid, phosphoric acid, or acetic acid at a temperature of 15° C. or less for about 10 minutes to about 6 hours. The coupling reaction is preferably conducted by reacting the diazonium salt obtained by the above-mentioned process with the compound represented by the above general formula (5) at 40° C. or less, preferably 25° C. or less, for about 10 minutes to about 12 hours.

Regarding synthesis of the azo pigments of the general formula (1) wherein n is 2 or more, they can be synthesized in the same manner as in the aforesaid scheme by synthesizing a raw material wherein a substitutable divalent, trivalent, or tetravalent substituent is introduced into $R_{41}$ to $R_{42}$, $R_{55}$, $R_{58}$, $R_{59}$, and the like in the general formula (4) or (5).

[(B) Pigment Derivatives]

Next, a pigment derivative (B) having a hydrophilic group and represented by the general formula (B1) (hereinafter also referred to as "pigment derivative" or "pigment derivative having a hydrophilic group" in some cases) will be described. Flooding due to aggregation of pigment can be prevented by incorporating such pigment derivative, whereby a coated film having distinct and excellent gloss can be obtained.

That is, upon production of a pigment composition, the pigment can be well dispersed by mixing the pigment derivative having a hydrophilic group with the pigment in water or the like, with the pigment derivative being adsorbed on the surface of the pigment. Thereafter, when the pigment composition is dispersed in a hydrophobic resin or the like upon use of the pigment in an ink or in a coloring composition, the pigment derivative having a hydrophilic group difficultly desorbs from the pigment, and hence dispersion of the pigment is stabilized for a long time due to electrostatic effect or the like. Therefore, ejection stability or the like is also improved.

(B1)

In the general formula (B1), P represents an anthanthrone series colorant residue, an anthraquinone series colorant residue, an anthrapyrimidine series colorant residue, an azo series colorant residue, a quinacridone series colorant residue, a quinophthalone series colorant residue, a diketopyrrolopyrrole series colorant residue, a dioxazine series colorant residue, a flavanthrone series colorant residue, an indanthrone series colorant residue, an isoindoline series colorant residue, an isoindolinone series colorant residue, an isoviolanthrone series colorant residue, a metal complex series colorant residue, a perinone series colorant residue, a perylene series colorant residue, a pthalocyanine series colorant residue, a pyranthrone series colorant residue, a pyrazoloquinazolone series colorant residue, a thioindigo series colorant residue, or a triarylcarbonium series colorant residue. X represents —$SO_3$.M/m or —COO.M/m wherein M represents a counter ion selected from the group consisting of a hydrogen ion, a 1- to 3-valent metal ion, and an ammonium ion, and m represents a valence number of M, which represents an integer of 1 to 3 or an amino group. n1 represents an integer of from 1 to 4.

It is preferred that the pigment derivative is at least one member selected from the group consisting of a diketopyrrolopyrrole series pigment derivative, a quinacridone series pigment derivative, an anthraquinone series pigment derivative, and an azo series pigment derivative, and an azo series pigment derivative is further preferable.

In the general formula (B1), the colorant residue represented by P is particularly preferably at least one member selected from the group consisting of a diketopyrrolopyrrole series pigment derivative, a quinacridon series pigment derivative, an anthraquinone series pigment derivative, and an azo series pigment derivative, more preferably an azo series pigment derivative, still more preferably arylazonaphthol. In view of the effects, a colorant residue derived from an azo series pigment having the same colorant structure as, or similar colorant structure to, the pigment structure which the above-described pigment has, is preferred. Also, the azo compound has a flat structure due to intramolecular hydrogen bond and, in addition, has a $\pi$ plane of electron-rich naphthol structure and a $\pi$ plane of electron-insufficient aromatic 5- or 6-membered heterocyclic structure (e.g., a pyrazole ring structure or a pyrimidine ring structure), which it planes are absolutely different from each other in electron state, and hence the azo compound is presumed to exhibit strong intermolecular action with the organic pigments (A) which are in various electron states. Hence, the azo compound can so strongly absorbs onto the above-described azo pigment due to the $\pi$-$\pi$ mutual action that the pigment onto which the azo compound adsorbs come to have a hydrophilic group on its surface, thus dispersibility being improved due to the electrostatic effect.

For example, to illustrate more specific examples in terms of generic names of Color Index, the diketopyrrolopyrrole series pigment is exemplified by red pigments of C.I. pigment red 254, pigment red 255, pigment red 264, and pigment red 272, and orange pigments of pigment orange 71 and pigment orange 773, with pigment red 254 being particularly preferred because it can expand the scope of color reproduction and has excellent color tone.

As the anthraquinone series pigment, there are illustrated C.I. pigment red 177, etc.

As the quinacridone series pigment, there are illustrated C.I. pigment violet 19, C.I. pigment red 122, C.I. pigment red 202, C.I. pigment red 209, etc.

As the azo pigment, there can be illustrated C.I. pigment red 7, 14, 41, 48:1, 48:2, 48:3, 48:4, 146, 177, 178, 184, 185, 187, 200, 202, 208, 210, 246, 254, 255, 264, and 272. Preferred are C.I. pigment red 7, 14, 41, 146, 178, 184, 185, 187, 200, 208, 210, and 246. Particularly preferred are those pigments wherein a heteryl group and a naphthol group are connected to each other through an azo group. Most preferred are those pigments which have the structure of the azo compound represented by the above general formula (1) which compound is used in the invention as an azo pigment.

[Hydrophilic Group]

The azo pigment derivative represented by the general formula (B1) has a hydrophilic group. The azo pigment derivative represented by the general formula (B1) has preferably at least one hydrophilic group as a substituent, more preferably two or more hydrophilic groups, still more preferably three or more hydrophilic groups.

Generation of bronze phenomenon of image can markedly be suppressed without spoiling the performance of hue and fastness by the presence of the hydrophilic group in the azo pigment derivative represented by the general formula (B1).

In the general formula (B1), the hydrophilic group represented by X and introduced into the pigment is preferably —$SO_3$.M/m or —COO.M/m wherein M represents a counter ion selected form the group consisting of a hydrogen ion, a 1- to 3-valent metal ion, and an ammonium ion, and m represents a valence number of M (an integer of 1 to 3) or an amino group. In the case where the hydrophilic group is an acid group, —$SO_3$.M/m is preferred and, in the case where the hydrophilic group is a base group, a tertiary amino group is preferred. It is preferred to introduce at least one of these but, in view of fastness of the pigment composition, the number of the hydrophilic group is preferably 3 or less, with 1 being most preferred.

Any substituent in the general formulae (B2) to (B3) may have the hydrophilic group represented by X but, preferably, one of $R_{B21}$, $A_{B2}$, $R_{B10}$, and $R_{B11}$ has the hydrophilic group and, more preferably, either of $R_{B21}$ and $R_{B10}$ has the hydrophilic group.

Also, the number of the hydrophilic group is preferably 3 or less, most preferably 1.

The hydrophilic group may be in a salt state and, as a counter cation for forming the salt, there are illustrated alkali metal ions (e.g., lithium ion, sodium ion, potassium ion, etc.), alkaline earth metal ions (e.g., magnesium ion, calcium ion, etc.), a quaternary ammonium ion, a quaternary phosphonium ion, a sulfonium ion, and organic counter ions (e.g., pyridinium, tetramethylammonium, guanidinium, etc.). Of these, alkali metal ions are preferred, with lithium ion being more preferred.

The counter cation in the hydrophilic group which the azo pigment derivative represented by the general formula (B1) has is preferably mainly composed of lithium ion.

The counter cation is not necessarily be composed of lithium ion alone but, substantially, it is preferred that the counter cation existing in the highest ratio is lithium ion. Under the condition of such existing ratio, other ions such as hydrogen ion, an alkali metal ion (e.g., sodium ion or potassium ion), an alkaline earth metal ion (e.g., magnesium ion or calcium ion), a quaternary ammonium ion, a quaternary phosphonium ion, a sulfonium ion, etc. are allowed to exist as a counter cation.

The types and ratios of the counter cations in the above-described azo pigment derivative are described in detailed sections on analysis method and elements in "*Shin Jikken Kagaku Koza 9, Bunseki Kagaku*", edited by The Chemical Society of Japan (1977, published by Maruzen Co., Ltd.) and "*Jikken Kagaku Koza 15, Bunseki, 4th edition*", edited by The Chemical Society of Japan (1991, published by Maruzen Co., Ltd.). Thus, with reference to those books, the analysis method may be selected for analysis and quantitative determination of the counter cations. Of those, an analysis method, e.g. ion chromatography, atomic absorption method, or inductively coupled plasma-atomic emission spectroscopy (ICP) may be used for easy determination of the types and ratios of the counter cations.

The ratio of the lithium ion in the above-described azo pigment derivative, to the total counter ions, is preferably 50% or more, more preferably 60% or more, still more preferably 80% or more, particularly preferably 90% or more, and an upper limit thereof is preferably 100%.

As a process for obtaining the azo pigment derivative of the invention wherein the counter cation is lithium ion, any process may be employed. For example, there are illustrated, for example, (1) a process of converting the counter cation from other cation to lithium ion by using an ion-exchange resin, (2) a process of conducting acid deposition or salting-out from a system containing lithium ion, (3) a process of forming an azo pigment derivative by using a starting material wherein the counter cation is lithium ion and using a synthetic intermediate, (4) a process of introducing a hydrophilic group by using a reactant wherein the counter cation is lithium ion to convert the functional group in the azo compound, and (5) a process of synthesizing an azo compound wherein the hydrophilic group has silver ion as a counter cation, reacting this with a lithium halide solution, and removing precipitated silver halide to thereby convert the counter cation to lithium ion.

Specifically, the azo pigments derivative represented by the foregoing general formula (B1) are preferably compounds described as specific examples in Japanese Patent No. 4082818 and azo pigment derivatives represented by the following general formula (B2).

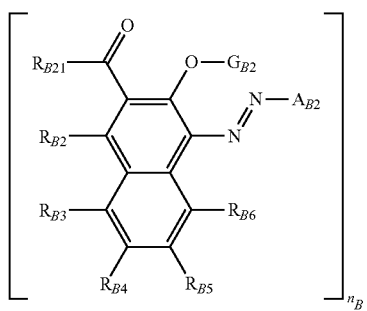

General Formula (B2)

In the general formula (B2), $G_{B2}$ represents a hydrogen atom, an aliphatic group, an aryl group, a heterocyclic group, or a hydrophilic group, $R_{B21}$ represents an amino group, an aliphatic oxy group, a heterocyclic group connected at the nitrogen atom, or a hydrophilic group, $R_{B2}$ to $R_{B6}$ each independently represents a hydrogen atom or a substituent. $A_{B2}$ represents an aryl group or a heterocyclic group. At least one of $R_{B21}$, $R_{B2}$ to $R_{B6}$, and $A_{B2}$ has a hydrophilic group. $n_B$ represents an integer of from 1 to 4. When $n_B=2$, the general formula (B2) represents a dimer formed through $R_{B21}$, $R_{B2}$ to $R_{B6}$, $A_{B2}$, or $G_{B2}$. When $n_B=3$, the general formula represents a trimer formed through $R_{B21}$, $R_{B2}$ to $R_{B6}$, $A_{B2}$, or $G_{B2}$. When $n_B=4$, the general formula represents a tetramer formed through $R_{B21}$, $R_{B2}$ to $R_{B6}$, $A_{B2}$, or $G_{B2}$.

The aliphatic group, aryl group, and heterocyclic group represented by $G_{B2}$ are the same as those which have been described with G in the general formula (1). In view of the effects of the invention, $G_{B2}$ is preferably a hydrogen atom.

The amino group represented by $R_{B21}$ may have a substituent. As a group which may be the substituent, any group that has been described hereinbefore in the aforesaid paragraph on substituents and that is substitutable may be employed, and preferred substituents are an aliphatic group, an aryl group, a heterocyclic group, etc. The amino group which is represented by $R_{B21}$ and which may have a substituent is preferably an unsubstituted amino group, an alkylamino group containing a total of from 1 to 10 carbon atoms, a dialkylamino group containing a total of from 2 to 10 carbon atoms, an arylamino group containing a total of from 6 to 12 carbon atoms, or a saturated or unsaturated heterocyclic amino group containing a total of from 2 to 12 carbon atoms, more preferably an unsubstituted amino group, an alkylamino group containing a total of from 1 to 8 carbon atoms, a dialkylamino group containing a total of from 2 to 8 carbon atoms, an arylamino group containing a total of from 6 to 10 carbon atoms, or a saturated or unsaturated heterocyclic amino group containing a total of from 2 to 12 carbon atoms. Examples thereof include methylamino, N,N-dimethylamino, N-phenylamino, and N-(2-pyrimidyl)amino.

The aliphatic oxy group represented by $R_{B21}$ may have a substituent. As the substituent, any group that has been described hereinbefore in the aforesaid paragraph on substituents and that is substitutable may be employed. As the aliphatic oxy group of $R_{B21}$, an alkoxy group containing a total of from 1 to 8 carbon atoms is preferred, an alkoxy group containing a total of from 1 to 4 carbon atoms is more preferred. Examples thereof include methoxy, ethoxy, (t)-butoxy, methoxyethoxy, and carbamoylmethoxy.

The heterocyclic group connected through the nitrogen atom and represented by $R_{B21}$ may be a saturated heterocyclic group or an unsaturated heterocyclic group, and may have a substituent. As the substituent, any group that has been described hereinbefore in the aforesaid paragraph on substituents and that is substitutable may be employed. The heterocyclic group connected through the nitrogen atom and represented by $R_{B21}$ is preferably a heterocyclic group connected through the nitrogen atom and containing a total of from 2 to 10 carbon atoms, more preferably a saturated heterocyclic group connected through the nitrogen atom and containing a total of from 2 to 8 carbon atoms. Examples thereof include 1-piperidyl, 4-morpholinyl, 2-pyrimidyl, and 4-pyridyl.

In view of the effects of the invention, $R_{B21}$ is preferably an amino group which may have a substituent, or a saturated heterocyclic group connected at the nitrogen atom, more preferably an amino group which may have a substituent. As the substituent which the amino group may have, there are illustrated an alkyl group and an aryl group, with a phenyl group having a substituent being preferred.

As substituents represented by $R_{B2}$ to $R_{B6}$, there can preferably be illustrated those which have been described with $R_2$ to $R_6$ in the general formula (1), and a hydrophilic group.

In view of the effects of the invention, $R_{B2}$ to $R_{B6}$ each preferably represents a hydrogen atom, an aliphatic oxycarbonyl group, or a carbamoyl group which may have a substituent.

As the substituent represented by $A_{B2}$, an aryl group such as a phenyl group or a naphthyl group is preferred, with a phenyl group being particularly preferred. This aryl group may have a substituent and, as the substituent for the aryl group, a hydrogen atom, a halogen atom, a nitro group, a hydroxyl group, a sulfo group, a carboxyl group, an aliphatic group, an aryl group, a heterocyclic group, an aliphatic oxycarbonyl group, a carbamoyl group which may have a substituent, an amino group which may have a substituent, a sulfonamido group, an aliphatic oxy group, an aliphatic thio group, a cyano group, etc. are preferred, and a hydrogen atom, a halogen atom, a nitro group, a sulfo group, an aliphatic group, a carbamoyl group which may have a substituent, and an aliphatic oxy group are more preferred.

$A_{B2}$ is preferably a phenyl group having a substituent selected from the group consisting of a hydrophilic group, a nitro group, a halogen group, an aliphatic group, hydroxyl group, and a sulfo group.

It is also preferred that $A_{B2}$ is a substituent represented by the general formulae (A-1) to (A-18), (A-20) to (A-28), (A-30) to (A-32).

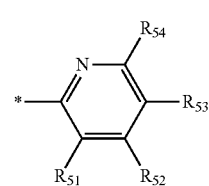

(A-1)

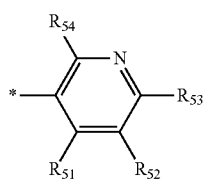 (A-2)
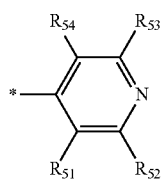 (A-3)
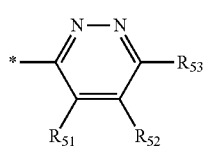 (A-4)
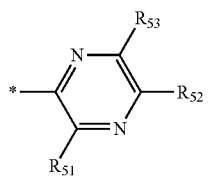 (A-5)
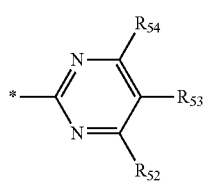 (A-6)
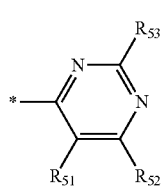 (A-7)
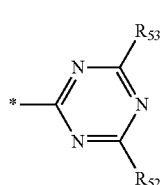 (A-8)
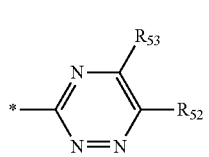 (A-9)
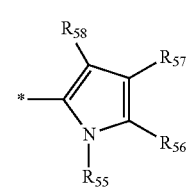 (A-10)
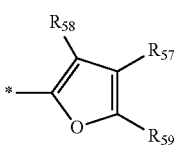 (A-11)
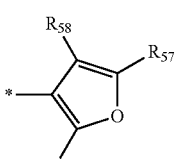 (A-12)
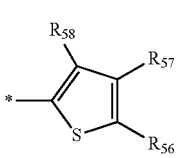 (A-13)
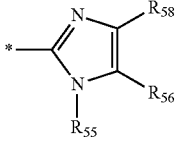 (A-14)
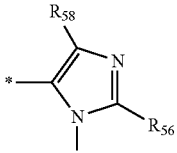 (A-15)
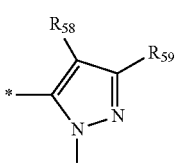 (A-16)
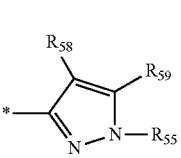 (A-17)
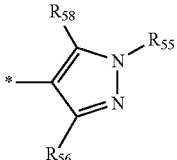 (A-18)
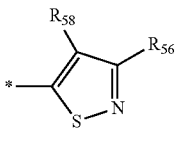 (A-20)
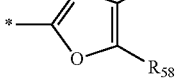 (A-21)

-continued (A-22) 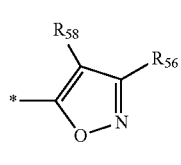

(A-23) 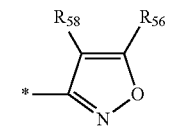

(A-24) 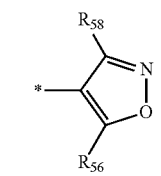

(A-25) 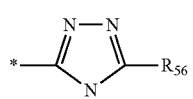

(A-26) 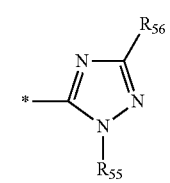

(A-27) 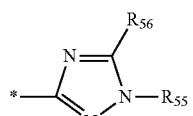

(A-28) 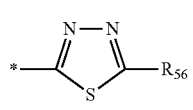

(A-30) 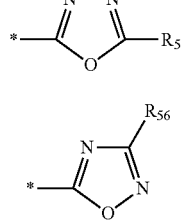

(A-31) 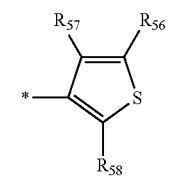

(A-32)

In the general formulae (A-1) to (A-18), (A-20) to (A-28), and (A-30) to (A-32), $R_{51}$ to $R_{59}$ each represents a hydrogen atom or a substituent, and adjacent substituents may be connected to each other to form a 5- or 6-membered ring. * shows the position connected to the azo group in the general formula (B2).

The general formulae (A-1) to (A-18), (A-20) to (A-28), and (A-30) to (A-32) which are represented as $A_{B2}$ is the same as those represented as $A_2'$, and preferred substituent is also the same.

In view of the effects of the invention, the pigment derivative represented by the general formula (B2) is preferably a pigment derivative wherein $G_{B2}$ is a hydrogen atom, $R_{B21}$ is an amino group which may have a substituent or a saturated heterocyclic group connected through the nitrogen atom, 4 or 5 of $R_{B2}$ to $R_{B6}$ are hydrogen atoms, 4 of $R_{B2}$ to $R_{B6}$ are hydrogen atoms and the remaining one is a hydrogen atom, a sulfonyl group, an aliphatic oxy group, an aliphatic oxycarbonyl group, or a carbamoyl group which may have a substituent, $R_{B11}$ is a hydrogen atom, a halogen atom, a nitro group, a sulfo group, an aliphatic group, a carbamoyl group which may have a substituent, or an aliphatic oxy group, $A_{B2}$ is an aryl group, $n_B$ represents 1 or 2, more preferably a pigment derivative wherein $G_{B2}$ is a hydrogen atom, $R_{B21}$ is an amino group which may have a substituent, or a saturated heterocyclic group connected through the nitrogen atom, 5 of $R_{B2}$ to $R_{B6}$ are hydrogen atoms, $A_{B2}$ is a phenyl group having a substituent, and $n_B$ is 1 or 2, still more preferably a pigment derivative wherein $G_{B2}$ is a hydrogen atom, $R_{B21}$ is an amino group which may have a substituent, 5 of $R_{B2}$ to $R_{B6}$ are hydrogen atoms, $A_{B2}$ is a phenyl group having a hydrophilic group, and $n_B$ is 1 or 2, most preferably a pigment derivative wherein $G_{B2}$ is a hydrogen atom, $R_{B21}$ is an anilino group which may have a substituent, 5 of $R_{B2}$ to $R_{B6}$ are hydrogen atoms, $A_{B2}$ is a phenyl group having a hydrophilic group, and $n_B$ is 1.

In view of the effects of the invention, the azo pigment derivative represented by the general formula (B2) is preferably an azo pigment derivative represented by the following general formula (B3).

The azo compounds represented by the general formula (B3), the tautomers of the azo compounds, and the salts or hydrates thereof will be described in detail below.

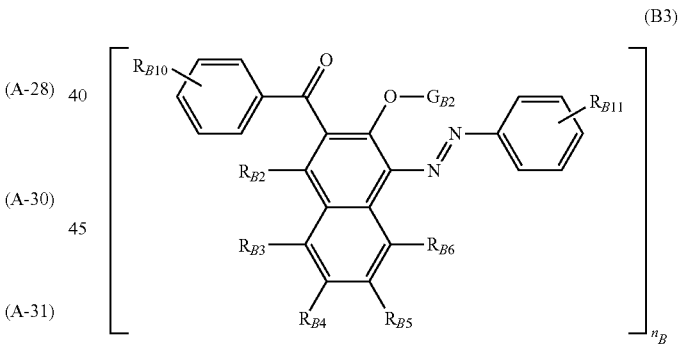

(B3)

In the general formula (B3), $R_{B2}$ to $R_{B6}$, $G_{B2}$, and $n_B$ are the same as defined with respect to the general formula (B2). $R_{B10}$ and $R_{B11}$ each represents a hydrogen atom or a substituent.

As substituents represented by $R_{B2}$ to $R_{B6}$, there can be illustrated those which have been described with respect to $R_2$ to $R_6$ in the general formula (1), and a hydrophilic group.

In view of the effects of the invention, $R_{B2}$ to $R_{B6}$ each preferably represents a hydrogen atom, a sulfonyl group, an aliphatic oxy group, an aliphatic oxycarbonyl group, or a carbamoyl group which may have a substituent, more preferably represents a hydrogen atom or a carbamoyl group which may have a substituent, and most preferably represents a hydrogen atom.

As $R_{B10}$, there can be illustrated a hydrogen atom and a substituent.

In view of the effects of the invention, $R_{B10}$ preferably represents a hydrogen atom, a halogen atom, a hydroxyl group, a sulfo group, a carboxyl group, an aliphatic group, an aryl group, a heterocyclic group, an aliphatic oxycarbonyl group, a carbamoyl group which may have a substituent, an amino group which may have a substituent, a sulfonamido group, an aliphatic oxy group, an aliphatic thio group, a cyano group, or the like, and more preferably represents a hydrogen atom, a sulfo group, an aliphatic group, a carbamoyl group which may have a substituent, or an aliphatic oxy group.

As the substituent represented by $R_{B11}$, there can be illustrated a hydrogen atom and a substituent.

In view of the effects of the invention, $R_{B11}$ preferably represents a hydrogen atom, a halogen atom, a nitro group, a hydroxyl group, a sulfo group, a carboxyl group, an aliphatic group, an aryl group, a heterocyclic group, an aliphatic oxycarbonyl group, a carbamoyl group which may have a substituent, an amino group which may have a substituent, a sulfonamido group, an aliphatic oxy group, an aliphatic thio group, a cyano group, etc. are preferred, and a hydrogen atom, a halogen atom, a nitro group, a sulfo group, an aliphatic group, a carbamoyl group which may have a substituent, and an aliphatic oxy group are more preferred.

In view of the effects of the invention, the pigment represented by the general formula (B3) is preferably a pigment wherein $G_{B2}$ is a hydrogen atom, $R_{B10}$ is a hydrogen atom, a sulfo group, an aliphatic group, a carbamoyl group which may have a substituent, or an aliphatic oxy group, 4 of $R_{B2}$ to $R_{B6}$ are hydrogen atoms and the remaining one is a hydrogen atom, a sulfonyl group, an aliphatic oxy group, an aliphatic oxycarbonyl group, or a carbamoyl group which may have a substituent, $R_{B10}$ is a hydrogen atom, a halogen atom, a nitro group, a sulfo group, an aliphatic group, a carbamoyl group which may have a substituent, or an aliphatic oxy group, n represents 1 or 2, more preferably a pigment wherein $G_{B2}$ is a hydrogen atom, $R_{B10}$ is a sulfo group, an aliphatic group, a carbamoyl group which may have a substituent, or an aliphatic oxy group, 5 of $R_{B2}$ to $R_{B6}$ are hydrogen atoms, $R_{B11}$ is a hydrogen atom, a halogen atom, a nitro group, a sulfo group, an aliphatic group, a carbamoyl group which may have a substituent, or an aliphatic oxy group, and n represents 1 or 2, most preferably a pigment wherein $G_{B2}$ is a hydrogen atom, $R_{B10}$ is a sulfo group, an aliphatic group, a carbamoyl group which may have a substituent, or an aliphatic oxy group, 5 of $R_{B2}$ to $R_{B6}$ are hydrogen atoms, $R_{B11}$ is a hydrogen atom, a sulfo group, an aliphatic group, or a carbamoyl group which may have a substituent, and n represents 1 or 2.

In view of the effects of the invention, the azo pigment derivatives represented by the general formulae (B1) to (B3) have a "total carbon number/number of azo groups" ratio of 40 or less, more preferably 30 or less. In view of the effects of the invention, the azo pigment derivatives represented by the general formulae (B1) to (B3) preferably has a "molecular weight/azo group number" ratio of 700 or less.

The invention includes in its scope tautomers of the azo pigment derivatives represented by the general formulae (B1) to (B3).

Although the azo pigment derivatives represented by the general formulae (B1) to (B3) are shown in the form of limiting structure among several tautomer forms which are possible in view of chemical structure, they may be tautomers of other structure than the shown ones, and may be used as a mixture containing plural tautomers.

Specific examples of the azo pigment derivatives (A) represented by the foregoing general formulae (B2) and (B3) will be shown below. However, the azo pigment derivatives to be used in the invention are not limited only to the following examples. Also, although the structures of the following specific examples are shown in the form of limiting structure among several tautomer forms which are possible in view of chemical structure, it is needless to say that the azo pigment derivatives may be tautomers of other structure than the shown ones. Additionally, in the following chemical formulae, Me represents a methyl group, Et represents an ethyl group, Bu represents a n-butyl group, and Ph represents a phenyl group.

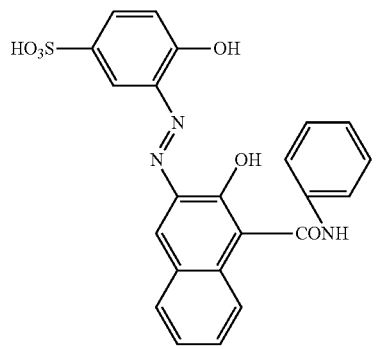

B-1

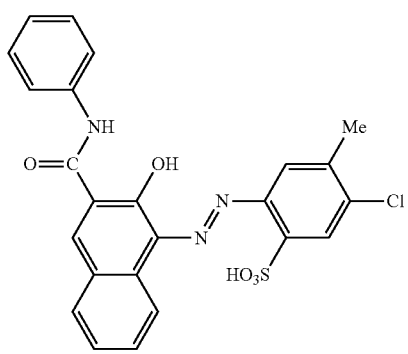

B-2

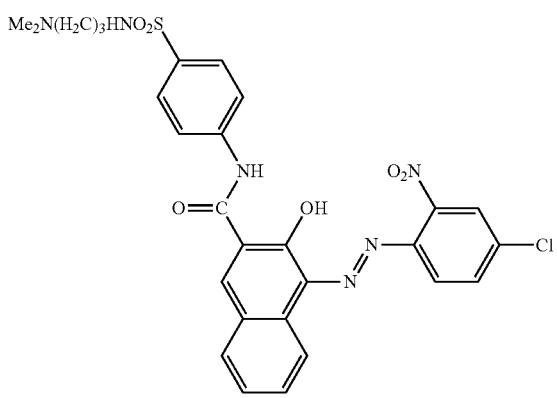

B-3

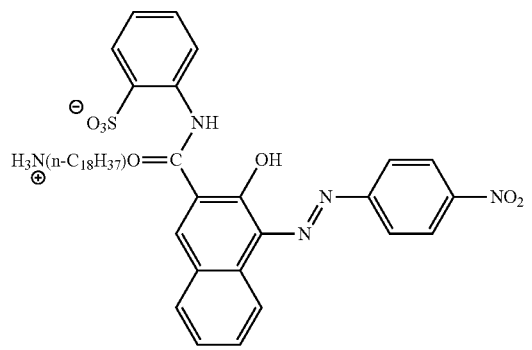

B-4

-continued
B-5
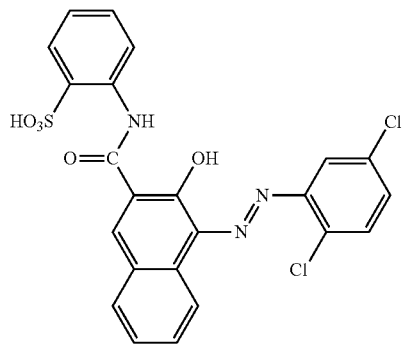
B-6
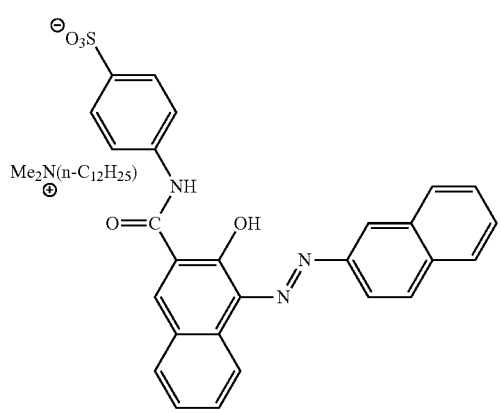
B-7
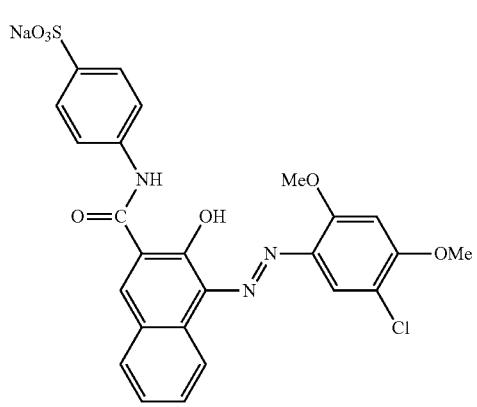
B-8
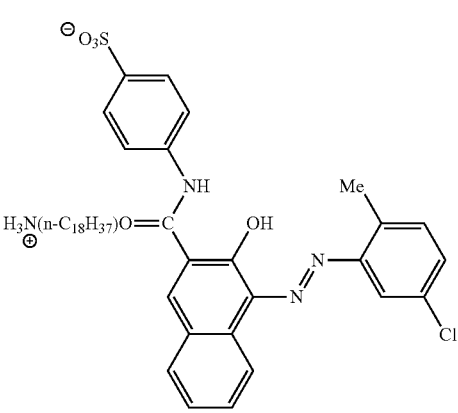
-continued
B-9
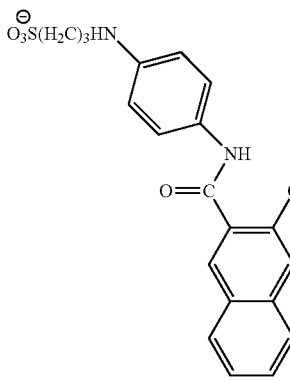
B-10
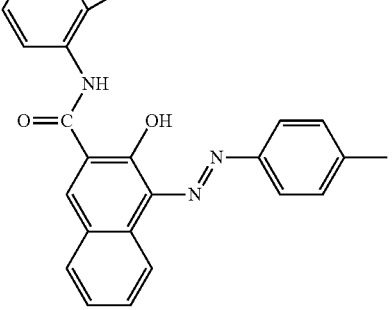
B-11
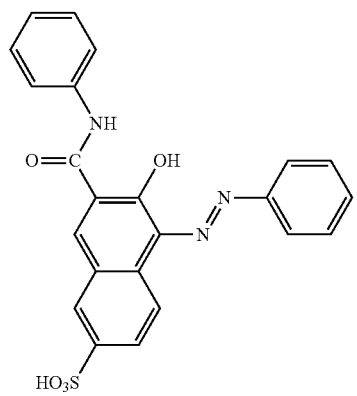
B-12
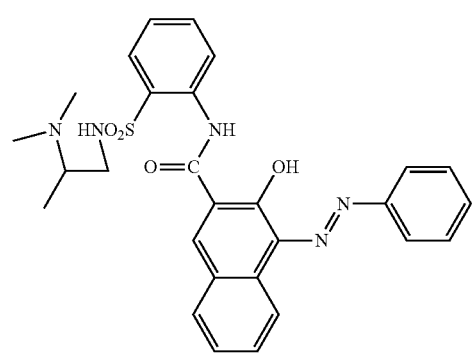

-continued
B-13
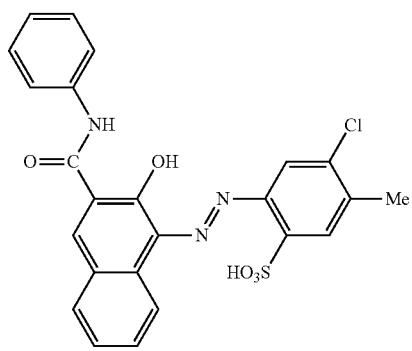
B-14
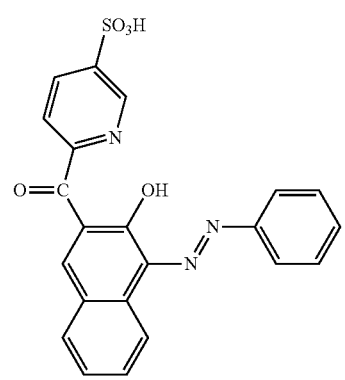
B-15
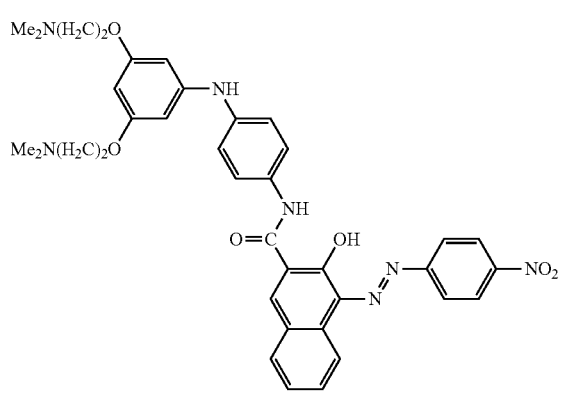
B-16
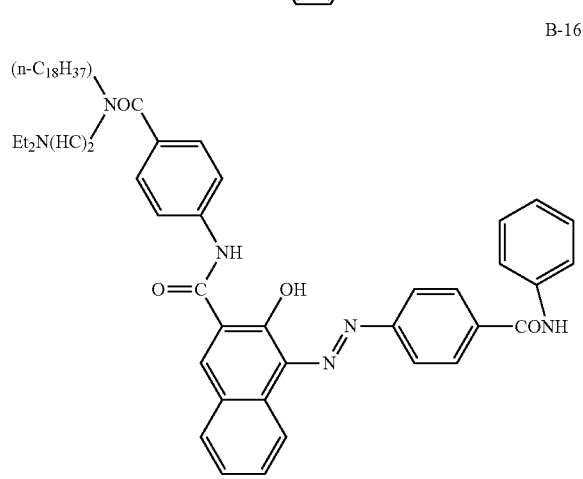
-continued
B-17
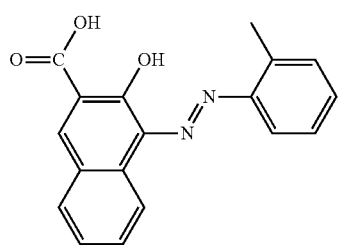
B-18
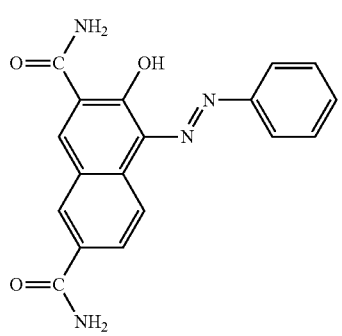
B-19
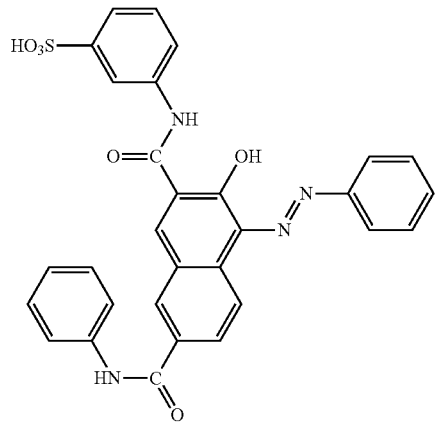
B-20
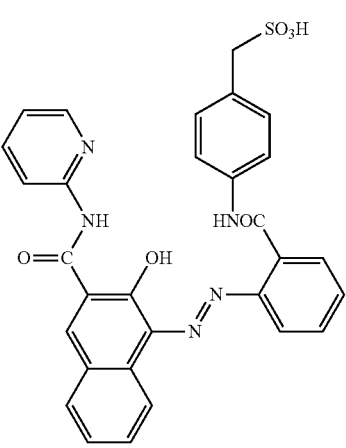

-continued

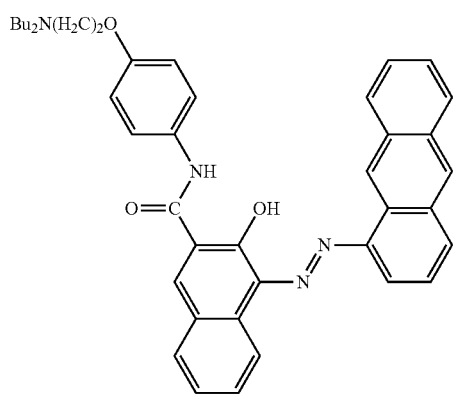
B-21

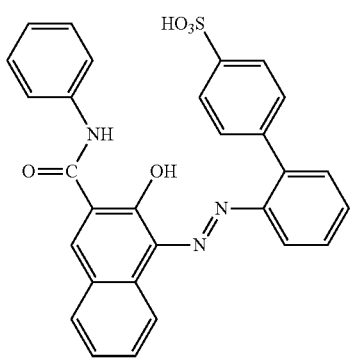
B-22

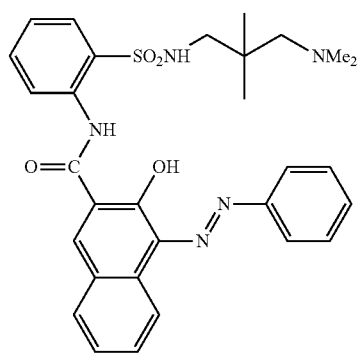
B-23

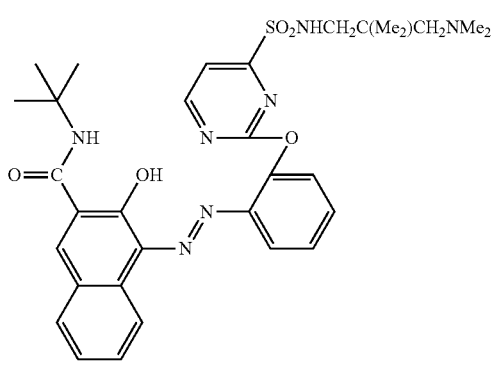
B-24

-continued

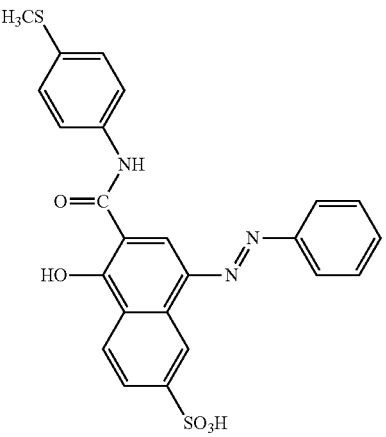
B-25

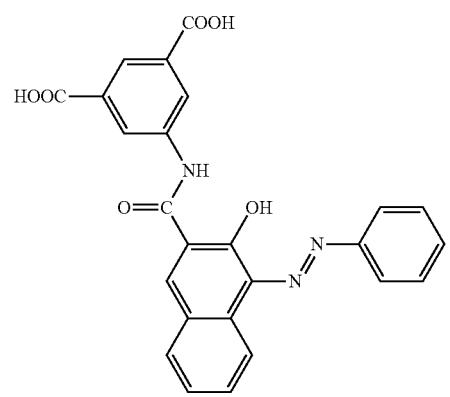
B-26

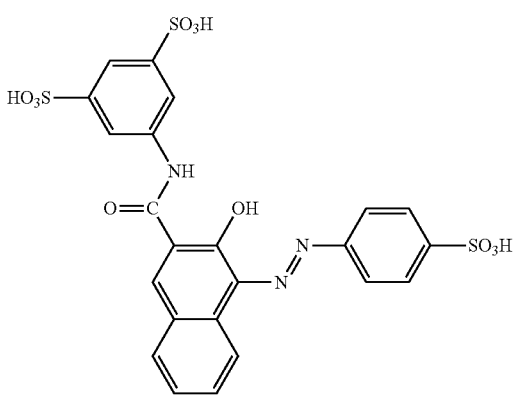
B-27

The azo pigment derivatives represented by the general formulae (B2) and (B3) may have a chemical structure represented by the general formula (B2) or (B3), or a tautomer thereof.

In the invention, the azo pigment derivatives represented by the foregoing general formulae (B2) and (B3) may be hydrates containing water molecules within the crystals thereof.

One example of the process for producing the azo pigment derivative is described. For example, in the case of producing the azo pigment represented by the above general formula (B2), as is the same with production of the compound represented by the foregoing general formula, a corresponding condensed ring amine is diazotized under acidic condition, conducting coupling reaction with a naphthol derivative in an acidic state, and conducting after-treatment in a conventional manner to obtain the azo pigment derivative represented by the general formula (B2).

Some of the heterocyclic amines may be commercially available but, generally, the heterocyclic amines may be produced in a conventionally known manner by, for example, the process described in Japanese Patent No. 4,022,271. The naphthol derivative is commercially available, or can be produced by, or according to, the processes described in JP-A-2008-13472. The diazotization reaction of the heterocyclic amine shown by the above-described reaction scheme can be conducted, for example, by reacting it with a reagent such as sodium nitrite, nitrosylsulfuric acid, or isoamyl nitrite in an acidic solvent such as sulfuric acid, phosphoric acid, or acetic acid at a temperature of 15° C. or less for about 10 minutes to about 6 hours. The coupling reaction is preferably conducted by reacting the diazonium salt obtained by the above-mentioned process with the above-described naphthol derivative at 40° C. or less, preferably 25° C. or less, for about 10 minutes to about 12 hours.

[Pigment Composition]

As is described above, the pigment composition of the invention contains an azo pigment (A) represented by the general formula (1) and a pigment derivative (B) having a hydrophilic group and represented by the general formula (B1). The content of the pigment derivative (B) to the azo pigment (A) is preferably from 0.1 to 30% by weight, more preferably from 0.3 to 20% by weight, still more preferably from 0.5 to 10% by weight. By adjusting the content to this range, the effects of the invention can be more enhanced.

In the invention, the volume-average particle diameter of the azo pigment is preferably from 10 nm to 250 nm. Additionally, the term "volume-average particle diameter of the pigment particles" means the particle diameter of the pigment itself or, in the case where an additive such as a dispersant is adhered to the pigment particles, means the diameter of the particle with the additive being adhered thereto. In the invention, as an apparatus for measuring the volume-average particle diameter of the pigment, a particle size analyzer of Nanotrac UPA (UPA-EX150; manufactured by Nikkiso Co., Ltd.) is used. The measurement is conducted according to a predetermined measuring method placing 3 ml of a pigment dispersion in a measuring cell. Additionally, with respect to parameters to be inputted upon measurement, an ink viscosity is used as a viscosity, and a pigment density is used as a density of the dispersed particles.

The volume-average particle diameter of the azo pigment (A) is more preferably from 10 nm to 250 nm, still more preferably from 20 nm to 230 nm. In case when the volume-average particle diameter of the particles in the pigment dispersion is less than 10 nm, storage stability might not be ensured in some cases whereas, in case when the volume-average particle diameter of the particles in the pigment dispersion exceeds 250 nm, the optical density might be reduced in some cases.

The pigment composition of the invention may be a composition prepared by dispersing the above-described azo pigment (A), the pigment derivative (B), and the aqueous or non-aqueous medium using a dispersing apparatus. As the dispersing apparatus, there can be used a simple stirrer, an impeller-stirring system, an in-line stirring system, a mill system (for example, colloid mill, ball mill, sand mill, beads mill, attritor, roll mill, jet mill, paint shaker, or agitator mill), an ultrasonic wave system, a high-pressure emulsion dispersion system (high-pressure homogenizer; specific commercially available apparatuses being Gaulin homogenizer, a microfluidizer, and DeBEE2000).

In the case where the pigment composition of the invention is a dispersion in an aqueous or non-aqueous medium, the total content of the above-described azo pigment (A) and the above-described pigment derivative (B) is preferably in the range of from 1 to 35% by weight, more preferably in the range of from 2 to 25% by weight. In case when the content is less than 1% by weight, there might be obtained an insufficient image density when independently using the pigment dispersion as an ink. In case when the content exceeds 35% by weight, dispersion stability might be reduced.

Additionally, with respect to the aspect ratio of the azo pigment (A) in the pigment composition of the invention, an aspect ratio nearer to 1 is more preferred. By adjusting the aspect ratio to approximately 1, dispersibility in a medium to be colored later and dispersion stability therein are made better, thus re-aggregation of the pigment particles difficultly taking place.

Upon production, the pigment composition can be produced by mixing the azo pigment (A) and the pigment derivative (B) in any order. If necessary, the azo pigment (A) and the pigment derivative (B) may be ground, before, during, or after mixing, by known conventional means such as ball milling or attritor so as to have the above-described preferred average particle diameter as primary particles. Also, in order to realize higher improving effects and easily obtain a pigment dispersion of the aforesaid preferred average particle diameter as primary particles, there can be illustrated a method of subjecting the azo pigment (A) and the pigment derivative to solvent salt milling treatment before mixing with other components such as medium. The solvent salt milling treatment is a method of kneading and milling the mixture of the pigment and the derivative with an inorganic salt and an organic solvent, then removing the organic solvent and the inorganic salt, followed by washing, filtering, drying, pulverizing, etc. of the remaining solid material.

As is described above, as the pigment composition of the invention, there can be illustrated an aqueous or non-aqueous pigment dispersion, with an aqueous pigment dispersion being preferred. As the aqueous liquid which can be used in the pigment composition of the invention for dispersing the pigment, a mixture is used wherein water is a major component and, as needed, a hydrophilic organic solvent is a minor component.

Examples of the aforesaid hydrophilic organic solvent include alcohols such as methanol, ethanol, propanol, isopropanol, butanol, isobutanol, sec-butanol, t-butanol, pentanol, hexanol, cyclohexanol, and benzyl alcohol; polyhydric alcohols such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol; glycol derivatives such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, and ethylene glycol monophenyl ether; amines such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine; formamide; N,N-dimethylformamide; N,N-dimethylacetamide; dimethylsulfoxide; sulfolane; 2-pyrrolidone; N-methyl-2- pyrrolidone; N-vinyl-2-pyrolidone; 2-oxazolidone; 1,3-dimethyl-2-imidazolidinone; acetonitrile; and acetone.

Further, the pigment composition of the invention may contain an aqueous resin. As the aqueous resin, there are illustrated water-soluble resins which dissolve in water, water-dispersible resins which can be dispersed in water, colloidal dispersion resins, and a mixture thereof. Specific examples of the aqueous resins include acryl series resins, styrene-acryl series resins, polyester resins, polyamide resins, polyurethane resins, and fluorine-containing resins.

In the case where the aqueous pigment dispersion in the invention contains the aqueous resin, the content is not particularly limited. For example, the content may be from 0 to 100% by weight based on the weight of the pigment.

Further, in order to improve dispersibility of the pigment and quality of image, a surfactant (dispersant) may be used. As the surfactant, there are illustrated anionic, nonionic, cationic, and amphoteric surfactants, and any of them may be used. However, anionic or nonionic surfactants are preferred to use.

In the case where the pigment composition in the invention contains the surfactant, the content is not particularly limited. For example, the content may be from 0 to 100% by weight based on the weight of the pigment.

Examples of the anionic surfactants include aliphatic acid salts (e.g. sodium oleate, etc.), alkyl sulfate salts, alkylbenzene sulfonate salts, alkylnaphthalene sulfonate salts, dialkyl sulfosuccinate salts, alkyldiaryl ether disulfonate salts, alkyl phosphate salts, polyoxyethylene alkyl ether sulfate salts, polyoxyethylene alkylaryl ether sulfate salts, naphthalenesulfonic acid-formalin condensates, polyoxyethylene alkyl phosphate salts, glycerol borate fatty acid esters, polyoxyethylene glycerol fatty acid esters and cetyltrimethylammonium bromide.

Examples of the nonionic surfactants include polyoxyethylene alkyl ethers, polyoxyethylene alkylaryl ethers, polyoxyethylene-oxypropylene block copolymers, sorbitan fatty acid esters, polyoxyethylene sorbitan fatty acid esters, polyoxyethylene sorbitol fatty acid esters, glycerin fatty acid esters, polyoxyethylene fatty acid esters, polyoxyethylene alkylamines, fluorine-containing surfactants, and silicon-containing surfactants.

The non-aqueous pigment composition of the invention contains the aforesaid organic pigment dispersed in a non-aqueous vehicle. Examples of resin to be used as the non-aqueous vehicle include petroleum resin, casein, shellac, rosin-modified maleic acid resin, rosin-modified phenol resin, nitrocellulose, cellulose acetate butyrate, cyclized rubber, chlorinated rubber, oxidized rubber, rubber hydrochloride, phenol resin, alkyd resin, polyester resin, unsaturated polyester resin, amino resin, epoxy resin, vinyl resin, vinyl chloride, vinyl chloride-vinyl acetate copolymer, acryl resin, methacryl resin, polyurethane resin, silicone resin, fluorine-containing resin, drying oil, synthetic drying oil, styrene/maleic acid resin, styrene/acryl resin, polyamide resin, polyimide resin, benzoguanamine resin, melamine resin, urea resin, chlorinated polypropylene, butyral resin, and vinylidene chloride resin. It is also possible to use a photocurable resin as the non-aqueous vehicle.

Examples of the solvents to be used in the non-aqueous vehicles include aromatic solvents such as toluene, xylene, and methoxybenzene; acetate series solvents such as ethyl acetate, butyl acetate, propylene glycol monomethyl ether acetate, and propylene glycol monoethyl ether acetate; propionate series solvents such as ethoxyethyl propionate; alcoholic solvents such as methanol and ethanol; ether series solvents such as butyl cellosolve, propylene glycol monomethyl ether, diethylene glycol ethyl ether, and diethylene glycol dimethyl ether; ketone series solvents such as methyl ethyl ketone, methyl isobutyl ketone, and cyclohexanone; aliphatic hydrocarbon series solvents such as hexane; nitrogen-containing compound series solvents such as N,N-dimethylformamide, γ-butyrolactam, N-methyl-2-pyrrolidone, aniline, and pyridine; lactone series solvents such as γ-butyrolactone; and carbamic acid esters such as a 48:52 mixture of methyl carbamate and ethyl carbamate.

As uses of the pigment composition of the invention, there are illustrated image-recording materials for forming images, particularly color images. Specifically, there are illustrated recording materials for an inkjet system which will be described in detail hereinafter, heat-sensitive recording materials, pressure-sensitive recording materials, recording materials for an electro-photographic system, transfer type silver halide light-sensitive materials, printing inks, and recording pens, etc. Materials for an inkjet system, heat-sensitive materials, and recording materials for an electro-photographic system are preferred, with materials for an inkjet system being more preferred.

Also, the pigment composition can be applied to color filters for recording or reproducing a color image in solid photographing devices such as CCDs and in displays such as LCDs and PDPs, and to a coloring solution for coloring various fibers.

[Coloring Composition]

The coloring composition means a composition containing the pigment composition of the invention. The coloring composition of the invention can contain a medium and, in the case where a solvent is used as the medium, the composition is particularly appropriate as an ink for inkjet recording. The coloring composition can be prepared by using an oleophilic medium or an aqueous medium as the medium and dispersing the pigment composition of the invention in the medium. Preferably, the aqueous medium is used as the medium. The coloring composition includes an ink composition excluding the medium. The coloring composition may contain, as needed, other additives within the range of not spoiling the advantages of the invention. Examples of the other additives include known additives (described in JP-A-2003-306623) such as a drying-preventing agent (a wetting agent), an anti-fading agent, an emulsion stabilizer, a penetration accelerator, an ultraviolet ray absorbent, an antiseptic, an antifungal agent, a pH-adjusting agent, a surface tension-adjusting agent, an anti-foaming agent, a viscosity-adjusting agent, a dispersant, a dispersion stabilizer, a rust inhibitor, and a chelating agent. In the case of water-soluble ink compositions, these various additives are added directly to the ink solution. In the case of oil-soluble ink compositions, it is general to add to a dispersion after preparing the azo pigment dispersion, but they may be added to an oil phase or an aqueous phase upon preparation.

[Ink for Inkjet Recording]

Next, the ink of the invention for inkjet recording will be described below. The ink of the invention for inkjet recording (hereinafter also referred to as "ink") contains the pigment dispersion described above, and is preferably prepared by mixing with a water-soluble solvent, water, or the like. However, in the case where no particular problems are involved, the pigment dispersion of the invention described above may be used as such.

In consideration of hue, color density, saturation, and transparency of an image formed on a recording medium, the content of the pigment composition in the ink of the invention is in the range of preferably from 1 to 100% by weight, particularly preferably from 3 to 20% by weight, most preferably from 3 to 10% by weight.

The above-described azo pigment is contained in an amount of preferably from 0.1 part by weight to 20 parts by weight, more preferably from 0.2 part by weight to 10 parts by weight, still more preferably from 1 to 10 parts by weight, in 100 parts by weight of the ink of the invention. Also, the ink of the invention may further contain other pigment in combination with the above-described azo pigment. In the case of using two or more kinds of pigments in combination, the total amount of the pigments is preferably within the above-described range. Such cases apply not only to formation of a mono-color image but to formation of a full-color image.

As the water-soluble solvents to be used in the ink of the invention for inkjet recording, polyhydric alcohols, polyhydric alcohol derivatives, nitrogen-containing solvents, alcohols, and sulfur-containing solvents are used.

Specific examples of the polyhydric alcohols include ethylene glycol, diethylene glycol, propylene glycol, butylenes glycol, triethylene glycol, 1,5-pentanediol, 1,2,6-hexanetriol, and glycerin.

Examples of the aforesaid polyhydric alcohol derivatives include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and an ethylene oxide adduct of diglycerin.

Also, examples of the nitrogen-containing solvents include pyrrolidone, N-methyl-2-pyrrolidone, cyclohexylpyrrolidone, and triethanolamine, examples of the alcohols include ethanol, isopropyl alcohol, butyl alcohol, and benzyl alcohol, and examples of the sulfur-containing solvents include thiodiethanol, thiodiglycerol, sulfolane, and dimethylsulfoxide. Besides, propylene carbonate and ethylene carbonate may also be used.

The water-soluble solvents to be used in the invention may be used alone or as a mixture of two or more thereof. As to the content of the water-soluble solvent, the solvent is used in an amount of from 1% by weight to 60% by weight, preferably from 5% by weight to 40% by weight, based on the total weight of the ink. In case when the content of the water-soluble solvent in the entire ink is less than 1% by weight, there might result an insufficient optical density in some cases whereas, in case when the content exceeds 60% by weight, there might result unstable jet properties of the ink liquid in some cases due to the large viscosity of the liquid.

The preferred physical properties of the ink of the invention are as follows. The surface tension of the ink is preferably from 20 mN/m to 60 mN/m, more preferably from 20 mN/m to 45 mN/m, still more preferably from 25 mN/m to 35 mN/m. In case when the surface tension is less than 20 mN/m, the liquid might, in some cases, overflow onto the nozzle surface of the recording head, thus normal printing not being performed. On the other hand, in case when the surface tension exceeds 60 mN/m, the ink might, in some cases, slowly penetrate into the recording medium, thus the drying time becoming longer. Additionally, the above-described surface tension is measured under the environment of 23° C. and 55% RH by using a Wilhelmy surface tension balance as is the same described hereinbefore.

The viscosity of the ink is preferably from 1.2 mPa·s to 8.0 mPa·s, more preferably from 1.5 mPa·s to 6.0 mPa·s, still more preferably from 1.8 mPa·s to 4.5 mPa·s. In case when the viscosity is more than 8.0 mPa·s, ink ejection properties might, in some cases, be deteriorated. On the other hand, in case when the viscosity is less than 1.2 mPa·s, the long-term ejection properties might be deteriorated in some cases.

Additionally, the viscosity (including that to be described hereinafter) is measured by using a rotational viscometer Rheomat 115 (manufactured by Contraves Co.) at 23° C. and a shear rate of 1,400 $s^{-1}$.

In addition to the above-described individual components, water is added to the ink within an amount of providing the preferred surface tension and viscosity described above. The addition amount of water is not particularly limited, but is in the range of preferably from 10% by weight to 99% by weight, more preferably from 30% by weight to 80% by weight, based on the total weight of the entire ink.

Further, for the purpose of controlling characteristic properties such as improvement of ejection properties, there can be used, as needed, polyethyleneimine, polyamines, polyvinylpyrolidone, polyethylene glycol, cellulose derivatives such as ethyl cellulose and carboxymethyl cellulose, polysaccharides and derivatives thereof, water-soluble polymers, polymer emulsions such as an acrylic polymer emulsion, a polyurethane series emulsion, and a hydrophilic latex, hydrophilic polymer gels, cyclodextrin, macrocyclic amines, dendrimers, crown ethers, urea and derivatives thereof, acetamide, silicone surfactants, and fluorine-containing surfactants.

Also, in order to adjust electrical conductivity and pH, there can be used compounds of alkali metals such as potassium hydroxide, sodium hydroxide, and lithium hydroxide; nitrogen-containing compounds such as ammonium hydroxide, triethanolamine, diethanolamine, ethanolamine, and 2-amino-2-methyl-1-propanol; compounds of alkaline earth metals such as calcium hydroxide; acids such as sulfuric acid, hydrochloric acid, and nitric acid; and salts between a strong acid and a weak alkali, such as ammonium sulfate.

Besides, pH buffers, antioxidants, antifungal agents, viscosity-adjusting agents, electrically conductive agents, ultraviolet ray absorbents, and the like may also be added as needed.

[Coloring Composition for Color Filter]

The coloring composition of the invention for color filter contains the above-described pigment composition of the invention and, preferably, it further contains a polymerizable compound and a solvent.

The amount of the above-described azo pigment in the coloring composition of the invention for color filter is preferably from 0.01 to 2 parts by weight, particularly preferably from 0.1 to 1 part by weight, per 1 part by weight of the polymerizable compound.

[Polymerizable Compounds]

The polymerizable compound may properly be selected in consideration of the production process of a color filter and, as the polymerizable compound, there are illustrated photo-sensitive compounds and/or thermosetting compounds, with photo-sensitive compounds being particularly preferred.

The photo-sensitive compound is selected from at least one of photo-polymerizable resins, photo-polymerizable monomers, and photo-polymerizable oligomers, with those which have an ethylenically unsaturated bond being preferred. It suffices for the coloring composition for color filter to contain a material which becomes a resin in a cured state, and a composition containing only components which are not resinous in an uncured state is included.

As the photo-polymerizable compounds, photo-polymerizable monomers, and photo-polymerizable oligomers, there are illustrated, for example, (meth)acrylates such as 2-hydroxyethyl (meth)acrylate, 2-hydroxypropyl (meth)acrylate, 2-ethylhexyl (meth)acrylate, ethylene glycol di(meth)acrylate, diethylene glycol di(meth)acrylate, triethylene glycol di(meth)acrylate, polyethylene glycol di(meth)acrylate, pentaerythritol di(meth)acrylate, dipentaerythritol tetra(meth)acrylate, dipentaerythritol hexa(meth)acrylate, bisphenol A type epoxy di(meth)acrylate, bisphenol F type epoxy di(meth)acrylate, and bisphenol fluorene type epoxy di(meth)acrylate. Also, there are illustrated vinyl resins such as acrylic acid (co)polymers, (meth)acrylic acid (co)polymers, maleic acid (co)polymers, and resins having an ethylenic double bond in its side chain such as polyethylene oxide, polyvinylpyrrolidone, polyamide, polyurethane, polyether, polyester, etc. These may be used alone or in combination of two or more thereof. The content of the polymerizable compound is from 20 to 95% by weight, preferably from 40 to 80% by weight.

The blending ratio of the polymerizable compound is preferably from 40 to 95% by weight, more preferably from 50 to 90% by weight, based on the weight of all solid components in the composition for color filter. The composition may contain, as needed, other resins or the like. In such cases, the sum amount of the polymerizable resin and the other resins is preferably within the above-described range. Additionally, the term "all solid components" means those components which remain as solid components after drying and curing, with no solvents being contained and monomers being contained.

[Photo-Polymerization Initiators]

In the case of using a photo-sensitive compound as the photo-polymerizable compound, a photo-polymerization initiator is used together with a monomer and/or an oligomer of the photo-sensitive compound. As the photo-polymerization initiator, there are illustrated one or more members selected from among oxime derivatives, benzophenone derivatives, acetophenone derivatives, benzoin derivatives, benzoin ether derivatives, thioxanthone derivatives, anthraquinone derivatives, naphthoquinone derivatives, and triazine derivatives. Known photo-sensitizers may further be used together with these photo-polymerization initiators.

As the thermosetting resins, there are illustrated, for example, melamine resin, urea resin, alkyd resin, epoxy resin, phenol resin, cyclopentadiene resin, etc.

Additionally, in this specification and claims, the terms "photo-sensitive resins" and "thermosetting resins" mean not only cured resins but polymerizable monomers or oligomers as well.

Together with the above-described photo-sensitive resins and/or thermosetting resins, those other resins which are generally used in an ink, such as binder resins having an acid group, and acryl resins and urethane resins may be used.

[Solvent]

The pigment dispersion may be an aqueous system or a non-aqueous system, which depends on the production process of the color filter. For example, in a photo lithography process, a non-aqueous system is preferred and, in an inkjet process, either system may be employed.

As a solvent for the coloring composition of the invention, there are illustrated fatty acid esters such as ethyl acetate, butyl acetate, ethylene glycol monomethyl ether acetate, and propylene glycol monomethyl ether acetate; ketones such as acetone, methyl ethyl ketone, methyl isobutyl ketone, cyclohexanone, and diacetone alcohol; aromatic compounds such as benzene, toluene, and xylene; alcohols such as methanol, ethanol, n-propanol, isopropanol, and n-butanol; glycols such as ethylene glycol, diethylene glycol, triethylene glycol, tetraethylene glycol, polyethylene glycol, propylene glycol, dipropylene glycol, tripropylene glycol, polypropylene glycol, trimethylene glycol, and hexanetriol; glycerin; alkylene glycol monoalkyl ethers such as ethylene glycol monomethyl ether, ethylene glycol monoethyl ether, diethylene glycol monomethyl ether, diethylene glycol monoethyl ether, propylene glycol monomethyl ether, and propylene glycol monoethyl ether; alkylene glycol dialkyl ethers such as triethylene glycol dimethyl ether, triethylene glycol diethyl ether, tetraethylene glycol dimethyl ether, and tetraethylene glycol diethyl ether; ethers such as tetrahydrofuran, dioxane, and diethylene glycol diethyl ether; alkanolamines such as monoethanolamine, diethanolamine, and triethanolamine; nitrogen-containing polar organic solvents such as N,N-dimethylformamide, N,N-dimethylacetamide, N-methyl-2-pyrrolidone, 2-pyrrolidone, and 1,3-dimethyl-2-imidazolidinone; water; and the like.

Of these solvents, water-soluble solvents may be mixed with water to use as an aqueous medium. Also, two or more solvents selected from the above-described solvents excluding water may be mixed to use as an oily medium. The coloring composition in the invention for color filter preferably further contains one or more dispersants selected from among surfactants, silicone series additives, silane series coupling agents, and titanium series coupling agents. These dispersants may be used in combination of two or more thereof.

Specific examples of the aforesaid dispersants will be described below.

The surfactants are not particularly limited as long as they have surface-active action, and there can be illustrated cationic, anionic, nonionic, and amphoteric surfactants, etc. Specific examples include anionic surfactants such as alkane sulfonate salts, straight chain alkylbenzene sulfonate salts, branched alkylbenzene sulfonate salts, alkylnaphthalene sulfonate salts, naphthalenesulfonic acid salt-formaldehyde condensates, alkylsulfate salts, polyoxyethylene alkyl ether sulfate salts, alkyl phosphate salts, polyoxyethylene alkyl ether phosphate salts, and aliphatic monocarbooxylic acid salts; cationic surfactants such as alkylamine salts and quaternary amine salts; nonionic surfactants such as glycerin fatty acid esters, sorbitan fatty acid esters, polyoxyethylene alkyl ethers, polyoxyethylene alkylphenyl ethers, polyethylene glycol fatty acid esters, and polyoxyethylene sorbitan fatty acid esters; amphoteric surfactants such as alkylbetaines; and cationic, anionic, nonionic, and amphoteric high-molecular surfactants.

Specific examples of the silicone series additives include polyalkylsiloxanes, polyalkylphenylsiloxanes, polyorganosiloxanes, polydimethylsiloxane, polyorganosiloxane polyether copolymers, polyfluorosiloxanes, and organosiloxanes. These silicone series additives may be used in combination of two or more thereof.

As specific examples of the silane coupling agents, there are illustrated vinyltrimethoxysilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-glycidoxypropylmethyldiethoxysilane, γ-aminopropyltriethoxysilane, N-phenyl-γ-aminopropyltrimethoxysilane, γ-methacryloxypropyltrimethoxysilane, vinyltriacetoxysilane, methyltrimethoxysilane, dimethyldimethoxysilane, phenyltrimethoxysilane, diphenyldimethoxysilane, methyltriethoxysilane, dimethyldiethoxysilane, phenyltriethoxysilane, diphenyldiethoxysilane, n-butyltrimethoxysilane, isobutyltrimethoxysilane, trimethylmethoxysilane, hydroxypropyltrimethoxysilane, n-hexadecyltrimethoxysilane, and n-octadecyltrimethoxysilane.

As specific examples of the titanium series coupling agents, there are illustrated isopropyltri(N-aminoethylaminoethyl) titanate and dibutoxybistriethanolamine titanate.

The amount of the above-described dispersant to be used is preferably from 0.1 to 100 parts by weight, particularly preferably from 0.5 to 80 parts by weight, per 100 parts by weight of the organic pigment, though depending upon kind of the dispersant to be used.

Methods of using the dispersant are not particularly limited, and may be used according to the known methods for preparing a coloring composition for photolithography process.

[Color Filter]

The invention further provides a color filter formed by using the above-described coloring composition for color filter. The color filter shows a high contrast and good light transmittance. Specifically, it shows light transmittance of preferably 85% or more, more preferably 90% or more, at a wavelength of 650 nm.

For producing the color filter of the invention, any known process may be employed, and there are preferably illustrated a photolithography process and an inkjet process. The photolithography process and the inkjet process will be described in detail below.

1) Photolithography Method

In the case of forming a color filter according to photolithography method, a photo-sensitive resin is used as a polymerizable compound in the coloring composition of the invention for color filter. The photo-sensitive resin is contained in the coloring composition as a monomer and/or an oligomer together with a photo-polymerization initiator, and is cured by irradiation with light to form a film on a transparent substrate.

As the photo-sensitive resin, a polymer or copolymer of the aforesaid polymerizable monomer having one or more ethylenic double bond within the molecule is preferably used.

As these photo-sensitive resins (polymerizable monomers), acrylates and methacrylates are particularly preferred and, specifically, there are illustrated methyl acrylate, methyl methacrylate, butyl methacrylate, butyl acrylate, pentaerythritol tetraacrylate, pentaerythritol tetramethacrylate, pentaerythritol triacrylate, pentaerythritol trimethacrylate, dipentaerythritol hexaacrylate, dipentaerythritol hexamethacrylate, dipentaerythritol pentaacrylate, dipentaerythritol pentamethacrylate, glycerol diacrylate, glycerol dimethacrylate, 1,4-butanediol diacrylate, 1,4-butanediol dimethacrylate, bisphenol A diacrylate, and bisphenol A dimethacrylate.

In the case of using the photolithography method, a binder resin having an acidic group is used in the coloring composition of the invention for color filter in addition to the aforesaid photo-sensitive resin. As the binder resin having an acidic group, there are illustrated resins having a carboxyl group, a hydroxyl group, a sulfonic acid group, or the like, with binder resins having a carboxyl group and/or a hydroxyl group being preferred.

As the above-described binder resins having an acidic group, there are preferably used copolymers between a monomer having an ethylenic double bond, such as those which are selected from acrylates, methacrylates, styrene, vinyl acetate, vinyl chloride, N-vinylpyrrolidone, and acrylamide, and a monomer having an acidic group and an ethylenic double bond, such as those which are selected from acrylic acid, methacrylic acid, p-styrenecarboxylic acid, p-styrenesulfonic acid, p-hydroxystyrene, and maleic anhydride.

The binder resin having an acidic group is used in an amount of preferably from 0.5 to 4 parts by weight, particularly preferably from 1 to 3 parts by weight, per 1 part by weight of the photo-sensitive resin (polymerizable monomer).

As a solvent to be used in the coloring composition for the photolithography method, there are illustrated one or more oily media selected from fatty acid esters, ketones, aromatic compounds, alcohols, glycols, glycerin, alkylene glycol monoalkyl ethers, alkylene glycol dialkyl ethers, ethers, and nitrogen-containing polar organic solvents.

The amount of these solvents to be used is preferably a 3- to 30-fold amount, particularly preferably a 4- to 15-fold amount, based on the whole weight of components other than the solvent in the coloring composition.

Also, the coloring composition in the invention for use in the photolithography method may contain, as needed, known additives in addition to the aforesaid components, such as a wetting agent, an antifading agent, an emulsion stabilizer, an ultraviolet ray absorbent, an antiseptic, an antifungal agent, a pH-adjusting agent, a surface tension-adjusting agent, an anti-foaming agent, a viscosity-adjusting agent, a dispersion stabilizer, a rust inhibitor, and a chelating agent (described in JP-A-2003-306623). These various additives may be added to the oil phase or the aqueous phase upon preparation.

The coloring composition of the invention for color filter can be prepared by the process including a step of uniformly dispersing and dispersing the above-described pigment composition of the invention, the polymerizable compound, a solvent, and other various additives using an apparatus such as a beads mill, a ball mill, a sand mill, a two-roll mill, a three-roll mill, a homogenizer, a kneader, or a vibration dispersing apparatus; and a step of adjusting the viscosity using the aforesaid solvent or the like.

As a method for forming a color filter on a display substrate by using the coloring composition of the invention for color filter, a known photolithography method may be employed. For example, a color filter is obtained by a process including a step of uniformly coating the coloring composition of the invention on a display substrate according to a known method such as a spraying method, a bar-coating method, a roll-coating method, or a spin-coating method; a step of removing the solvent in the ink by heating; a step of exposing a color filter pattern on the display substrate using a high-pressure mercury lamp or the like; an alkali-developing step; a washing step; and a baking step.

2) Inkjet Method

In the case of forming a color filter by employing an inkjet method, the polymerizable compound in the coloring composition of the invention for color filter is not particularly limited, and any conventionally known one which has been used in an ink for inkjet system may be used. A monomer of a photo-sensitive resin and/or a thermosetting resin is preferably used.

As these photo-sensitive resins, there are illustrated acryl resins, methacryl resins, and epoxy resins, with acryl resins and methacryl resins being preferably used. The acryl resins and the methacryl resins are preferably those which are obtained by using a combination of a photo-polymerizable monomer selected from among acrylates, methacrylates, urethane acrylate, urethane methacrylate, acrylamide, methacrylamide, alkyl acrylates, benzyl methacrylate, benzyl acrylate, aminoalkyl methacrylates, etc. and a photo-polymerization initiator selected from among benzophenone derivatives, acetophenone derivatives, benzoin derivatives, benzoin ether derivatives, thioxanthone derivatives, anthraquinone derivatives, naphthoquinone derivatives, and triazine derivatives. Also, in addition to the above-described photo-polymerizable monomers, photo-polymerizable monomers having a hydrophilic group, such as acrylic acid, methacrylic acid, maleic acid, and vinyl acetate may further be added.

As the thermosetting resins, there are illustrated, for example, melamine resin, urea resin, alkyd resin, epoxy resin, phenol resin, and cyclopentadiene resin.

In the case of employing the inkjet process, the solvent to be used in the coloring composition may be an oily medium or an aqueous medium, with an aqueous medium being more preferably used. As the aqueous medium, water or a mixed solvent of water and a water-soluble organic solvent is used, with a mixed solvent of water and a water-soluble organic solvent being preferred. Also, it is preferred to use deionized water.

The oily medium to be used in the above-described coloring composition is not particularly limited, but there can be used, for example, those which have been illustrated as solvents for the coloring composition for use in photolithography.

Solvents to be used in the aqueous medium are selected from among those alcohols, ketones, ethers, glycols, glycerin, alkylene glycol monoalkyl ethers, alkylene glycol dialkyl ethers, alkanolamines, nitrogen-containing polar organic solvents, etc. which are soluble in water. These water-soluble organic solvents may be used alone or in combination of two or more thereof.

The amount of these solvents to be used is not particularly limited, but it is preferred to properly adjust the amount so that the viscosity of the coloring composition at room temperature becomes 20 mPa·s or less, preferably 10 mPa·s or less.

The coloring composition of the invention can be prepared by a process including a step of dispersing and mixing components as is the same with the coloring composition for use in photolithography process. Upon dispersing, a dispersant may be contained, as needed, as is the same with the case of photolithography.

Also, the coloring composition in the invention may contain, as needed, known additives in addition to the aforesaid components, such as a wetting agent, an antifading agent, an emulsion stabilizer, an ultraviolet ray absorbent, an antiseptic, an antifungal agent, a pH-adjusting agent, a surface tension-adjusting agent, an anti-foaming agent, a viscosity-adjusting agent, and a dispersion stabilizer.

Methods for forming a color filter using the coloring composition obtained as described above are not particularly limited, and any known method of forming a color filter according to the inkjet system may be employed. For example, a color filter can be formed by a method including a step of forming a predetermined color filter pattern in a droplet state on a display substrate, a step of drying this, and a step of heat treatment, irradiation with light, or both of them to cure the color filter pattern on the display substrate, thus forming a film.

Although description has been made hereinbefore with respect to photolithography method and inkjet method, the color filter of the invention may be obtained by other method.

In the case of employing other color filter-forming methods (for example, various printing methods such as an offset printing method) than the above-described methods, coloring compositions for color filter and resulting color filters fall within the scope of the invention as long as the coloring composition contains the aforesaid polymerizable compound and the solvent and contains the azo pigment represented by the general formula (1) as a coloring material.

For example, components such as polymerizable compounds, solvents, and additives and formulation upon formation of a color filter may be selected according to conventional examples, and are not limited only to those which have been illustrated with respect to the above-described photolithography method and inkjet method.

The color filter obtained as described above forms pixels together with color filter patterns of G (green) and B (blue) according to a known method. Such filter has an extremely high transparency and excellent spectral characteristics and can provide a liquid crystal display which can display a distinct image with less polarization extinction.

Also, as a method for forming a color filter, there are illustrated a method of first forming a pattern using a photoresist, and then coloring the pattern, and a method of forming a pattern by a photoresist to which a colorant is added as is disclosed in JP-A-4-163552, JP-A-4-128703, and JP-A-4-175753. As a method to be employed in the case of introducing the coloring composition of the invention into a color filter, any of these methods may be employed but, as a preferred method, there can be illustrated a method of: using a positive-working resist composition containing a thermosetting resin, a quinonediazide compound, a cross-linking agent, the pigment composition of the invention, and a solvent; coating the resist composition on a substrate; exposing it through a mask; developing the exposed portions to form a positive resist pattern; exposing the whole surface of the above-described positive resist pattern; and curing the exposed positive resist pattern. Also, an RGB primary color series color filter or a YMC complementary color series color filter can be obtained by forming a black matrix according to a conventional manner. With color filters, too, the amount of the azo pigment to be used in the pigment composition of the invention is not particularly limited, but is preferably from 0.1 to 50% by weight.

As to the thermosetting resin, quinonediazide compound, cross-linking agent, and solvent to be used here and to the amounts of them, those which are described in the aforesaid literatures can preferably be employed.

EXAMPLES

The invention will be specifically described by reference to Examples, but the invention is not limited only to the Examples. In the following Examples, "parts" means "parts by weight".

Synthesis Example 1

Synthesis of Specific Compound D-1

Specific compound example D-1 is synthesized according to the following route.

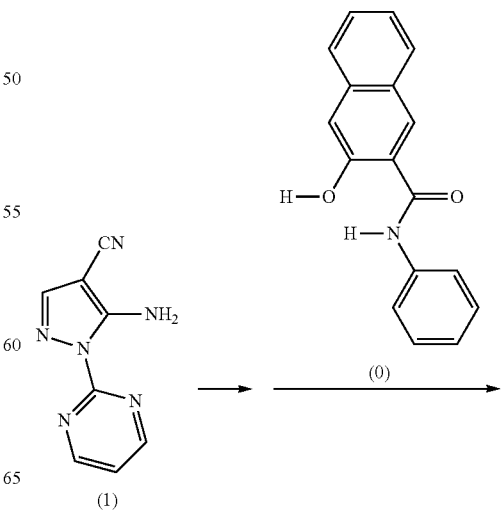

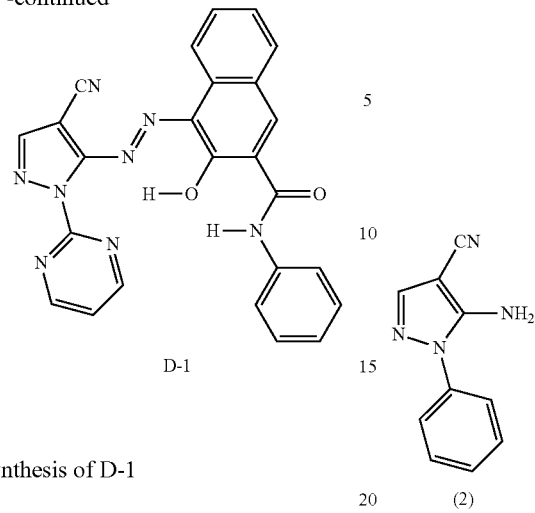

D-1

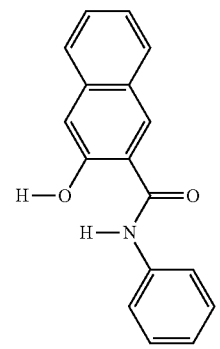

(2)

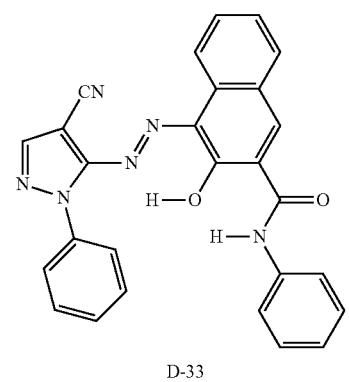

D-33

Synthesis of D-1

1.0 g of compound (1) is added to 10 ml of phosphoric acid (Wako Pure Chemical Industries, Ltd.; special grade reagent; purity: 85%; hereinafter the same) to dissolve. This solution is ice-cooled to keep the temperature to −5 to 0° C., and 0.38 g of sodium nitrite is added thereto, followed by stirring for 1 hour to obtain a diazonium salt solution. Separately, 25 ml of acetonitrile is added to 1.30 g of compound (0) and, under stirring, the aforesaid diazonium salt solution is added thereto at 8° C. or lower. Simultaneously with completion of the addition, the ice bath is removed, and stirring is continued for further 3 hours. 50 ml of acetonitrile is added to the reaction solution, and the resulting mixture is stirred for 30 minutes. Crystals precipitated are collected by filtration, and spray-washed with 30 ml of acetonitrile. The thus-obtained crystals are added, without drying, to 100 ml of water, and a solution prepared by dissolving 0.5 g of sodium hydrogencarbonate in 30 ml of water is added thereto, followed by stirring at 20 to 25° C. for 30 minutes. Crystals precipitated are collected by filtration, and sufficiently spray-washed with water. The thus-obtained crystals are added, without drying, to 50 ml of dimethylacetamide, followed by stirring for 30 minutes at 100° C. After stirring for 30 minutes at room temperature, crystals precipitated are collected by filtration, and spray-washed with 30 ml of dimethylacetamide. The thus-obtained crystals are added, without drying, to 50 ml of dimethylacetamide, 25 ml of water is gradually dropwise added thereto, and the mixture is stirred at 80° C. for 1 hour and, further, at room temperature for 30 minutes. Crystals precipitated are collected by filtration, and spray-washed with 20 ml of dimethylacetamide/water=2/1 and 20 ml of methanol. The thus-obtained crystals are dried to obtain 1.2 g of compound D-1 of the invention. Yield: 52%.

Infrared absorption chart is shown in FIG. 1.

Synthesis Example 2

Synthesis of Specific Compound D-33

Specific compound example D-33 is synthesized according to the following route.

Synthesis of D-33

1.0 g of compound (2) is added to 10 ml of phosphoric acid (Wako Pure Chemical Industries, Ltd.; special grade reagent; purity: 85%; hereinafter the same), and is heated to 30° C. to dissolve. This solution is ice-cooled to keep the temperature to 0 to 5° C., and 0.38 g of sodium nitrite is added thereto, followed by stirring for 1.5 hours to obtain a diazonium salt solution. This diazonium salt solution is dropwise added to a solution of 1.4 g of compound (0) in 5 ml of dimethylacetamide while keeping the temperature at 5 to 10° C., followed by stirring for 1 hour while keeping the temperature at 5 to 10° C. Thereafter, the ice bath is removed, and stirring is continued for further 0.5 hour. 50 ml of ethyl acetate is added to the reaction solution, and the resulting mixture is heated at 80° C. to completely dissolve. To the reaction solution is added 50 ml of hexane, followed by stirring at 80° C. for 20 minutes, then at room temperature for 40 minutes. Crystals precipitated are collected by filtration, and spray-washed with 50 ml of hexane. To the thus-obtained crystals are added, without drying, 200 ml of water and 0.1 ml of saturated sodium hydrogencarbonate to neutralize. 100 ml of acetonitrile is added to the crystals, followed by stirring at 80° C. for 3 hours, then at room temperature for 1 hour. Crystals precipitated are collected by filtration, and spray-washed with 50 ml of acetonitrile. The thus-obtained crystals are dried to obtain 0.51 g of compound D-33 of the invention. Yield: 21%. $\lambda_{max}$: 504 nm, $\epsilon$: 1.59×10$^4$ (CHCl$_3$)

Figure 2:
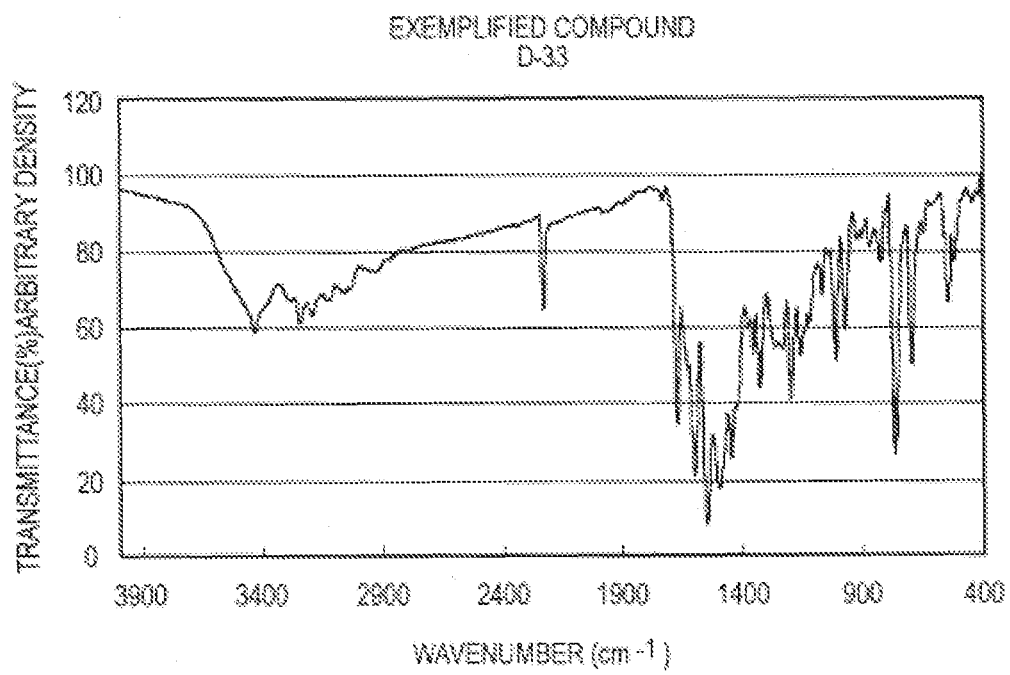
FIG. 2 is an infrared absorption spectrum of a specific illustrative compound D-33 synthesized according to Synthesis Example 2.

Infrared absorption chart is shown in FIG. 2.

113

Synthesis Example 3

Synthesis of Specific Compound D-20

Specific compound example D-20 is synthesized according to the following route.

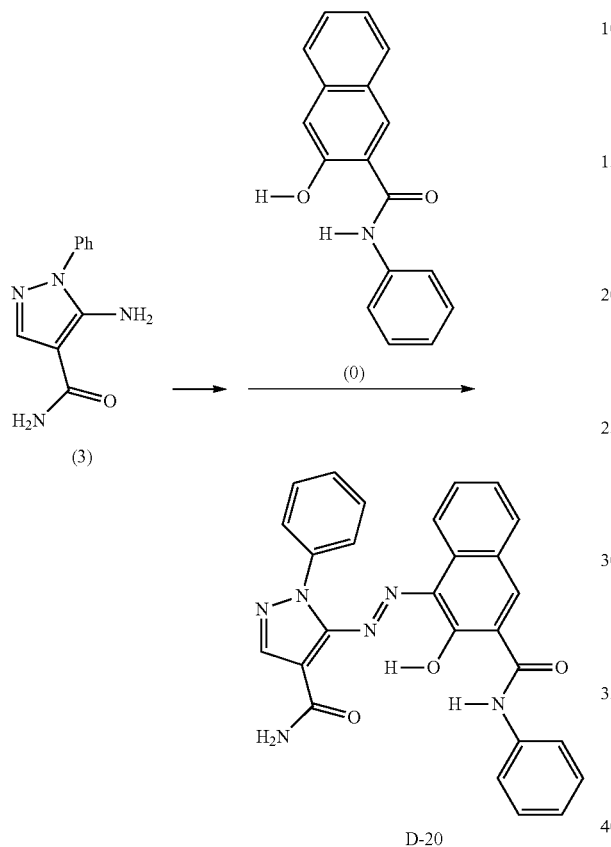

Synthesis of D-20

1.0 g of compound (3) is added to 10 ml of phosphoric acid, and is heated to 30° C. to dissolve. This solution is ice-cooled to keep the temperature to 0 to 5° C., and 0.35 g of sodium nitrite is added thereto, followed by stirring for 2 hours to obtain a diazonium salt solution. This diazonium salt solution is dropwise added to a solution of 1.3 g of compound (0) in 5 ml of dimethylacetamide while keeping the temperature at 5 to 10° C., followed by stirring for 20 minutes while keeping the temperature at 5 to 10° C., then for further 20 minutes with removing the ice bath. 100 ml of dimethylacetamide is added to the reaction solution, and the resulting mixture is stirred at 40° C. for 20 minutes. To the reaction solution is added 100 ml of acetonitrile, followed by stirring at room temperature for 10 minutes. Crystals precipitated are collected by filtration, and spray-washed with 50 ml of acetonitrile. To the thus-obtained crystals are added, without drying, 200 ml of water and 0.1 ml of saturated sodium hydrogencarbonate to neutralize, and crystals obtained are dried to obtain 0.49 g of compound D-20 of the invention. Yield: 21%. $\lambda_{max}$: 493 nm; $\epsilon$: $1.93 \times 10^4$ ($CHCl_3$)

Infrared absorption chart is shown in FIG. 3.

114

Synthesis Example 4

Synthesis of Specific Compound D-22

Specific compound example D-22 is synthesized according to the following route.

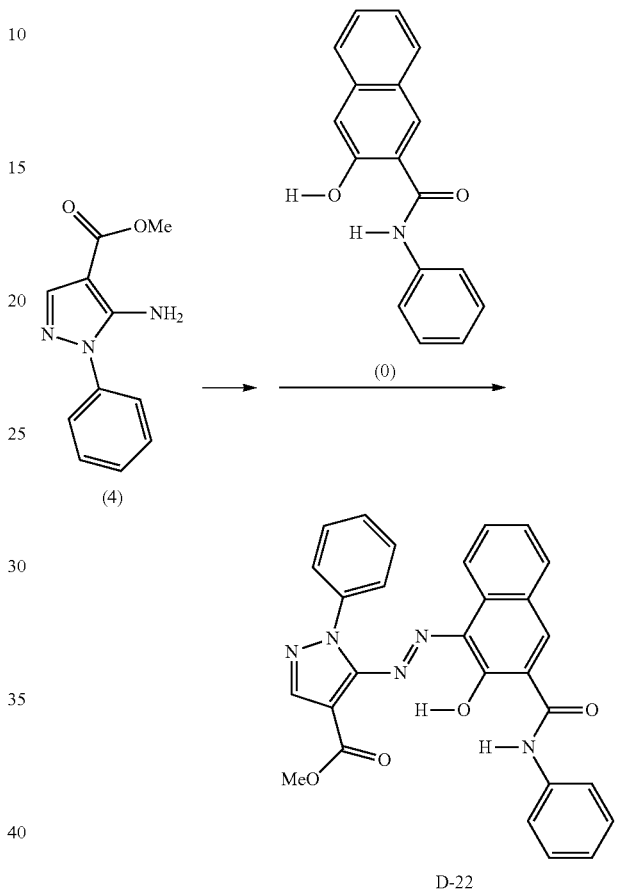

Synthesis of D-22

4.5 g of compound (4) is added to 45 ml of phosphoric acid, and is heated to 30° C. to dissolve. This solution is ice-cooled to keep the temperature to 0 to 5° C., and 1.47 g of sodium nitrite is added thereto, followed by stirring for 1 hour to obtain a diazonium salt solution. This diazonium salt solution is dropwise added to a solution of 4.5 g of compound (0) in 70 ml of dimethylacetamide while keeping the temperature at 5 to 10° C., followed by stirring for 30 minutes while keeping the temperature at 5 to 10° C., then for further 1 hour with removing the ice bath. 200 ml of water is added to the reaction solution. Crystals precipitated are collected by filtration, and spray-washed with 200 ml of water. To the thus-obtained crystals are added 200 ml of acetonitrile, followed by stirring at 80° C. for 2 hours. Thereafter, the mixture is stirred at room temperature for 2 hours, then crystals precipitated are collected by filtration. To the crystals is added 0.1 ml of saturated sodium hydrogencarbonate to neutralize, and crystals obtained are dried to obtain 6.9 g of compound D-22 of the invention. Yield: 82%. $\lambda_{max}$: 494 nm; $\epsilon$: $1.91 \times 10^4$ ($CHCl_3$)

Infrared absorption chart is shown in FIG. 4.

Synthesis Example 5

Synthesis of Specific Compound D-222

Specific compound example D-222 is synthesized according to the following route.

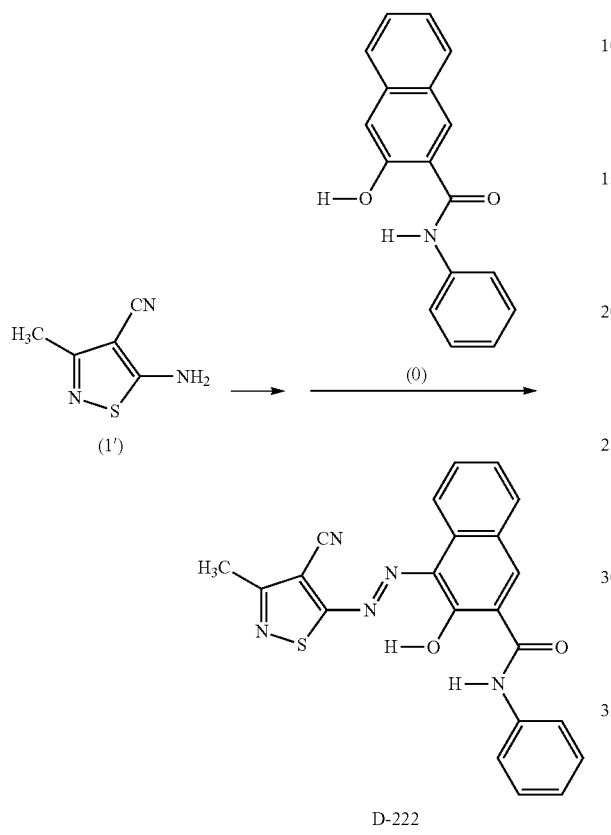

D-222

Synthesis of D-222

1.0 g of compound (1') is added to 10 ml of phosphoric acid (Wako Pure Chemical Industries, Ltd.; special grade reagent; purity: 85%; hereinafter the same) to dissolve. This solution is ice-cooled to keep the temperature to −5 to 0° C., and 0.55 g of sodium nitrite is added thereto, followed by stirring for 1 hour to obtain a diazonium salt solution. Separately, 20 ml of NMP (N-methylpyrrolidone) is added to 1.60 g of compound (0) and, under stirring, the aforesaid diazonium salt solution is added thereto at 8° C. or lower. Simultaneously with completion of the addition, the ice bath is removed, and stirring is continued for further 3 hours. 50 ml of methanol is added to the reaction solution, and the resulting mixture is stirred for 30 minutes. Crystals precipitated are collected by filtration, and spray-washed with 30 ml of methanol. The thus-obtained crystals are added, without drying, to 100 ml of water, and a solution prepared by dissolving 0.5 g of sodium hydrogencarbonate in 30 ml of water is added thereto, followed by stirring at 20 to 25° C. for 30 minutes. Crystals precipitated are collected by filtration, and sufficiently spray-washed with water. The thus-obtained crystals are added, without drying, to 20 ml of NMP and 10 ml of water, followed by stirring for 30 minutes under heating at 100° C. After stirring for 30 minutes at room temperature, crystals precipitated are collected by filtration, and spray-washed with 20 ml of NMP/water=2/1 and 20 ml of water. The thus-obtained crystals are dried to obtain 1.8 g of compound D-222 of the invention. Yield: 72%.

Figure 5:
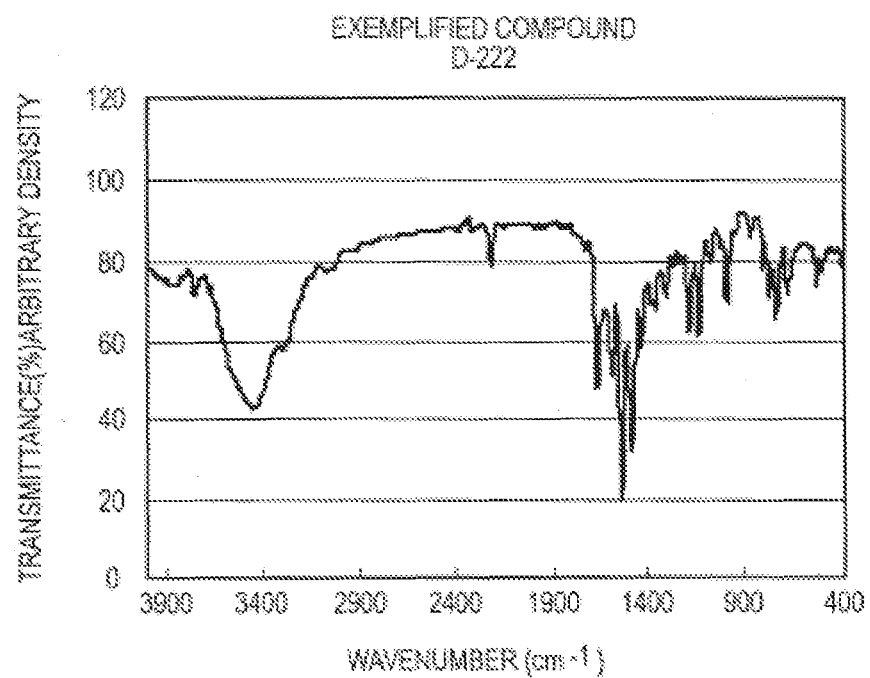
FIG. 5 is an infrared absorption spectrum of a specific illustrative compound D-222 synthesized according to Synthesis Example 5.

Infrared absorption chart is shown in FIG. 5.

Synthesis Example 6

Synthesis of Specific Compound D-228

Specific compound example D-228 is synthesized according to the following route.

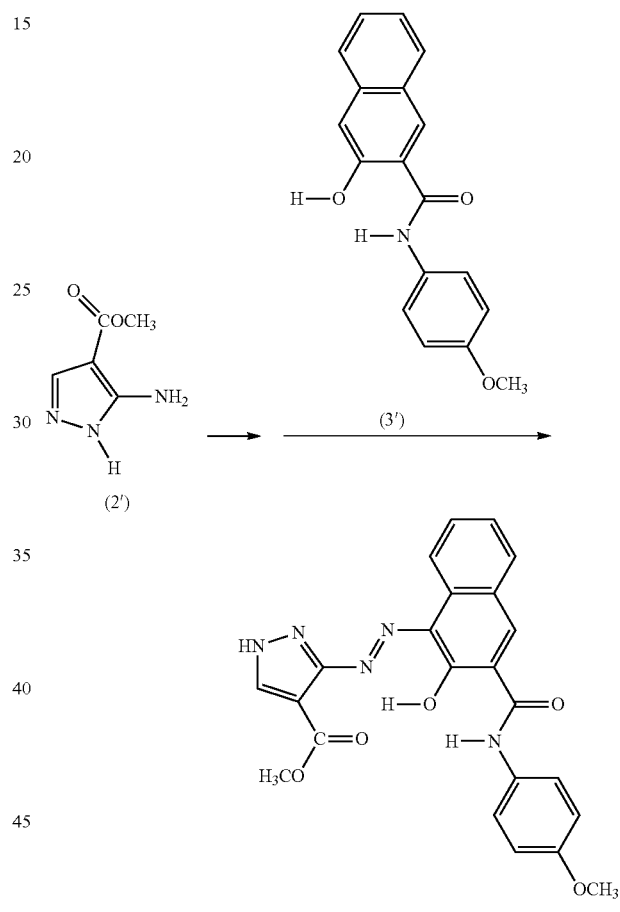

D-228

Synthesis of D-228

1.0 g of compound (2') is added to 10 ml of phosphoric acid to dissolve. This solution is ice-cooled to keep the temperature to −5 to 0° C., and 0.54 g of sodium nitrite is added thereto, followed by stirring for 1 hour to obtain a diazonium salt solution. Separately, 20 ml of NMP (N-methylpyrrolidone) is added to 1.60 g of compound (3') and, under stirring, the aforesaid diazonium salt solution is added thereto at 8° C. or lower. Simultaneously with completion of the addition, the ice bath is removed, and stirring is continued for further 1 hour. 40 ml of methanol is added to the reaction solution, and the resulting mixture is stirred for 30 minutes. Crystals precipitated are collected by filtration, and spray-washed with 30 ml of methanol. The thus-obtained crystals are added, without drying, to 100 ml of water, followed by stirring at 20 to 25°

C. for 30 minutes. Crystals precipitated are collected by filtration, and sufficiently spray-washed with water. The thus-obtained crystals are added, without drying, to 20 ml of NMP and 10 ml of water, followed by stirring for 30 minutes under heating at 100° C. After stirring for 30 minutes at room temperature, crystals precipitated are collected by filtration, and spray-washed with 20 ml of NMP/water=2/1 and 20 ml of water. The thus-obtained crystals are dried to obtain 2.0 g of compound D-228 of the invention. Yield: 80%.

Figure 6:
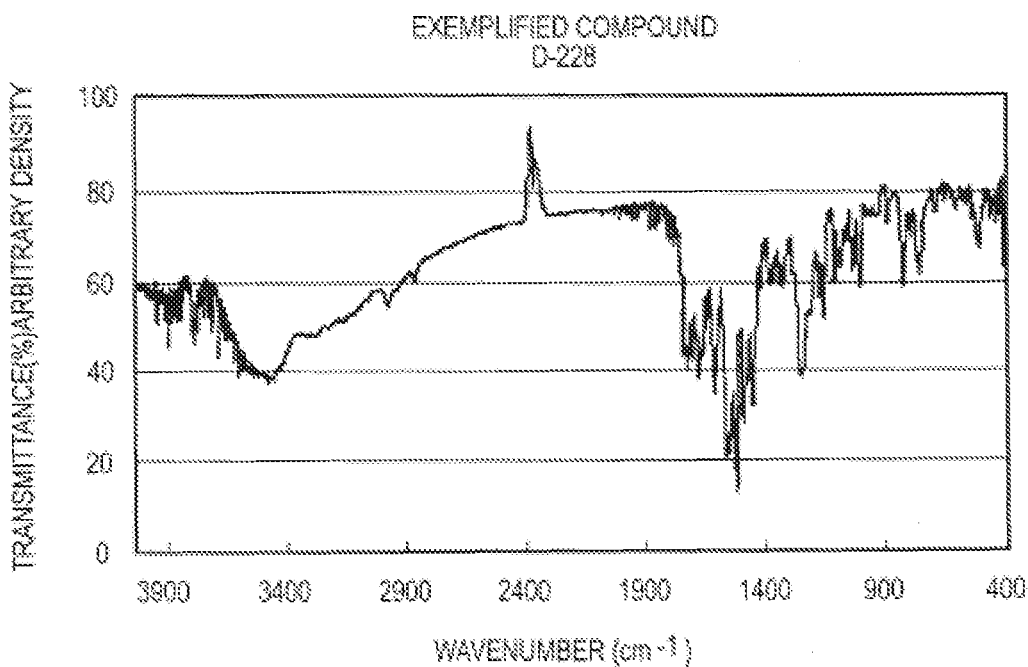
FIG. 6 is an infrared absorption spectrum of a specific illustrative compound D-228 synthesized according to Synthesis Example 6.

Infrared absorption chart is shown in FIG. 6.

Synthesis Example 7

Synthesis of Specific Compound D-8

Specific compound example D-8 is synthesized according to the following route.

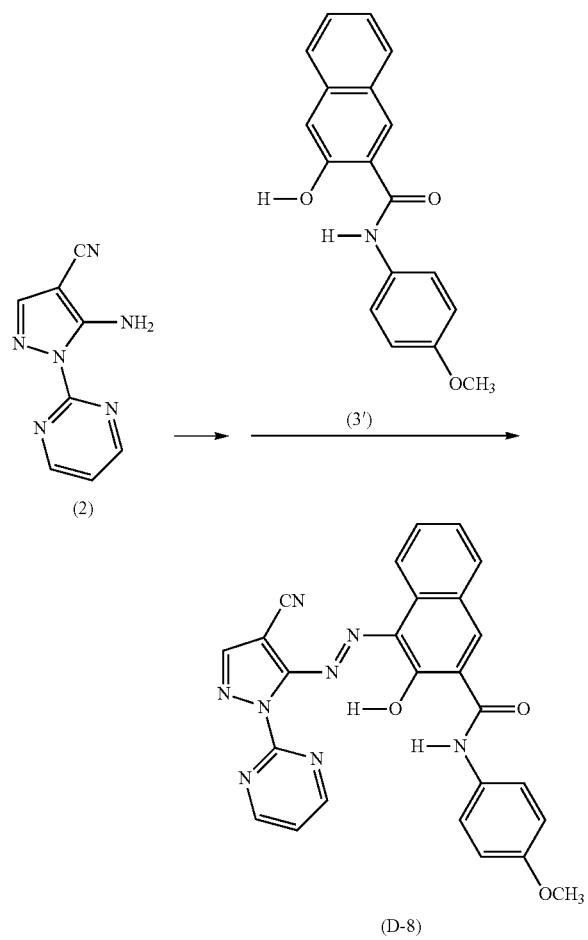

(D-8)

Synthesis of D-8

20 g of the compound represented by formula (2) is added to 200 ml of phosphoric acid and is completely dissolved at room temperature. This solution is ice-cooled to keep the temperature at −5° C., and 8.0 g of sodium nitrite is added thereto, followed by stirring for 40 minutes. Thereafter, 3.3 g of sodium nitrite is additionally added thereto, followed by stirring for further 20 minutes. 1.5 g of urea is added to this reaction solution to obtain a diazonium salt solution. This diazonium salt solution is dropwise added to a solution of 21 g of the compound represented by formula (3) in N,N-dimethylacetamide (DMAc)(400 ml) over 80 minutes while keeping the temperature at 5 to 10° C. The thus-obtained solution is stirred for 2 hours with keeping the temperature at 5 to 10° C. Then, 240 ml of methanol is additionally added thereto, followed by stirring for further 10 minutes. Crystals precipitated are collected by filtration, and spray-washed with 300 ml of methanol. The crystals are added, without drying, to 500 ml of water and 50 ml of saturated sodium hydrogencarbonate to neutralize. The product is dried at 50° C. for 24 hours using an air dryer. Crystals obtained are suspended in 400 mL of DMAc and, after stirring at 80° C. for 30 minutes, 300 ml of pure water is added thereto, followed by stirring at 80° C. for 30 minutes. Thereafter, the mixture is allowed to cool to room temperature in 2 hours, crystals obtained are collected by filtration, and dried at room temperature for 24 hours, then in a 50° C. vacuum desiccator for 10 hours to obtain 25.6 g of α-type crystal form azo pigment (D-8). Yield: 73%.

Figure 7:
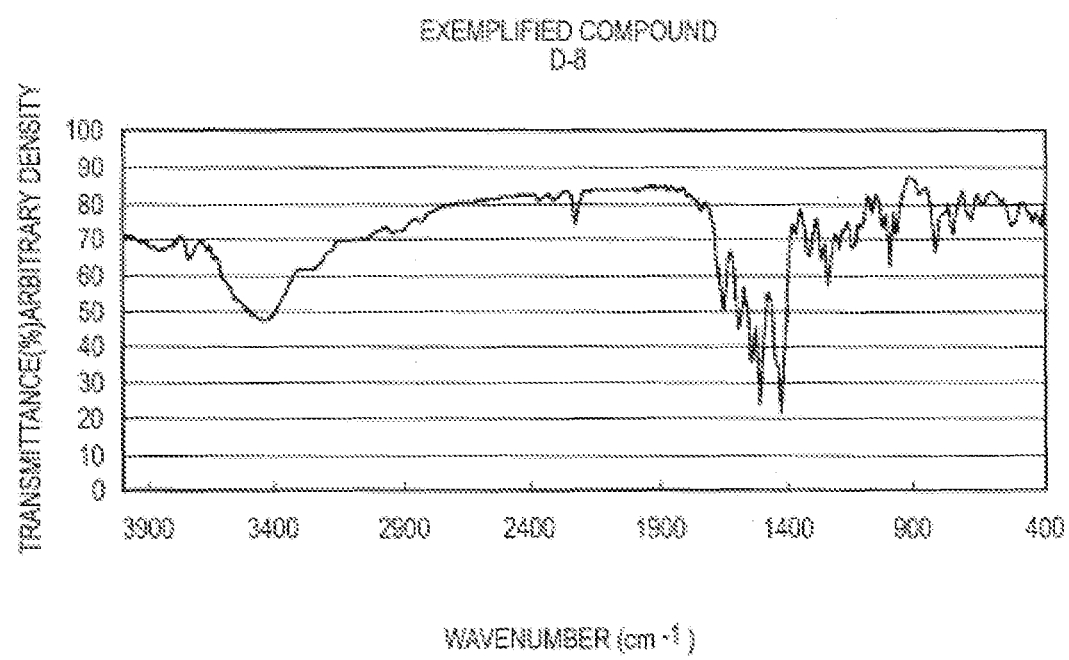
FIG. 7 is an infrared absorption spectrum of a specific illustrative compound D-8 synthesized according to Synthesis Example 7.

Infrared absorption chart is shown in FIG. 7.

Other compounds are synthesized in the same manner as in the above-described Synthesis Examples.

Synthesis Example 8

Pigment Derivative A-1

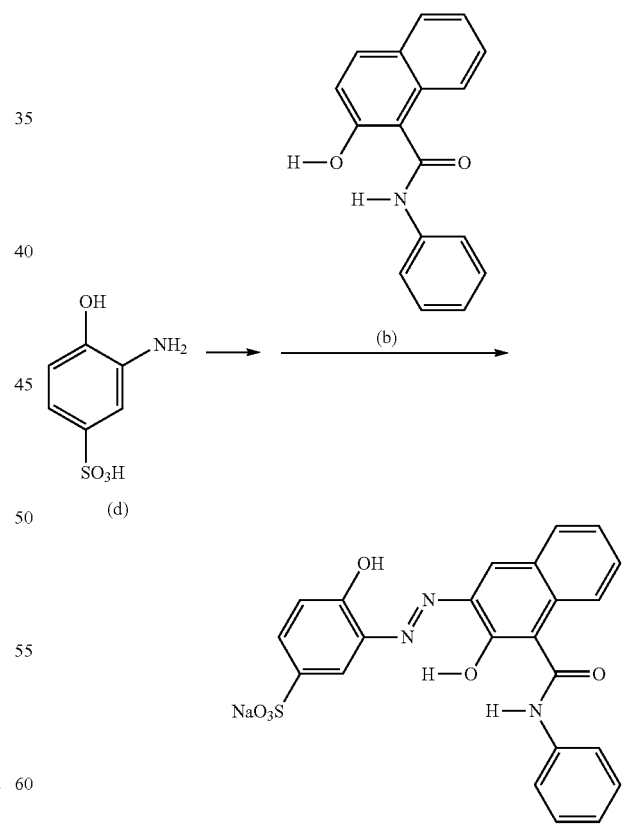

Pigment derivative A-1

15 ml of water and 2.2 ml of concentrated hydrochloric acid are added to 1.9 g of compound (d), and the mixture is stirred at −2° C. to 2° C. To this solution is dropwise added a solution of 0.72 g of sodium nitrite dissolved in 5 ml of water in ten minutes to obtain a diazonium salt solution. Separately, 40 ml of water and 2 g of sodium carbonate are added to 2.6 g of compound (b) and, under stirring, the aforesaid diazonium salt solution is added thereto at 5° C. to 10° C. Simultaneously with completion of the addition, the ice bath is removed, and stirring is continued for further 2 hours. 200 ml of saturated sodium chloride aqueous solution is added to the reaction solution. Crystals precipitated are collected by filtration, spray-washed with 30 ml of saturated sodium chloride aqueous solution, and dried. Crystals obtained are heated in 100 ml of methanol, and insolubles are removed by filtration. The solution is purified by Sephadex column chromatography, and the water/methanol solution is concentrated. Crystals precipitated are collected by filtration, and spray-washed with methanol to obtain 1.7 g of pigment derivative A-1. Yield: 35%.

Pigment Derivative A-2

Acid-introduced colorant A described in JP-A-2008-202021 (diazo component: 2-amino-4-methyl-5-chlorobenzenesulfonic acid; coupler component: 2-hydroxy-3-phenyl-carbamoylnaphthalene)(colorant represented by the following chemical formula) is referred to as pigment derivative A-2.

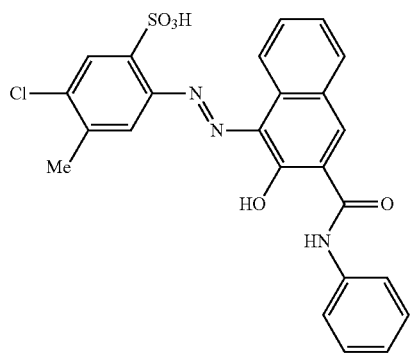 [SMILES: Cc1cc(/N=N/c2c(O)c(C(=O)Nc3ccccc3)cc3ccccc23)c(S(=O)(=O)O)cc1Cl]

Pigment Derivative A-3

Pigment derivative of Production Example 4 in JP-A-5-117541 (pigment derivative represented by the following chemical formula) is referred to as pigment derivative A-3.

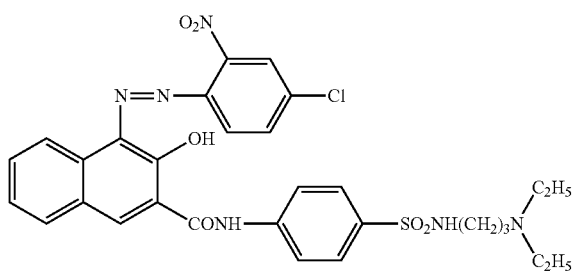

Synthesis Example 9

Comparative Compound 1

Comparative compound 1 is synthesized according to the following route.

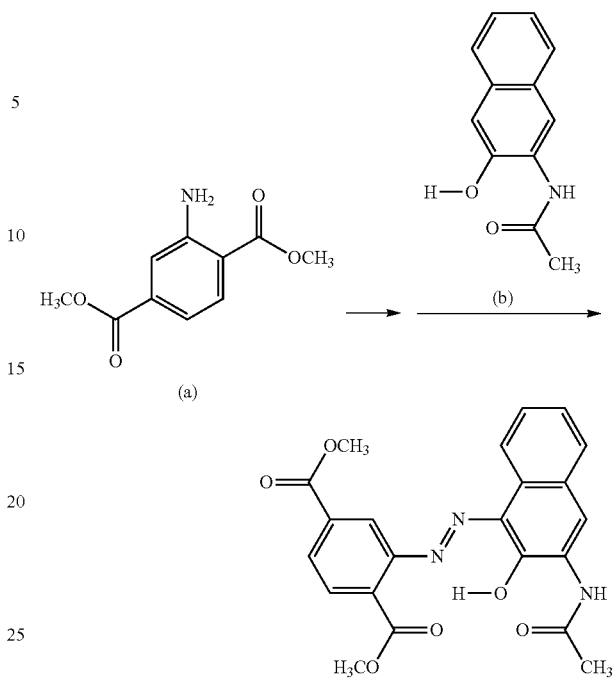

Comparative compound 1

15 ml of water and 2.2 ml of concentrated hydrochloric acid are added to 2.1 g of compound (a), followed by stirring at −2° C. to 2° C. To this solution is dropwise added in 10 minutes a solution of 0.72 g of sodium nitrite dissolved in 5 ml of water to obtain a diazonium salt solution. Separately, 10 ml of DMAc is added to 2.40 g of compound (b) and, under stirring, the aforesaid diazonium salt solution is added thereto at 5° C. to 10° C. Simultaneously with completion of the addition, the ice bath is removed, and stirring is continued for further 2 hours. Crystals precipitated are collected by filtration, and spray-washed with 50 ml of water. The thus-obtained crystals are recrystallized from 50 ml of methanol, followed by cooling to 25° C. Crystals precipitated are collected by filtration. The thus-obtained crystals are dried to obtain 1.1 g of comparative compound 1. Yield: 24%.

TABLE 1

|  | (A) Organic Pigment | (B) Pigment Derivative |
| --- | --- | --- |
| Example 1 | D-1 | A-3 |
| Example 2 | D-33 | A-3 |
| Example 3 | D-20 | A-3 |
| Example 4 | D-22 | A-3 |
| Example 5 | D-222 | A-3 |
| Example 6 | D-228 | A-3 |
| Example 7 | D-8 | A-3 |
| Example 8 | D-8 | A-1 |
| Example 9 | D-8 | A-2 |
| Comparative Example 1 | D-1 | none |
| Comparative Example 2 | D-33 | none |
| Comparative Example 3 | D-20 | none |
| Comparative Example 4 | D-22 | none |
| Comparative Example 5 | D-222 | none |
| Comparative | D-228 | none |

TABLE 1-continued

|  | (A) Organic Pigment | (B) Pigment Derivative |
|---|---|---|
| Example 6 |  |  |
| Comparative Example 7 | D-8 | none |
| Comparative Example 8 | Comparative compound 1 | A-3 |
| Comparative Example 9 | Comparative compound 1 | none |

Example 1

2.5 parts of the pigment of the specific illustrative compound D-1, 0.25 part of pigment derivative A-3, 0.5 part of sodium oleate, 5 parts of glycerin, and 42 parts of water are mixed, and the resulting mixture is subjected to dispersing procedure together with 100 parts of 0.1-mm diameter zirconia beads for 8 hours at 300 rpm in a planetary ball mill. After completion of the dispersing procedure, the zirconia beads are removed to obtain pigment dispersion 1.

Examples 2 to 7, Comparative Examples 1 to 9

Pigment dispersions of Examples 2 to 7 and Comparative Examples 1 to 9 are obtained in the same manner as described in Example 1 except for changing the organic pigment (A) and the pigment derivative (B) used in Example 1 for preparing the pigment dispersions as shown in the above-described Table 1.

Example 8

2.5 parts of the pigment of the specific illustrative compound D-8, 0.25 part of pigment derivative A-1, 0.5 part of cetyltrimethylammonium bromide, 5 parts of glycerin, and 42 parts of water are mixed, and the resulting mixture is subjected to dispersing procedure together with 100 parts of 0.1-mm diameter zirconia beads for 8 hours at 300 rpm in a planetary ball mill. After completion of the dispersing procedure, the zirconia beads are removed to obtain pigment dispersion 8.

Example 9

A pigment dispersion of Example 9 is obtained in the same manner as described in Example 1 except for changing the organic pigment (A) and the pigment derivative (B) used in Example 8 for preparing the pigment dispersion as shown in the above-described Table 1.

(Evaluation)

<Dispersibility (Average Particle Size)>

Each of the pigment dispersions obtained above are subjected to measurement of volume-average particle size in a conventional manner using a dynamic light-scattering particle size-measuring apparatus (Microtrack UPA150; manufactured by Nikkiso Co., Ltd.). Dispersibility of each of the pigment dispersions is evaluated according to the following criteria: samples with which the volume-average particle size measured 2 hours after preparation of the pigment dispersion at room temperature is 50 nm or less are ranked A; samples with which the volume-average particle size measured as described above is from more than 50 nm to 100 nm are ranked B; and samples with which the volume-average particle size measured as described above is more than 100 nm are ranked C.

<Dispersion Stability>

Samples of the pigment dispersions obtained above with which the value obtained by dividing the volume-average particle size measured after being stored at 70° C. for 2 days by the volume-average particle size measured after being stored at room temperature for 2 hours is 1.2 or less are ranked A; samples with which the value is from more than 1.2 to 5 are ranked B; and samples with which the value is more than 5 are ranked C.

<Light Fastness>

Each of the pigment dispersions obtained above is coated on a photo mat paper <pigment only> manufactured by Seiko Epson Corporation by using a No. 3 bar coater. Image density of each of the thus-obtained coated products is measured by means of a reflection densitometer (X-Rite 938; manufactured by X-Rite Co.), and the coated products of 1.0 in "tinctorial strength (OD: Optical Density)" is irradiated with xenon light (170000 lux; in the presence of a cut filter which cuts light having a wavelength of 325 nm or less) for 14 days using a fade meter. Image density before and after irradiation with xenon light is measured using the reflection densitometer, and the pigment dispersions are evaluated in terms of colorant residual ratio [(density after irradiation/density before irradiation)×100%].

Samples of 80% or more in a colorant residual ratio are ranked A.

Samples of from more than 60% to 80% are ranked B.

Samples of 60% or less are ranked C.

<Evaluation of Tinctorial Strength>

Each of the pigment dispersions obtained above is coated on a photo mat paper <pigment only> manufactured by Seiko Epson Corporation by using a No. 3 bar coater. Image density of each of the thus-obtained coated products is measured by means of a reflection densitometer (X-Rite 938; manufactured by X-Rite Co.), and the products are evaluated according to the following criteria: Samples with an OD of 1.6 or more are ranked A; samples with an OD of from 1.4 to less than 1.6 are ranked B; and samples with an OD of from 1.2 to less than 4 are ranked C; and samples with an OD of less than 1.2 are ranked D. The results are shown in Table 2.

The results of the evaluations are shown in Table 2.

TABLE 2

|  | Dispersibility | Dispersion Stability | Light Fastness | Tinctorial strength |
|---|---|---|---|---|
| Example 1 | A | A | A | A |
| Example 2 | A | A | A | B |
| Example 3 | A | A | A | A |
| Example 4 | A | A | A | B |
| Example 5 | A | A | A | A |
| Example 6 | A | A | A | B |
| Example 7 | A | A | A | A |
| Example 8 | A | A | A | B |
| Example 9 | A | A | A | B |
| Comparative Example 1 | B | B | A | B |
| Comparative Example 2 | B | B | A | C |
| Comparative Example 3 | B | B | A | C |
| Comparative Example 4 | B | B | A | C |
| Comparative Example 5 | B | B | A | B |
| Comparative Example 6 | B | B | B | C |
| Comparative Example 7 | B | B | A | B |

TABLE 2-continued

|  | Dispersibility | Dispersion Stability | Light Fastness | Tinctorial strength |
|---|---|---|---|---|
| Comparative Example 8 | B | B | B | C |
| Comparative Example 9 | B | B | C | C |

As is apparent from Table 2, the dispersions of Examples 1 to 9 are shown to have excellent performance with respect to all of dispersibility, dispersion stability, light fastness, and tinctorial strength in comparison with the dispersions of Comparative Examples 1 to 9.

(Ink for Inkjet Recording)

Example 11

The high-molecular dispersant represented by Dispersant 10 described in WO2006/064193, p. 22 is neutralized with a potassium hydroxide aqueous solution. To 75 parts by weight (concentration of solid components: 20%) of the thus-obtained dispersant aqueous solution are added 30 parts by weight of the azo pigment (D-8) synthesized hereinbefore and 95 parts by weight of deionized water, and the resulting mixture is mixed to roughly disperse by means of a dispersion impeller. 600 parts by weight of zirconia beads are added to the mixed and roughly dispersed liquid and, after conducting dispersing procedure for 4 hours in a dispersing machine (sand grinder mill), the liquid is separated into beads and a dispersion. To the thus-obtained mixture is gradually added 2 parts by weight of polyethylene glycol diglycidyl ether at 25° C., and the mixture is stirred at 50° C. for 6 hours. Further, impurities are removed from the mixture by using a ultra-filtration membrane having molecular weight of fraction of 300000, followed by filtering the mixture by using a syringe of 20 ml in volume equipped with a filter having a pore size of 5 µm (acetylcellulose membrane; outer diameter: 25 mm; manufactured by Fujifilm Corporation) to remove coarse particles. Thus, pigment dispersion 11 having a solid content of 10% (particle size: 80 nm; measured by using Nanotrac 150 (UPA-EX150) manufactured by Nikkiso Co., Ltd.) is obtained. Pigment dispersion of Comparative Example 11 is obtained in the same manner as in Example 11 except for using both organic pigments and pigment derivatives described in Table 3 in place of the organic pigment (D-1) and the pigment derivative (A-3).

TABLE 3

|  | (A) Organic Pigment | (B) Pigment Derivative |
|---|---|---|
| Comparative Example 11 | D-1 | none |

5% by weight, as a solid component, of the pigment dispersion 11 obtained in Example 11, 10% by weight of glycerin, 5% by weight of 2-pyrrolidone, 2% by weight of 1,2-hexanediol, 2% by weight of triethylene glycol monobutyl ether, 0.5% by weight of propylene glycol, and 75.5% by weight of deionized water are mixed, and the resulting mixed liquid is filtered by using a syringe of 20 ml in volume equipped with a filter having a pore size of 1 µm (acetylcellulose membrane; outer diameter: 25 mm; manufactured by Fujifilm Corporation) to remove coarse particles. Thus, pigment ink liquid 11 of the invention shown in Table 4 is obtained.

Comparative pigment ink liquid 11 is obtained in the same manner as in Example 11 except for using the comparative pigment dispersion 11 obtained in Comparative Example 11 in place of the pigment dispersion 11 obtained in Example 11.

Additionally, in Table 4, "ejection stability", "light fastness", "heat fastness", "ozone fastness", "metallic gloss", and "ink liquid stability" are evaluated as follows. Each ink is placed in a cartridge for a magenta ink liquid adapted for an inkjet printer PX-V630 manufactured by Seiko Epson Corporation, whereas, as other color inks, pigment ink liquids adapted for PX-630 are used, and a mono-color image pattern and green, red, and gray image patterns wherein density is stepwise changed are printed on image-receiving sheets of photographic paper <Kotaku> manufactured by Seiko Epson Corporation and photographic paper CRISPIA <Ko-kotaku> manufactured by Seiko Epson Corporation selecting recommended kirei mode so as to thereby evaluate image quality (metallic gloss), ejecting properties of the ink, and image fastness. Evaluations are conducted with respect to mono-color samples except for evaluation of metallic gloss.

The inkjet inks of the above-described pigment ink liquid 11 and comparative pigment ink liquid 11 are subjected to the following evaluations. The results are shown in Table 4.

(Evaluation Experiments)

1) Regarding ejection stability, the cartridge is mounted on a printer and, after confirming ejection of the ink through all nozzles, an image is outputted on 20 image-receiving sheets of A4 size and evaluated according to the following criteria:
  A: Printing is not disordered from the start to the end.
  B: Printing is disordered in some outputs.
  C: Printing is disordered from the start to the end.

2) Regarding image storage stability, the following evaluation is conducted using printed image samples.

[1] Light fastness is evaluated as follows. Image density Ci of the sample just after printing is measured by X-rite 310. The sample is irradiated with xenon light (100,000 lux) using a weather meter (manufactured by Atlas Material Testing Technology LLC) for 14 days and then image density Cf of the sample is measured to determine an image remaining ratio, Cf/Ci×100, whereby the light fastness is evaluated. The image remaining ratio is determined at 3 points having reflection density of 1, 1.5 and 2 respectively, and a case wherein the image remaining ratio is 80% or more at all three points is ranked A, a case wherein the image remaining ratio is less than 80% at two points is ranked B, and a case wherein the image remaining ratio is less than 80% at all three points is ranked C.

[2] Heat fastness is evaluated as follows. Density of the printed sample is measured by X-rite 310 before and after preservation of the sample under conditions of 80° C. and 60% RH for 7 days and an image remaining ratio is determined, whereby the heat fastness is evaluated. The image remaining ratio is determined at 3 points having reflection density of 1, 1.5 and 2, respectively, and a case wherein the image remaining ratio is 95% or more at all three points is ranked A, a case wherein the image remaining ratio is less than 95% at two points is ranked B, and a case wherein the image remaining ratio is less than 95% at all three points is ranked C.

[3] Ozone resistance (ozone fastness) is evaluated as follows. The printed sample is left for 14 days in a box wherein the ozone gas concentration is adjusted to 5 ppm (25° C., 50%), and the image density is measured before and after leaving the paper in the ozone gas atmosphere using a reflection densitometer (Photographic Densitometer 310 manufactured by X-rite Co.) to determine the image-remaining ratio. Additionally, the reflection density is measured at three points where the densities are 1, 1.5 and 2.0, respectively. The ozone gas density within the box is monitored by means of an ozone gas monitor (model: OZG-EM-01) made by APPLICS Co., Ltd.

The evaluation is conducted in three ranks: a case wherein the image remaining ratio is 80% or more at all three points is ranked A; a case wherein the image remaining ratio is less than 80% at one or two points is ranked B; and a case wherein the image remaining ratio is less than 70% at all three points is ranked C.

3) Generation of Metallic Gloss:

Yellow, green, and red solid printed portions of the samples are visually observed under reflected light to evaluate.

A sample with which no metallic gloss is observed is ranked A, and a sample with which metallic gloss is observed is ranked B.

4) Ink liquid stability: Each of the pigment ink liquids obtained in Examples and Comparative Examples are allowed to stand at 60° C. for 10 days, and ink liquid stability is evaluated as follows. A sample wherein particle size of the particles in the pigment ink is not changed is ranked A, and a sample wherein particle size of the particles is changed is ranked B. The results are shown in the following Table 4.

TABLE 4

| Pigment Ink Liquid | Ejection Stability | Light Fastness | Heat Fastness | Ozone Fastness | Metallic Gloss | Pigment Ink Liquid Stability |
|---|---|---|---|---|---|---|
| Ex. 11 (photographic paper Kotaku) | A | A | A | A | A | A |
| Ex. 11 (CRISPIA Ko-kotaku) | A | A | A | A | A | A |
| Comp. Ex. 11 (photographic paper Kotaku) | B | B | A | A | A | B |
| Comp. Ex. 11 (CRISPIA Ko-kotaku) | B | B | A | A | A | B |

It is seen from the results shown in Table 4 that the pigment ink liquid using the pigment of the invention has excellent ejection properties and excellent weatherability, can suppress generation of metallic gloss, and shows excellent pigment ink liquid stability.

As is apparent from the results shown in Table 4, it is seen that the system using the pigment ink liquid of the invention is excellent in every performance. In particular, in comparison with the samples of Comparative Examples, the samples of the invention show excellent light fastness and ink liquid stability.

Example 12

When an image is printed on inkjet paper of photographic glossy paper "Gasai" manufactured by FujiFilm Corporation by using the pigment ink liquid 11 prepared in Example 11 and using PX-V 630 manufactured by Seiko Epson Corporation, and then the printed paper is subjected to the same evaluation as in Example 11, there are obtained the same results.

As is apparent from the results shown in Table 4, the pigment ink liquids using the pigments of the invention are excellent in color tone, and show high tinctorial strength and high light fastness.

Therefore, the pigment dispersions using the pigments of the invention can favorably be used for an ink for printing such as inkjet printing.

(Color Filter)

Example 101

<Making of Color Filter by Photolithography Method>

The organic pigment D-1 of 0.6 g, the pigment derivative A-3 of 0.06 g, propyleneglycol monomethylether acetate (PGMEA) of 0.5 g, and zirconia beads (φ: 0.3 mm) of 10 g are placed in a 70-cc mayonnaise bottle, and the bottle is shaken for 6 hours in a dispersing shaker (DAS2000; manufactured by LAU Industries) so as to obtain a pigment dispersion 101.

The materials shown in Table 5 are added to the pigment dispersion 101, and the resulting mixture is shaken for 30 minutes in the dispersing shaker so as to prepare a coloring composition 101 for color filter used in photolithography method.

TABLE 5

(Formulation of the coloring composition 101 for color filter)

| | |
|---|---|
| Pigment dispersion 101 | 15.6 g |
| Photo-sensitive resin (CYCLOMER P200; manufactured by Daicel Chemical Industries, Ltd.) | 2.5 g |
| Pentaerythritol tetraacrylate (manufactured by Sigma-Aldrich Corporation) | 0.2 g |
| 2-benzyl-2-dimethylamino-4'-morpholinobutyrophenone (manufactured by Sigma-Aldrich Corporation) | 0.05 g |
| 2,4-diethyl-9H-thioxanthen-9-one (manufactured by Tokyo Chemical Industry Co., Ltd.) | 0.05 g |
| Propyleneglycol monomethylether acetate (PGMEA) (manufactured by Tokyo Chemical Industry Co., Ltd.) | 0.8 g |
| Cyclohexanone (manufatctured by Tokyo Chemical Industry Co., Ltd.) | 0.2 g |

The obtained coloring composition 101 for color filter is applied on a slide glass with a bar-coater Rod No. 10, and the slide glass is dried for 5 minutes in an oven at 80° C. to obtain a coated film of ink.

An appropriate masking is applied on a part of the obtained coated film, and the film is then exposed to a high-pressure mercury lamp with an irradiation condition of 200 mJ/cm$^2$. Thereafter, the film is developed using a 0.5% sodium carbonate aqueous solution at 25° C., and dried for 20 minutes in an oven at 220° C. so as to obtain a color filter for Example 101.

Examples 102 to 109, Comparative Example 101-109

Coloring compositions 102 to 109 for color filter and comparative coloring compositions 101 to 109 for color filter are prepared in the same manner as in Example 101 except for using both organic pigments and pigment derivatives described in Table 6 in place of the organic pigment D-1 and the pigment derivative A-3, used in Example 101. Color filters for Examples 102 to 109 and Comparative Examples 101 to 109 are prepared by using the obtained coloring composition for color filter.

TABLE 6

| | (A) Organic Pigment | (B) Pigment Derivative |
|---|---|---|
| Example 101 | D-1 | A-3 |
| Example 102 | D-33 | A-3 |
| Example 103 | D-20 | A-3 |
| Example 104 | D-22 | A-3 |
| Example 105 | D-222 | A-3 |

TABLE 6-continued

|  | (A) Organic Pigment | (B) Pigment Derivative |
|---|---|---|
| Example 106 | D-228 | A-3 |
| Example 107 | D-8 | A-3 |
| Example 108 | D-8 | A-1 |
| Example 109 | D-8 | A-2 |
| Comparative Example 101 | D-1 | none |
| Comparative Example 102 | D-33 | none |
| Comparative Example 103 | D-20 | none |
| Comparative Example 104 | D-22 | none |
| Comparative Example 105 | D-222 | none |
| Comparative Example 106 | D-228 | none |
| Comparative Example 107 | D-8 | none |
| Comparative Example 108 | Comparative compound 1 | A-3 |
| Comparative Example 109 | Comparative compound 1 | none |

(Evaluation)

The color filters obtained in Examples 101 to 109 and Comparative Examples 101 to 102 are subjected to the following evaluations. The results are shown in Table 4.

<Light Fastness>

Each of the pigment dispersions is coated on a photo mat paper ("pigment only") manufactured by Seiko Epson Corporation by using a No. 3 bar coater. Each of the coated products of 1.0 in image density (measured by means of a reflection densitometer (X-Rite 938; manufactured by X-Rite Co.)) is irradiated with xenon light (170000 lux; in the presence of a cut filter which cuts light having a wavelength of 325 nm or less) for 20 days using a fade meter. Color differences thereof before and after the exposure ($\Delta E^*_{ab}$) is measured by means of a spectrophotometer (Macbeth Coloreye-3000; manufactured by Sakata Inx Eng., Co., Ltd.). Evaluation is conducted according to the following criteria, and the results are shown in Table 7.

<Evaluation Criteria>

A: $\Delta E^*_{ab} \leq 3.0$
B: $3.0 < \Delta E^*_{ab} \leq 6.0$
C: $6.0 < \Delta E^*_{ab}$

TABLE 7

|  | Results of Heat Fastness: Test Color Difference ($\Delta E^*$ab) |
|---|---|
| Example 101 | A |
| Example 102 | A |
| Example 103 | A |
| Example 104 | A |
| Example 105 | A |
| Example 106 | A |
| Example 107 | A |
| Example 108 | A |
| Example 109 | A |
| Comparative Example 101 | B |
| Comparative Example 102 | B |
| Comparative Example 103 | B |
| Comparative Example 104 | B |
| Comparative Example 105 | B |
| Comparative Example 106 | B |
| Comparative Example 107 | B |
| Comparative Example 108 | B |
| Comparative Example 109 | B |

In comparison with the color filters used in Comparative Examples 101 to 109, the color filters used in Examples 101 to 109, which are prepared by using the coloring compositions of the invention for color filter respectively containing, as coloring materials, (A) the azo pigment represented by the general formula (1) and (B) the pigment derivative having a hydrophilic group and represented by the general formula (B1), show the same or more light fastness.

<Contrast>

Contrast of each of the obtained color filters is measured by using a contrast tester CT-1 manufactured by Tsubosaka Electric Co., Ltd. Evaluation is conducted according to the criteria that a sample with contrast≥23000 is ranked A, a sample with 23000>contrast≥18000 is ranked B, and a sample with 18000>contrast is ranked C, and the results are shown in Table 8.

TABLE 8

|  | Contrast |
|---|---|
| Example 101 | A |
| Example 102 | A |
| Example 103 | A |
| Example 104 | A |
| Example 105 | A |
| Example 106 | A |
| Example 107 | A |
| Example 108 | A |
| Example 109 | A |
| Comparative Example 101 | B |
| Comparative Example 102 | B |
| Comparative Example 103 | B |
| Comparative Example 104 | B |
| Comparative Example 105 | B |
| Comparative Example 106 | B |
| Comparative Example 107 | B |
| Comparative Example 108 | B |
| Comparative Example 109 | B |

In comparison with the color filters used in Comparative Examples 101 to 109, the color filters used in Examples 101 to 109, which are prepared by using the coloring compositions of the invention for color filter respectively containing, as coloring materials, (A) the azo pigment represented by the general formula (1) and (B) the pigment derivative having a hydrophilic group and represented by the general formula (B1), show excellent contrast.

<Age-Storage Stability of Dispersion>

Coloring compositions 101 to 109 for color filter, and comparative coloring compositions 101 to 109 for color filter prepared in Examples 101 to 109 and Comparative Examples 101 to 109, respectively, are stored in a dark room at room temperature for 2 weeks, and then degree of precipitation of foreign substance is visually evaluated according to the following criteria. The results are shown in Table 9.

<Evaluation Criteria>

A: No precipitation is observed.
B: Slight precipitation is observed.
C: Precipitation is observed.

TABLE 9

|  | Age-storage stability of dispersion |
|---|---|
| Example 101 | A |
| Example 102 | A |
| Example 103 | A |
| Example 104 | A |
| Example 105 | A |

TABLE 9-continued

| | Age-storage stability of dispersion |
|---|---|
| Example 106 | A |
| Example 107 | A |
| Example 108 | A |
| Example 109 | A |
| Comparative Example 101 | B |
| Comparative Example 102 | B |
| Comparative Example 103 | B |
| Comparative Example 104 | B |
| Comparative Example 105 | B |
| Comparative Example 106 | B |
| Comparative Example 107 | B |
| Comparative Example 108 | B |
| Comparative Example 109 | B |

In comparison with the color filters used in Comparative Examples 101 to 109, the color filters used in Examples 101 to 109, which are prepared by using the coloring compositions of the invention for color filter respectively containing, as coloring materials, (A) the azo pigment represented by the general formula (1) and (B) the pigment derivative having a hydrophilic group and represented by the general formula (B1), do not generate foreign substance with time, thus show excellent in age-storage stability of dispersion.

Example 201

<Preparation of Green Pigment Dispersion>
—Preparation of Green Pigment Dispersion P1—

A mixture composed of 12.6 parts of a 100/55 (by weight) pigment mixture of C.I. Pigment Green 36 and C.I. Pigment Yellow 139, 5.2 parts of a dispersant of BYK2001 (Disperbyk; manufactured by BYK-Chemie GmbH; solid content: 45.1% by weight), 2.7 parts of a dispersing resin of benzyl methacrylate/methacrylic acid copolymer (acid value: 134 mgKOH/g; Mw=30,000), and 78.3 parts of a solvent of propylene glycol monomethyl ether acetate is mixed and dispersed in a beads mill for 15 hours to obtain a green pigment dispersion P1.

<Preparation of Red Pigment Dispersion>
—Preparation of Red Pigment Dispersion P2—

A mixture composed of 12.1 parts of a 91/9/45 (by weight) pigment mixture of the pigment D-8, the pigment derivative A-3 and C.I. Pigment Yellow 139, 10.4 parts of a dispersant of BYK2001 (Disperbyk; manufactured by BYK-Chemie GmbH; solid content: 45.1% by weight), 3.8 parts of a dispersing resin of benzyl methacrylate/methacrylic acid copolymer (acid value: 134 mgKOH/g; Mw=30,000), and 73.7 parts of a solvent of propylene glycol monomethyl ether acetate is mixed and dispersed in a beads mill for 15 hours to obtain a red pigment dispersion P2.

<Preparation of Blue Pigment Dispersion>
—Preparation of Blue Pigment Dispersion—

A mixture composed of 14 parts of a 100/25 (by weight) pigment mixture of C.I. Pigment Blue 15:6 and C.I. Pigment Violet 23, 4.7 parts of a dispersant of BYK2001 (Disperbyk; manufactured by BYK-Chemie GmbH; solid content: 45.1% by weight), 3.5 parts of a dispersing resin of benzyl methacrylate/methacrylic acid copolymer (acid value: 134 mgKOH/g; Mw=30,000), and 77.8 parts of a solvent of propylene glycol monomethyl ether acetate is mixed and dispersed in a beads mill for 15 hours to obtain a blue pigment dispersion P3.

<Preparation of Green-Colored Photo-Sensitive Composition (Coating Solution) A-1>

The green pigment dispersion P1 is used, and components of the following formulation are mixed and stirred so as to prepare a colored photo-sensitive composition A-1.

TABLE 10

| <Formulation> | |
|---|---|
| Green pigment dispersion P1 | 83.3 parts |
| Alkali-soluble resin: P-1 | 2.05 parts |
| OXE-01 (photopolymerization initiator; manufactured by BASF SE) | 1.2 parts |
| Monomer 1: KARAYAD DPHA (manufactured by Nippon Kayaku Co., Ltd.) | 1.4 parts |
| Monomer 2: M-305 (manufactured by Toagosei Co., Ltd.) | 1.4 parts |
| p-methoxyphenol | 0.001 part |
| Propyleneglycol monomethylether acetate [PGMEA (hereinafter, the same abbreviation will be used); solvent] | 7.4 parts |
| Surfactant (trade name: F-781; 0.2% solution of PGMEA; manufactured by DIC Corporation) | 4.2 parts |

<Preparation of Red-Colored Photo-Sensitive Composition (Coating Solution) B-1>

The red pigment dispersion P2 is used, and components of the following formulation are mixed and stirred to prepare a colored photo-sensitive composition B-1.

TABLE 11

| <Formulation> | |
|---|---|
| Red pigment dispersion P2 | 59.6 parts |
| Alkali-soluble resin: P-1 | 1.2 parts |
| OXE-02 (photopolymerization initiator; manufactured by BASF SE) | 0.7 part |
| Monomer 1: KARAYAD DPHA (manufactured by Nippon Kayaku Co., Ltd.) | 1.6 parts |
| Monomer 2: SR-494 (manufactured by Sartomer Company, Inc.) | 1.6 parts |
| p-methoxyphenol | 0.002 part |
| Propyleneglycol monomethylether acetate [PGMEA; solvent] | 31 parts |
| Surfactant (trade name: F-781; 0.2% solution of PGMEA; manufactured by DIC Corporation) | 4.2 parts |

<Preparation of Blue-Colored Photo-Sensitive Composition (Coating Solution) C-1>

The blue pigment dispersion P3 is used, and components of the following formulation are mixed and stirred to prepare a colored photo-sensitive composition C-1.

TABLE 12

| <Formulation> | |
|---|---|
| Blue pigment dispersion P3 | 50.6 parts |
| Alkali-soluble resin: P-1 | 2.1 parts |
| OXE-01 (photopolymerization initiator; manufactured by by BASF SE) | 1.2 parts |
| Monomer 1: KARAYAD DPHA (manufactured by Nippon Kayaku Co., Ltd.) | 1.2 parts |
| Monomer 2: SR-494 (manufactured by Sartomer Company, Inc.) | 3.5 parts |
| p-methoxyphenol | 0.002 part |
| Propyleneglycol monomethylether acetate [PGMEA; solvent] | 36 parts |
| Surfactant (trade name: F-781; 0.2% solution of PGMEA; manufactured by DIC Corporation) | 4.2 parts |

The green-colored photo-sensitive composition A-1 having been prepared hereinbefore is coated on a silicon wafer on which 8-inch device has been formed and which is previously sprayed with hexamethyldisilazane, thus a photo-curable coated film is formed. Then, this coated film is subjected to heating treatment (pre-bake) for 180 seconds using a 100° C. hot plate so that the dry thickness of the coated film becomes 1.0 μm. Subsequently, the film is irradiated through a 1.0-μm square Bayer pattern mask at a wavelength of 365 nm using an i-line stepper exposure apparatus FPA-3000i5+ (manufactured by Canon Inc.) in an irradiation amount of from 50 to 1,000 mJ/cm$^2$ (exposure amount being changed stepwise by 50 mJ/cm$^2$). Thereafter, the silicon wafer on which the irradiated coated film is formed is placed on a horizontal rotary table of a spin shower developing machine (model DW-30; manufactured by Chemitronics Co., Ltd.), and paddle development is conducted at 23° C. for 180 seconds using a 40% diluting solution of CD-2000 (manufactured by Fujifilm Electronics Materials Co., Ltd.) so as to form a colored pattern on the silicon wafer.

The silicon wafer on which the colored pattern is formed is fixed on the horizontal rotary table by vacuum-chucking system and, while rotating the silicon wafer at a rotation number of 50 rpm by means of a rotating apparatus, pure water is supplied from above the rotation center through a jet nozzle in a shower state to conduct rinsing treatment, followed by spray drying.

Next, the silicon wafer is heated for 5 minutes on a 200° C. hot plate so as to obtain a color film on which a pattern is formed.

Further, the same procedures as with preparing the green-colored photo-sensitive composition A-1 except for using the red-colored photo-sensitive composition B-1 and blue-colored photo-sensitive composition C-1 and exposing through a 1.0-μm square island pattern mask are conducted to thereby form a color filter formed by RGB patterns.

Good spectral characteristics can be confirmed by preparing a camera module using a device wherein this color filter is formed.

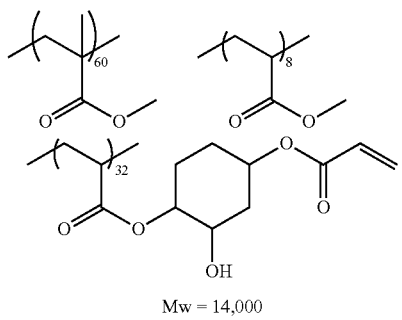

Resin P-1

Mw = 14,000

INDUSTRIAL APPLICABILITY

According to the present invention, there can be provided a pigment composition having excellent coloring characteristics such as high tinctorial strength and hue, excellent fastness such as light fastness and ozone fastness, and having excellent dispersibility, dispersion stability, and age-storage stability; and an ink for inkjet recording.

Also, there can be provided a coloring composition for color filter which composition has good hue, exhibits good light fastness, heat fastness, and ozone fastness, shows good dispersibility, and can provide a color filter having high transparency, excellent spectral properties, excellent contrast, and excellent age-storage stability of dispersion.

Further, there can be provided a color filter having high transparency, excellent spectral properties, excellent contrast, and excellent age-storage stability, which is obtained by using the above-described coloring composition for color filter.

Although the invention has been described in detail and by reference to specific embodiments, it is apparent to those skilled in the art that it is possible to add various alterations and modifications insofar as the alterations and modifications do not depart from the spirit and the scope of the invention.

This application is based on a Japanese patent application filed on Jan. 15, 2010 (Japanese Patent Application No. 2010-007531), and the contents thereof are incorporated herein by reference.

The invention claimed is:
1. A pigment composition comprising:
(A) an azo pigment represented by the following general formula (1); and
(B) a pigment derivative having a hydrophilic group and represented by the following general formula (B1):

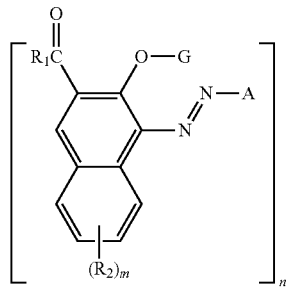

(1)

wherein
G represents a hydrogen atom, an aliphatic group, an aryl group, a heterocyclic group, an acyl group, an aliphatic oxycarbonyl group, a carbamoyl group, an aliphatic sulfonyl group, or an arylsulfonyl group;
$R_1$ represents an amino group, an aliphatic oxy group, an aliphatic group, an aryl group, or a heterocyclic group;
$R_2$ represents a substituent;
A represents an aromatic 5- or 6-membered heterocyclic group;
m represents an integer of from 0 to 5;
n represents an integer of from 1 to 4;
when n=2, the general formula (1) represents a dimer formed through $R_1$, $R_2$, A, or G;
when n=3, the general formula (1) represents a trimer formed through $R_1$, $R_2$, A, or G;
when n=4, the general formula (1) represents a tetramer formed through $R_1$, $R_2$, A, or G; and
the general formula (1) does not comprise any ionic hydrophilic group;

(B1)

wherein P represents an azo series colorant residue;
X represents —SO$_3$.M/m or —COO.M/m,
wherein M represents a counter cation selected from the group consisting of a hydrogen ion, a 1- to 3-valent metal ion, and an ammonium ion, and
m represents a valence number of M, which is an integer of 1 to 3, and
n1 represents an integer of from 1 to 4;

and further provided that the pigment derivative is an azo series pigment derivative represented by the following general formula (B2), a tautomer, salt, or hydrate thereof:

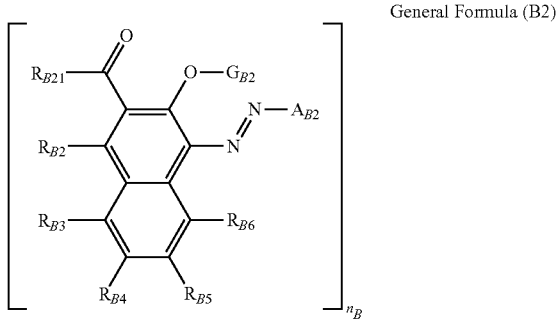

General Formula (B2)

wherein
$G_{B2}$ represents a hydrogen atom, an aliphatic group, an aryl group, a heterocyclic group, or a hydrophilic group;
$R_{B21}$ represents an amino group, an aliphatic oxy group, a heterocyclic group connected at the nitrogen atom, or a hydrophilic group;
$R_{B2}$ to $R_{B6}$ each independently represents a hydrogen atom or a substituent;
$A_{B2}$ represents an aryl group or a heterocyclic group;
at least one of $R_{B21}$, $R_{B2}$ to $R_{B6}$, and $A_{B2}$ has —$SO_3$.M/m or —COO.M/m;
$n_B$ represents an integer of from 1 to 4;
when $n_B=2$, the general formula (B2) represents a dimer formed through $R_{B21}$, $R_{B2}$ to $R_{B6}$, $A_{B2}$, or $G_{B2}$;
when $n_B=3$, the general formula (B2) represents a trimer formed through $R_{B21}$, $R_{B2}$ to $R_{B6}$, $A_{B2}$, or $G_{B2}$; and
when $n_B=4$, the general formula (B2) represents a tetramer formed through $R_{B21}$, $R_{B2}$ to $R_{B6}$, $A_{B2}$, or $G_{B2}$.

2. The pigment composition according to claim 1,
wherein $A_{B2}$ represents an aryl group.

3. The pigment composition according to claim 2,
wherein $A_{B2}$ represents a phenyl group having a substituent selected from the group consisting of a hydrophilic group, a nitro group, a halogen group, an aliphatic group, hydroxyl group and a sulfo group.

4. The pigment composition according to claim 3,
wherein the azo pigment represented by the general formula (1) is an azo pigment represented by the general formula (2-1):

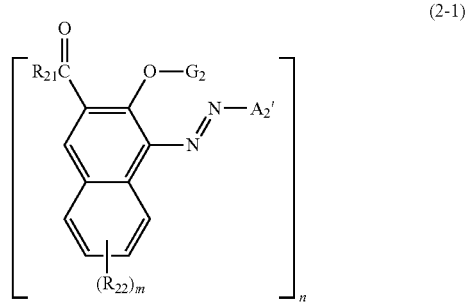

(2-1)

wherein, $G_2$ represents a hydrogen atom, an aliphatic group, an aryl group, or a heterocyclic group, $R_{21}$ represents an amino group, an aliphatic oxy group, an aliphatic group, an aryl group, or a heterocyclic group,
$R_{22}$ represents a substituent,
$A_2'$ represents the following general formulae (A-1) to (A-18), (A-20) to (A-28), or (A-30) to (A-32), wherein $R_{51}$ to $R_{59}$ each represents a hydrogen atom or a substituent, and adjacent substituents may be connected to each other to form a 5- or 6-membered ring, and * shows the position connected to the azo group in the general formula (2-1),
m and n are the same as are defined with respect to the general formula (1),
when n=2, the general formula (2-1) represents a dimer formed through $R_{21}$, $R_{22}$, $G_2$, or $A_2'$, when n=3, the general formula represents a trimer formed through $R_{21}$, $R_{22}$, $G_2$, or $A_2'$, when n=4, the general formula represents a tetramer formed through $R_{21}$, $R_{22}$, $G_2$, or $A_2'$, and
wherein the general formula (2-1) does not contain any ionic hydrophilic group:

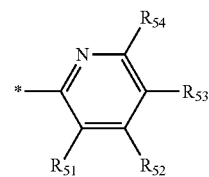

(A-1)

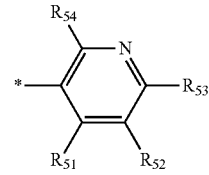

(A-2)

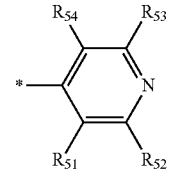

(A-3)

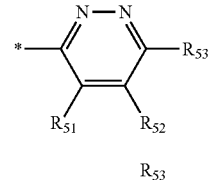

(A-4)

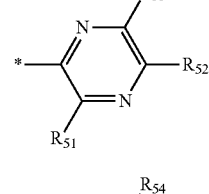

(A-5)

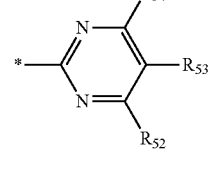

(A-6)

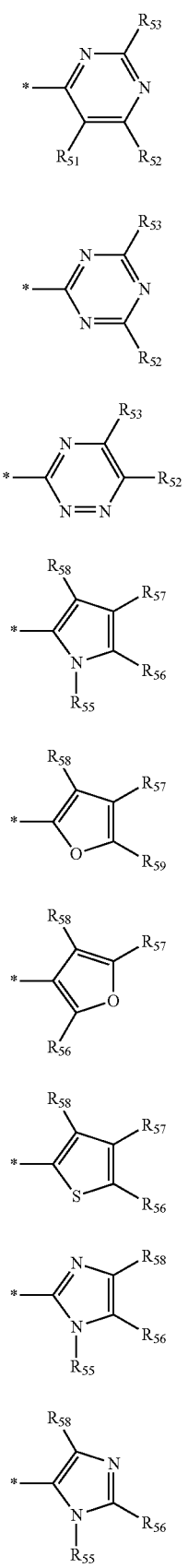
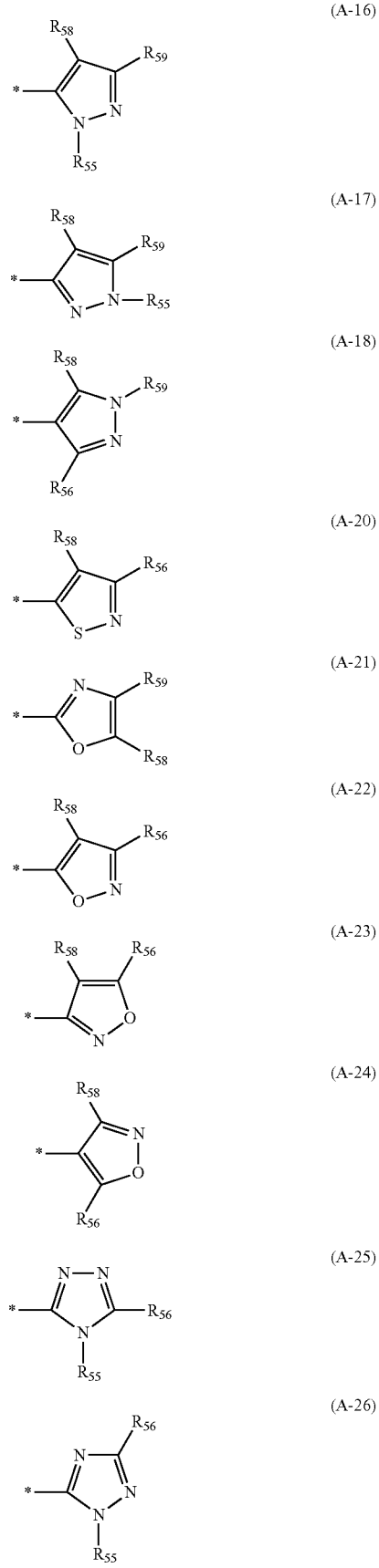

-continued

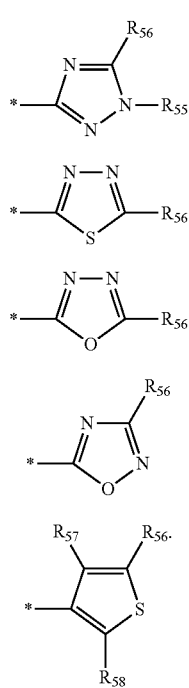

(A-27)

(A-28)

(A-30)

(A-31)

(A-32)

5. The pigment composition according to claim 3, wherein the azo pigment represented by the general formula (1) is an azo pigment represented by the general formula (3):

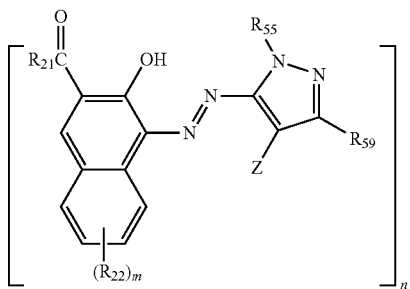

(3)

$R_{21}$ represents an amino group, an aliphatic oxy group, an aliphatic group, an aryl group, or a heterocyclic group,
$R_{22}$ represents a substituent,
$R_{55}$ represents a hydrogen atom or a substituent,
$R_{59}$ represents a hydrogen atom or a substituent,
m and n are the same as are defined with respect to the general formula (1),
Z represents an electron-withdrawing group having a Hammett σp value of 0.2 or more,
when n=2, the general formula (3) represents a dimer formed through $R_{21}$, $R_{22}$, $R_{55}$, $R_{59}$, or Z, when n=3, the general formula (3) represents a trimer formed through $R_{21}$, $R_{22}$, $R_{55}$, $R_{59}$, or Z, when n=4, the general formula (3) represents a tetramer formed through $R_{21}$, $R_{22}$, $R_{55}$, $R_{59}$, or Z, and
the general formula (3) does not have any ionic hydrophilic group.

6. The pigment composition according to claim 5, wherein $R_{55}$ represents an aliphatic group, an aryl group, or an aromatic 5- or 6-membered heterocyclic group containing a nitrogen atom at a position adjacent to the position connected to the nitrogen atom.

7. The pigment composition according to claim 6, wherein $R_{55}$ represents an aryl group or an aromatic 5- or 6-membered heterocyclic group containing a nitrogen atom at a position adjacent to the position connected to the nitrogen atom.

8. A coloring composition for color filter, comprising the pigment composition according to claim 1.

9. A color filter, which is produced by utilizing the coloring composition for color filter according to claim 8.

10. A pigment composition comprising:
(A) an azo pigment represented by the following general formula (1); and
(B) a pigment derivative having a hydrophilic group and represented by the following general formula (B1):

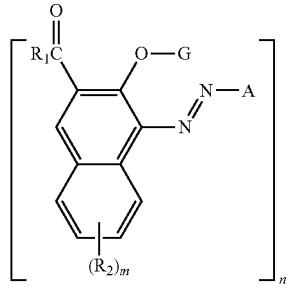

(1)

wherein
G represents a hydrogen atom, an aliphatic group, an aryl group, a heterocyclic group, an acyl group, an aliphatic oxycarbonyl group, a carbamoyl group, an aliphatic sulfonyl group, or an arylsulfonyl group;
$R_1$ represents an amino group, an aliphatic oxy group, an aliphatic group, an aryl group, or a heterocyclic group;
$R_2$ represents a substituent;
A represents an aromatic 5- or 6-membered heterocyclic group;
m is 0;
n represents an integer of from 1 to 4;
when n=2, the general formula (1) represents a dimer formed through $R_1$, $R_2$, A, or G;
when n=3, the general formula (1) represents a trimer formed through $R_1$, $R_2$, A, or G;
when n=4, the general formula (1) represents a tetramer formed through $R_1$, $R_2$, A, or G; and
the general formula (1) does not comprise any ionic hydrophilic group;

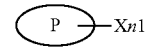

(B1)

wherein P represents an anthanthrone series colorant residue, an anthraquinone series colorant residue, an anthrapyrimidine series colorant residue, an azo series colorant residue, a quinacridone series colorant residue, a quinophthalone series colorant residue, a diketopyrrolopyrrole series colorant residue, a dioxazine series colorant residue, a flavanthrone series colorant residue, an indanthrone series colorant residue, an isoindoline series colorant residue, an isoindolinone series colorant residue, an isoviolanthrone series colorant residue, a metal complex series colorant residue, a perinone series colorant residue, a perylene series colorant residue, a phthalocyanine series colorant residue, a pyranthrone series colorant residue, a pyrazoloquinazolone series colorant residue, a thioindigo series colorant residue, or a triarylcarbonium series colorant residue;

X represents —SO$_3$.M/m or —COO.M/m,
wherein M represents a counter cation selected from the group consisting of a hydrogen ion, a 1- to 3-valent metal ion, and an ammonium ion, and
m represents a valence number of M, which is an integer of 1 to 3, and n1 represents an integer of from 1 to 4.

11. The pigment composition according to claim 10, wherein the pigment derivative is at least one member selected from the group consisting of a diketopyrrolopyrrole series pigment derivative, a quinacridone series pigment derivative, an anthraquinone series pigment derivative, and an azo series pigment derivative.

12. The pigment composition according to claim 10, wherein the pigment derivative is an azo series pigment derivative.

13. The pigment composition according to claim 10, wherein the content of (B) the pigment derivative having a hydrophilic group and represented by the general formula (B1) is from 0.1 to 30% by weight based on the azo pigment (A) represented by the general formula (1).

14. The pigment composition according to claim 10, wherein the azo pigment represented by the general formula (1) is an azo pigment represented by the general formula (2-1):

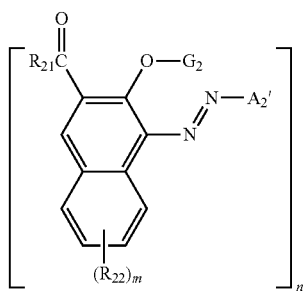

(2-1)

wherein, G$_2$ represents a hydrogen atom, an aliphatic group, an aryl group, or a heterocyclic group, R$_{21}$ represents an amino group, an aliphatic oxy group, an aliphatic group, an aryl group, or a heterocyclic group, R$_{22}$ represents a substituent, A$_2$' represents the following general formulae (A-1) to (A-18), (A-20) to (A-28), or (A-30) to (A-32), wherein R$_{51}$ to R$_{59}$ each represents a hydrogen atom or a substituent, and adjacent substituents may be connected to each other to form a 5- or 6-membered ring, and * shows the position connected to the azo group in the general formula (2-1), m and n are the same as are defined with respect to the general formula (1), when n=2, the general formula (2-1) represents a dimer formed through R$_{21}$, R$_{22}$, G$_2$, or A$_2$', when n=3, the general formula represents a trimer formed through R$_{21}$, R$_{22}$, G$_2$, or A$_2$', when n=4, the general formula represents a tetramer formed through R$_{21}$, R$_{22}$, G$_2$, or A$_2$', and wherein the general formula (2-1) does not contain any ionic hydrophilic group:

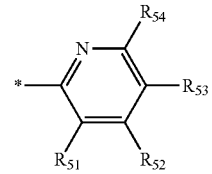
(A-1)

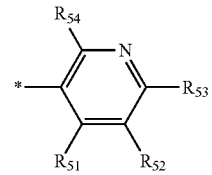
(A-2)

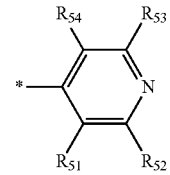
(A-3)

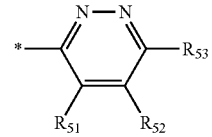
(A-4)

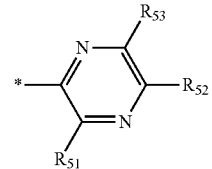
(A-5)

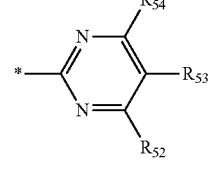
(A-6)

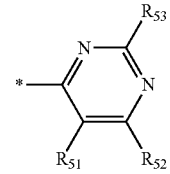
(A-7)

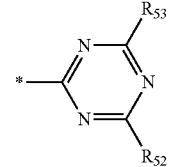
(A-8)

-continued
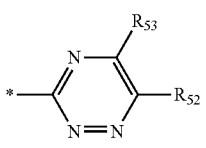 (A-9)
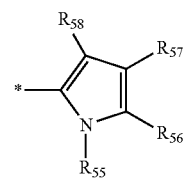 (A-10)
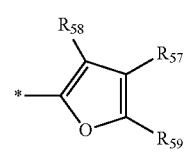 (A-11)
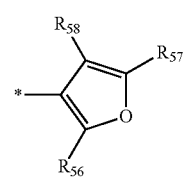 (A-12)
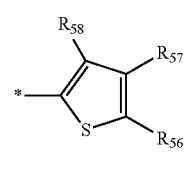 (A-13)
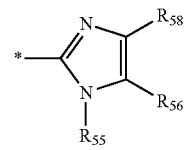 (A-14)
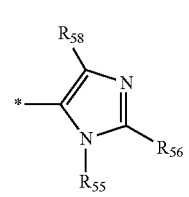 (A-15)
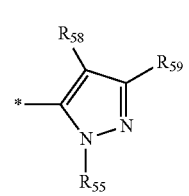 (A-16)
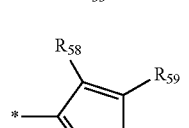 (A-17)
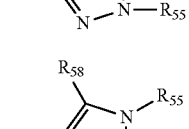 (A-18)
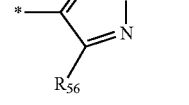
-continued
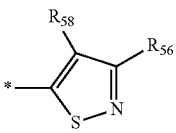 (A-20)
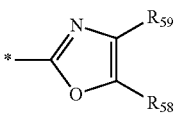 (A-21)
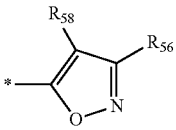 (A-22)
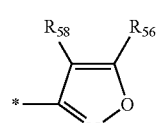 (A-23)
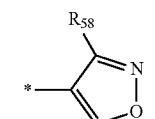 (A-24)
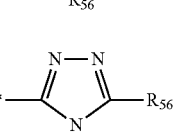 (A-25)
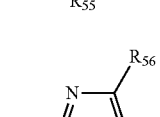 (A-26)
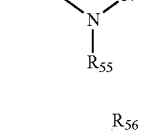 (A-27)
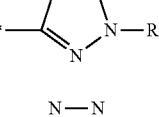 (A-28)
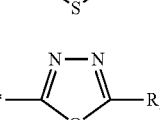 (A-30)
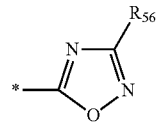 (A-31)

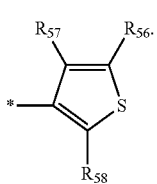

(A-32)

15. The pigment composition according to claim 10, wherein the azo pigment represented by the general formula (1) is an azo pigment represented by the general formula (3):

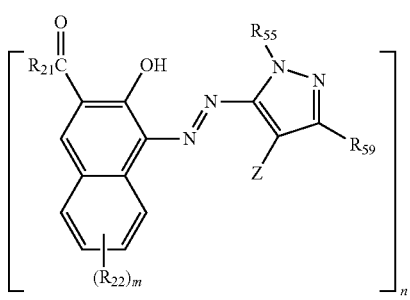

(3)

$R_{21}$ represents an amino group, an aliphatic oxy group, an aliphatic group, an aryl group, or a heterocyclic group, $R_{22}$ represents a substituent, $R_{55}$ represents a hydrogen atom or a substituent, $R_{59}$ represents a hydrogen atom or a substituent, m and n are the same as are defined with respect to the general formula (1), Z represents an electron-withdrawing group having a Hammett σp value of 0.2 or more, when n=2, the general formula (3) represents a dimer formed through $R_{21}$, $R_{22}$, $R_{55}$, $R_{59}$, or Z, when n=3, the general formula (3) represents a trimer formed through $R_{21}$, $R_{22}$, $R_{55}$, $R_{59}$, or Z, when n=4, the general formula (3) represents a tetramer formed through $R_{21}$, $R_{22}$, $R_{55}$, $R_{59}$, or Z, and the general formula (3) does not have any ionic hydrophilic group.

16. An ink for inkjet recording, comprising the pigment composition according to claim 10.

17. A coloring composition for color filter, comprising the pigment composition according to claim 10.

18. A color filter, which is produced by utilizing the coloring composition for color filter according to claim 17.

* * * * *